United States Patent
Nakamura et al.

(10) Patent No.: US 7,373,079 B2
(45) Date of Patent: May 13, 2008

(54) METHOD AND AN APPARATUS FOR STREAM CONVERSION, A METHOD AND AN APPARATUS FOR DATA RECORDING, AND DATA RECORDING MEDIUM

(75) Inventors: Kazuhiko Nakamura, Hirakata (JP); Hiroshi Yahata, Kadoma (JP); Kojiro Kawasaki, Katano (JP); Wilhelmus Jacobus Van Gestel, Eindhoven (NL); Declan Patrick Kelly, Eindhoven (NL); Motoki Kato, Tokyo (JP); Masanobu Nakamura, Tokyo (JP)

(73) Assignees: Matsushita Electric Industrial Co., Ltd., Osaka (JP); Koninklijke Philips Electronics N.V., Eindhoven (NL); Sony Corporation, Tokyo (JP)

( * ) Notice: Subject to any disclaimer, the term of this patent is extended or adjusted under 35 U.S.C. 154(b) by 908 days.

(21) Appl. No.: 10/473,345

(22) PCT Filed: Nov. 28, 2002

(86) PCT No.: PCT/JP02/12414

§ 371 (c)(1), (2), (4) Date: May 3, 2004

(87) PCT Pub. No.: WO03/047261

PCT Pub. Date: Jun. 5, 2003

(65) Prior Publication Data

US 2004/0208135 A1 Oct. 21, 2004

(30) Foreign Application Priority Data

Nov. 30, 2001 (JP) ............................ 2001-367788

(51) Int. Cl.
*H04N 7/26* (2006.01)
(52) U.S. Cl. .................... 386/124; 386/46; 386/95; 386/112; 386/125; 370/535; 348/423.1
(58) Field of Classification Search ................. 386/46, 386/95, 96, 98, 104, 105, 111, 112, 124–126; 370/535; 348/423.1
See application file for complete search history.

(56) References Cited

U.S. PATENT DOCUMENTS 5,373,498 A 12/1994 Tagiri
6,011,896 A 1/2000 Higurashi et al.

(Continued)

FOREIGN PATENT DOCUMENTS

EP 0 785 675 7/1997

(Continued)

*Primary Examiner*—Thai Q. Than
*Assistant Examiner*—Mishawn Dunn
(74) *Attorney, Agent, or Firm*—Wenderoth, Lind & Ponack, L.L.P.

(57) ABSTRACT

For encoding externally input AV signal to MPEG-TS that enables quickly conversion from MPEG-TS to MPEG-PS, data unit (Multiplexing Unit) is defined which includes a plurality of packet and has data size corresponding to data amount of one pack in MPEG-PS, and MPEG-TS is encoded for each defined data unit. Furthermore, time stamp information (ATS) added to a packet of MPEG-TS which is converted to MPEG-PS and time stamp information (SCR) added to a packet of the converted MPEG-PS are correlated with a predetermined formula.

12 Claims, 61 Drawing Sheets

U.S. PATENT DOCUMENTS

| | | |
|---|---|---|
| 6,236,663 B1 | 5/2001 | Kawakami |
| 6,289,169 B1 * | 9/2001 | Okuyama .................... 386/83 |
| 6,456,783 B1 | 9/2002 | Ando et al. |
| 6,504,996 B1 * | 1/2003 | Na et al. .................... 386/125 |
| 6,567,409 B1 * | 5/2003 | Tozaki et al. .......... 370/395.64 |
| 6,724,981 B1 * | 4/2004 | Park et al. ................... 386/125 |
| 6,741,795 B1 * | 5/2004 | Takehiko et al. ............. 386/95 |
| 6,901,078 B2 * | 5/2005 | Morris ....................... 370/466 |
| 6,973,258 B1 * | 12/2005 | Yoo et al. ................... 386/111 |
| 7,292,781 B1 * | 11/2007 | Ito et al. ...................... 386/96 |
| 2001/0009548 A1 | 7/2001 | Morris |
| 2004/0184764 A1 | 9/2004 | Yagi et al. |
| 2004/0240856 A1 | 12/2004 | Yahata et al. |

FOREIGN PATENT DOCUMENTS

| | | |
|---|---|---|
| EP | 0 843 482 | 5/1998 |
| EP | 0 899 964 | 3/1999 |
| EP | 0 949 825 | 10/1999 |
| EP | 0 965 991 | 12/1999 |
| EP | 0 994 480 | 4/2000 |
| EP | 1 003 337 | 5/2000 |
| EP | 1 021 048 | 7/2000 |
| EP | 1 030 307 | 8/2000 |
| EP | 1 087 402 | 3/2001 |
| EP | 1 209 922 | 5/2002 |
| HU | 224 095 | 4/2001 |
| JP | 2000-187963 | 7/2000 |
| JP | 2000-217066 | 8/2000 |
| JP | 2000-268537 | 9/2000 |
| WO | 00/14967 | 3/2000 |
| WO | 00/14987 | 3/2000 |

* cited by examiner

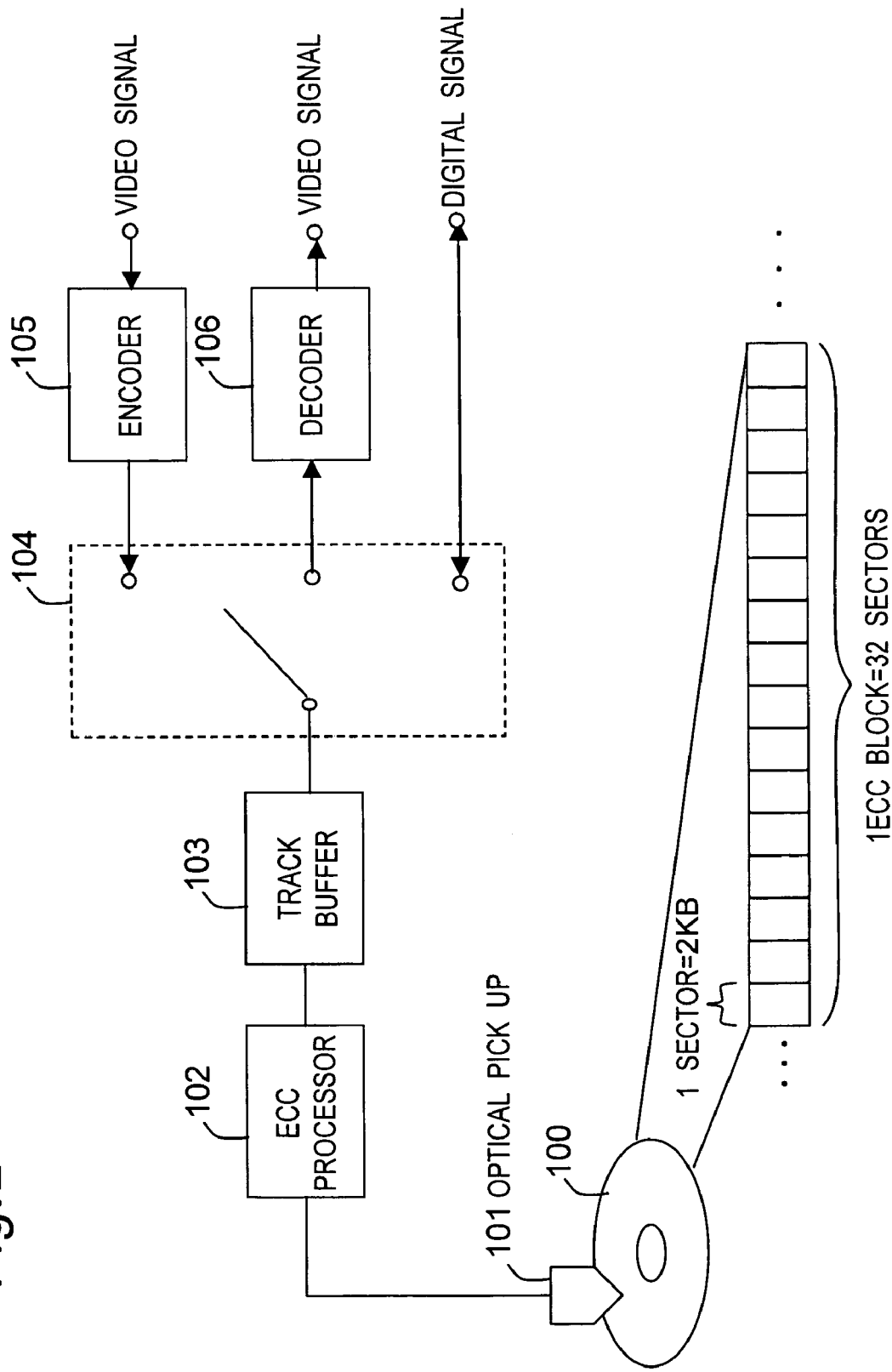

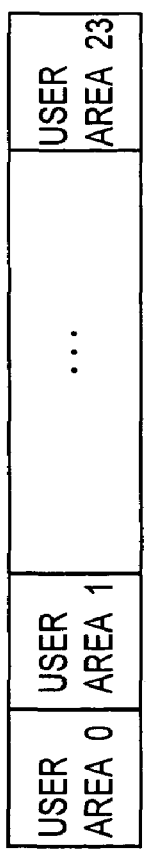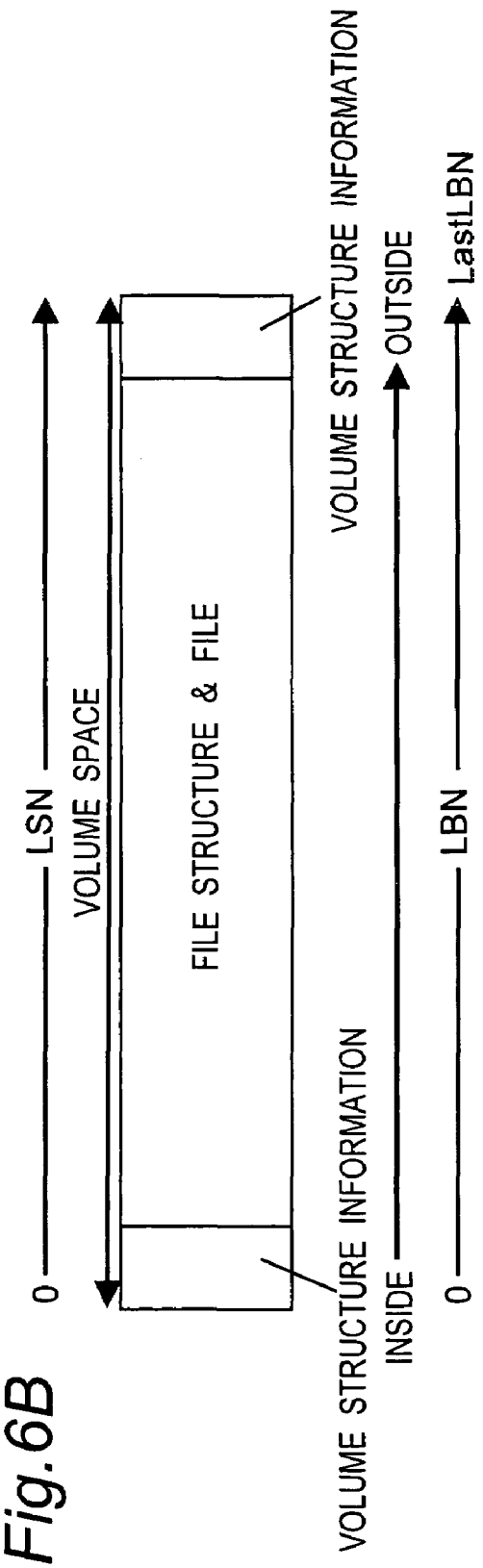
Fig.6A
Fig.6B

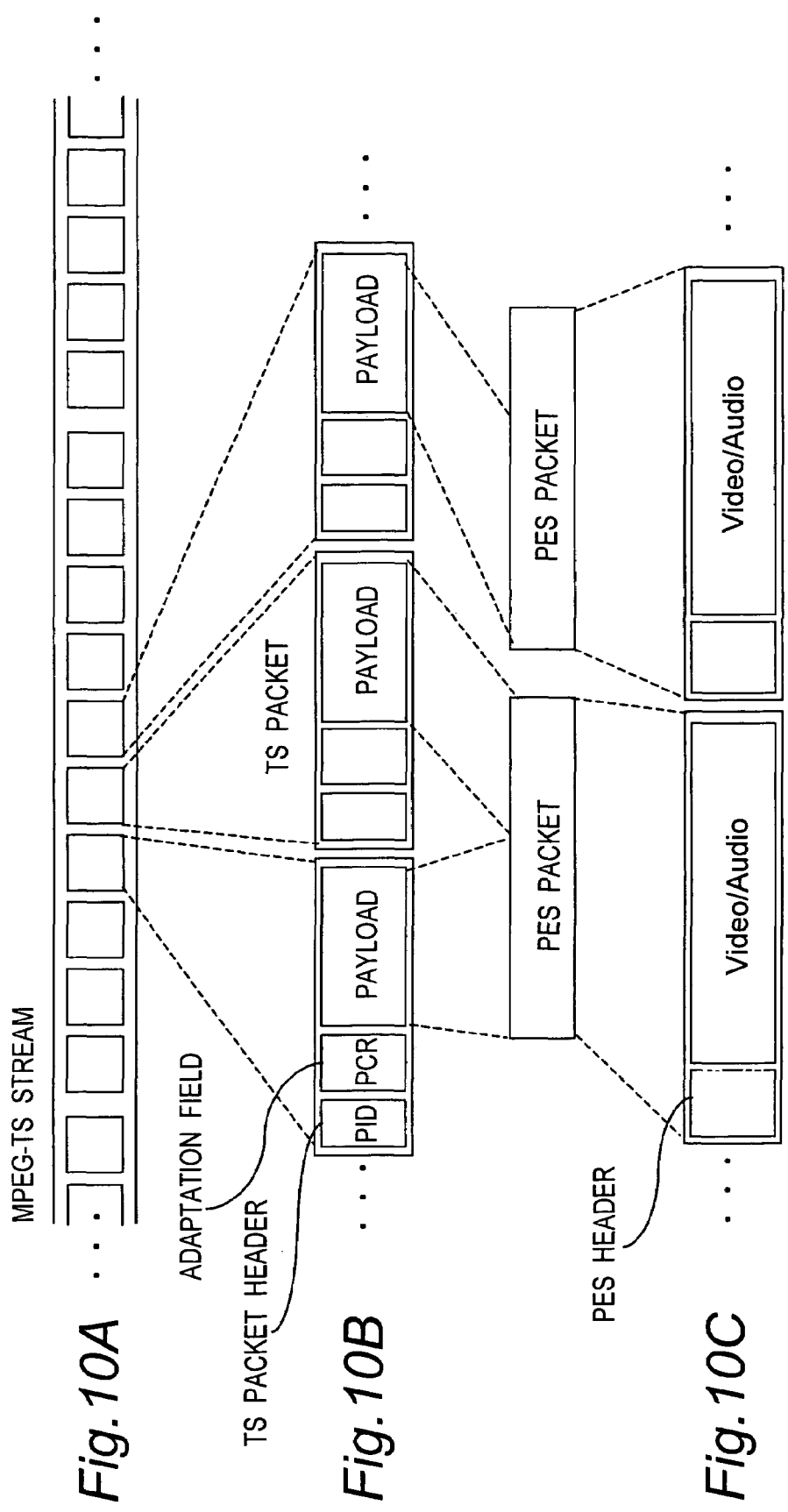

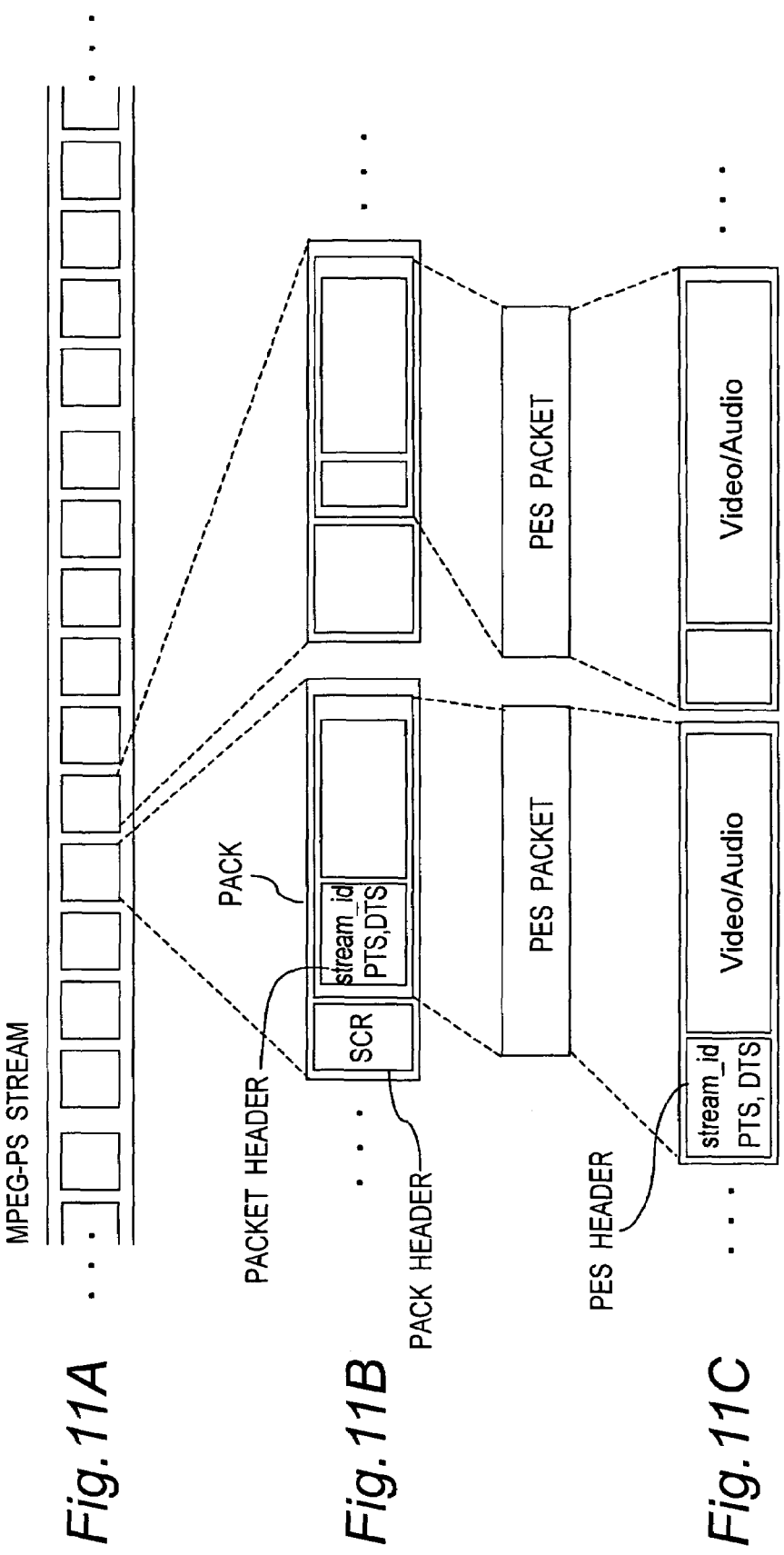

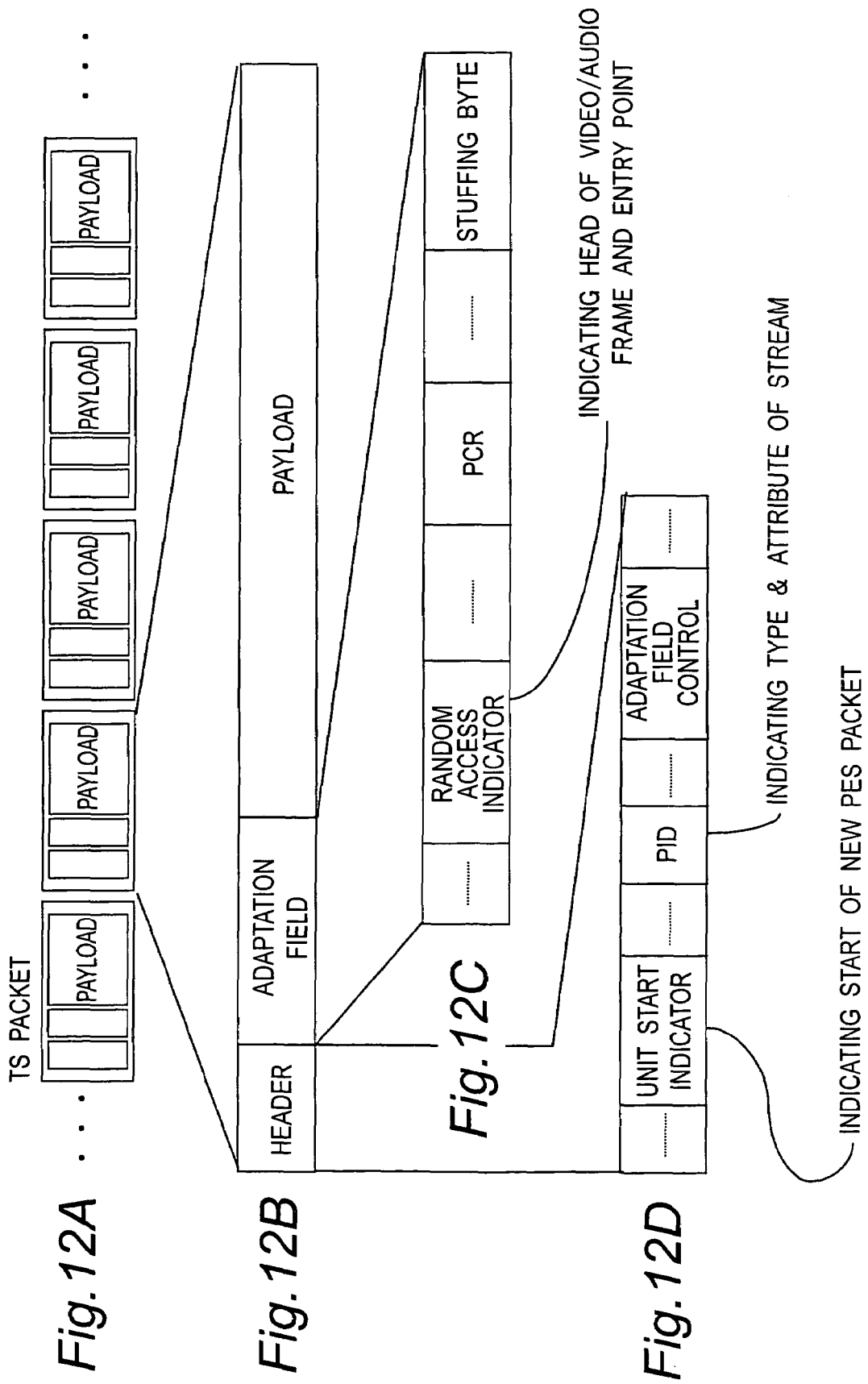

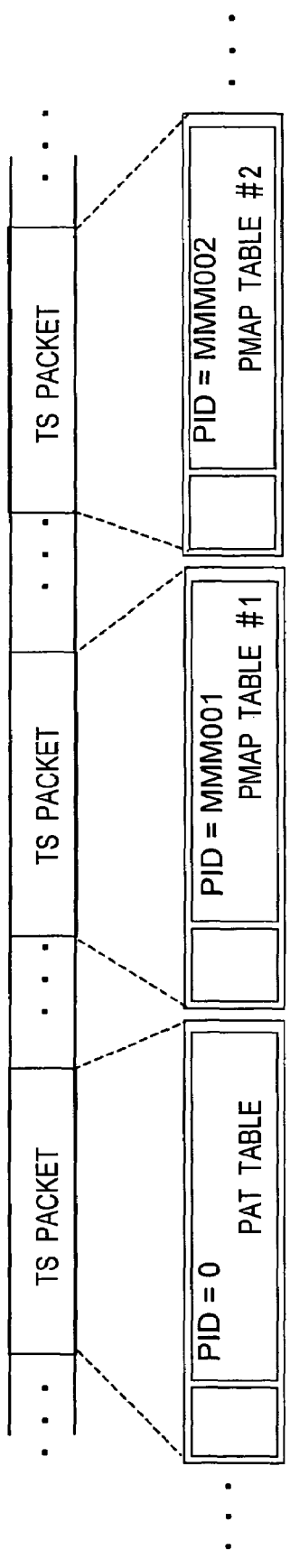

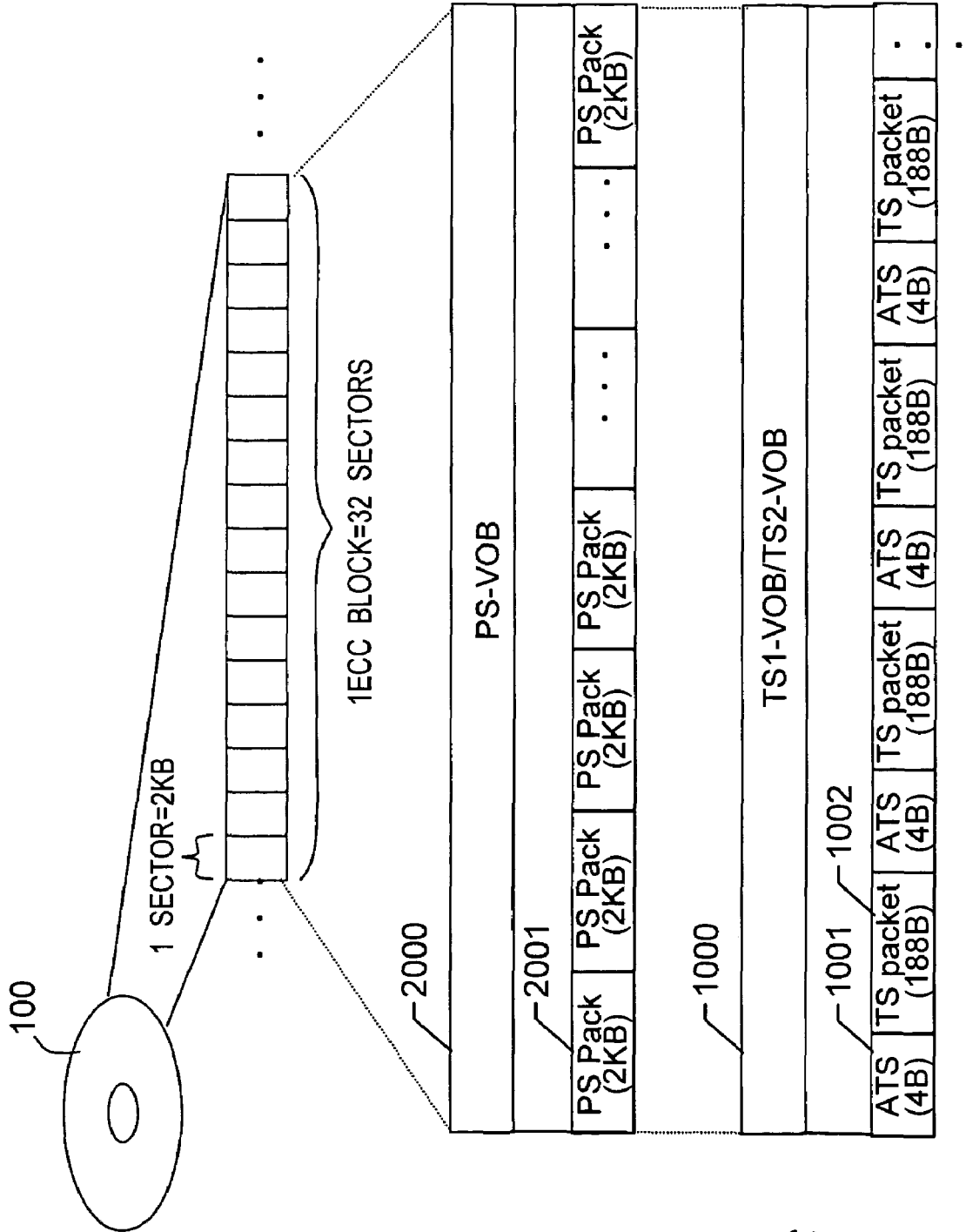

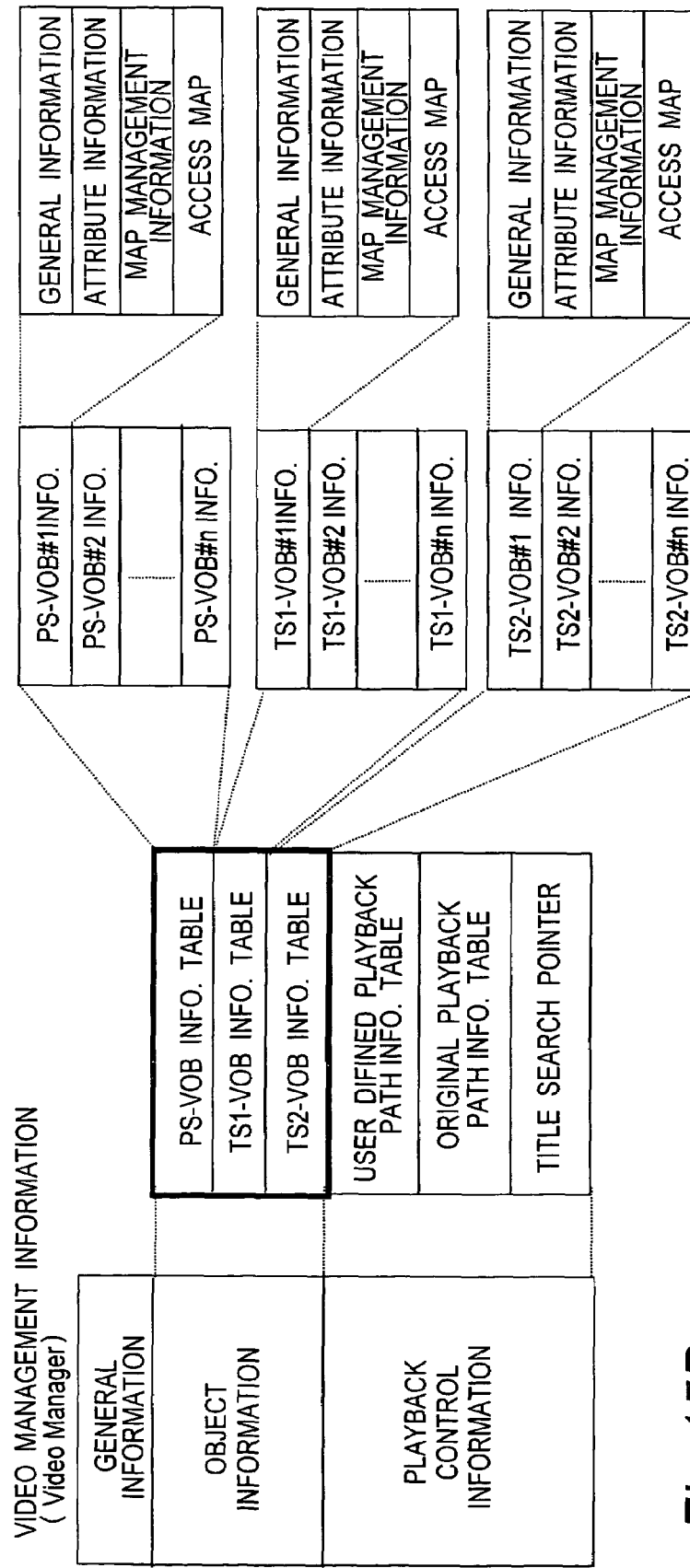
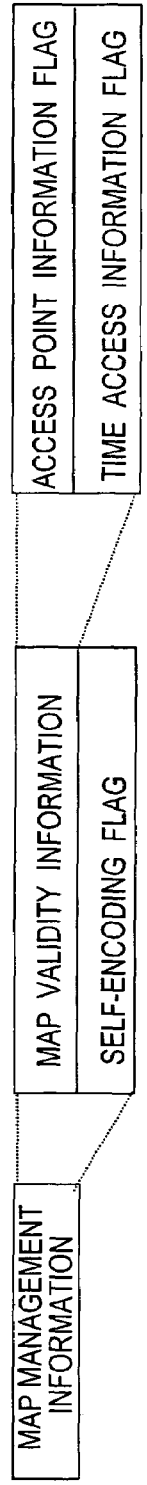
Fig. 15A
Fig. 15B

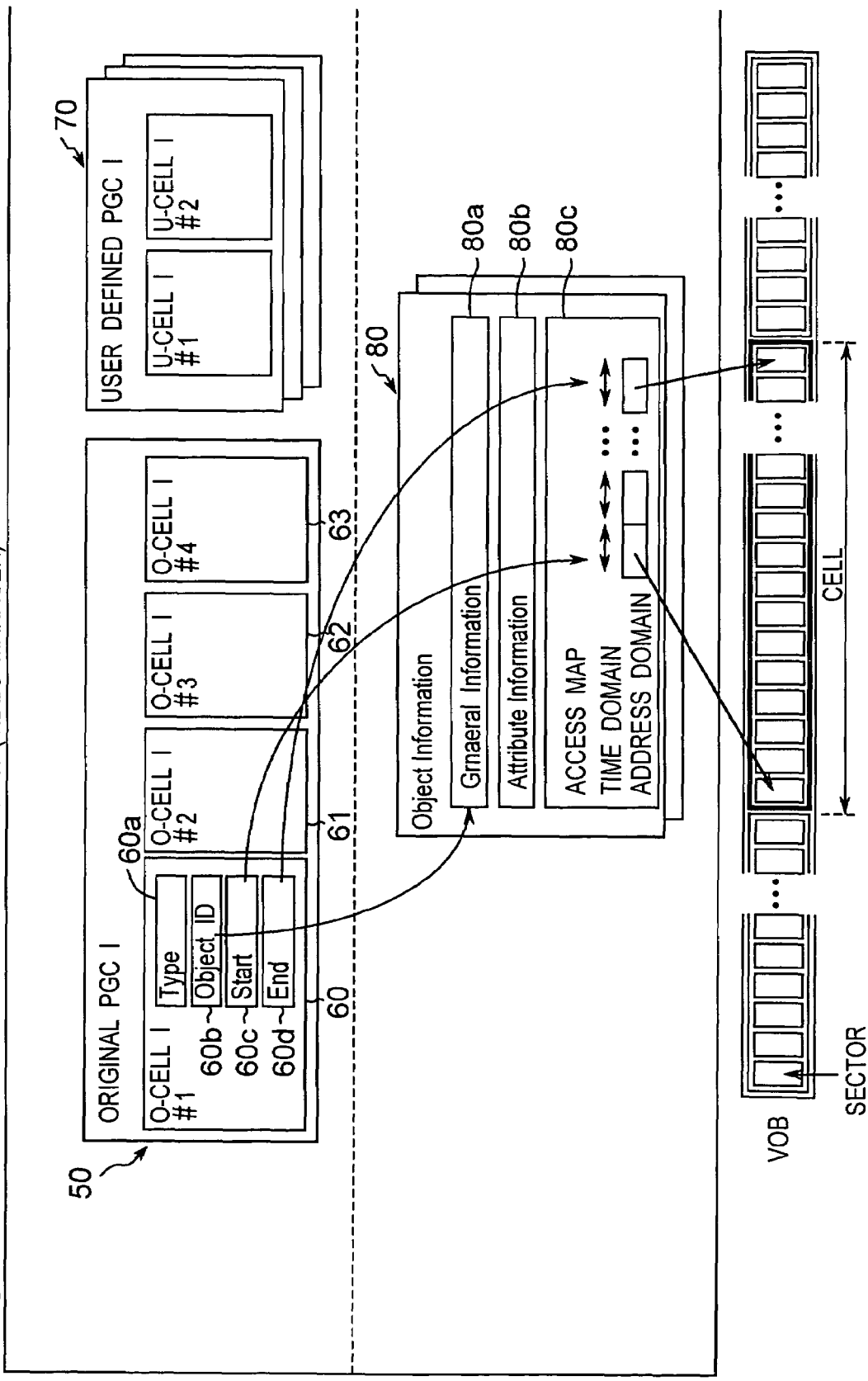

Fig.23

Tip PACKET

| Syntax | No. of bits | Mnemonic |
|---|---|---|
| transport_packet(){ | | |
|   sync_byte | 8 | bslbf |
|   transport_error_indicator | 1 | bslbf |
|   payload_unit_start_indicator | 1 | bslbf |
|   transport_priority | 1 | bslbf |
|   PID | 13 | uimsbf |
|   transport_scrambling_control | 2 | bslbf |
|   adaptation_filed_control | 2 | bslbf |
|   continuity_counter | 4 | uimsbf |
|   adaptation_field() | | |
|   Tip_Data(){ | | |
|     Data_ID() | | |
|     display_and_copy_info() | | |
|     encode_info() | | |
|     MakersPrivateData() | | |
|   } | | |
| } | | |

Fig.24

| Syntax | No. of bits | Mnemonic |
|---|---|---|
| adaptation_field() { | | |
| adaptation_field_length | 8 | uimsbf |
| discontinuity_indicator | 1 | bslbf |
| random_access_indicator | 1 | bslbf |
| elementary_stream_priority_indicator | 1 | bslbf |
| PCR_flag | 1 | bslbf |
| OPCR_flag | 1 | bslbf |
| splicing_point_flag | 1 | bslbf |
| transport_private_data_flag | 1 | bslbf |
| adaptation_field_extension_flag | 1 | bslbf |
| program_clock_reference_base | 33 | uimsbf |
| reserved | 6 | bslbf |
| program_clock_reference_extension | 9 | uimsbf |
| } | | |

Fig.25

| Data_ID() | | |
|---|---|---|
| Syntax | No. of bits | Mnemonic |
| Data_ID (){ | | |
| Data_Identifier | 24 | uimsbf |
| reserved | 8 | bslbf |
| } | | |

Fig. 26

| Syntax | No. of bits | Value |
|---|---|---|
| display_and_copy_info() | | |
| display_and_copy_info(){ | | |
| reserved | 40 | bslbf |
| display_control_info_status | 2 | bslbf |
| reserved | 2 | bslbf |
| copy_control_info_status | 3 | bslbf |
| reserved | 1 | bslbf |
| Aspect ratio | 4 | bslbf |
| Subtitling mode | 2 | bslbf |
| reserved | 1 | bslbf |
| Film camera mode | 1 | bslbf |
| CGMS | 2 | bslbf |
| APSTB | 2 | bslbf |
| Source | 1 | bslbf |
| reserved | 3 | bslbf |
| } | | |

Fig.27

| encode_info() | | |
|---|---|---|
| Syntax | No. of bits | Value |
| encode_info(){ | | |
|    video_resolution | 4 | bslbf |
|    reserved | 2 | bslbf |
|    encode_condition | 2 | bslbf |
|    reserved | 8 | bslbf |
|    FVFPST | 48 | bslbf |
|    reserved | 8 | bslbf |
| } | | |

Fig.28

| MakersPrivateData() | | |
|---|---|---|
| Syntax | No. of bits | Value |
| MakersPrivateData(){ | | |
|   maker_ID | 16 | uimsbf |
|   maker_private_data | 1224(=153*8) | bslbf |
| } | | |

Fig. 29A

| PID assignments | |
|---|---|
| PID value | meaning |
| 0x1031 | The PID of the transport packets which carry the Tip data stream |

Fig. 29B

| stream_type assignments | |
|---|---|
| stream_type value | Description |
| 0xC3 | Tip data stream |

*Fig.30*

| PACKET HEADER OF PES PACKET IN CONSTRAINED SESF | |
|---|---|
| fields | Permitted value in Constrained SESF |
| PES_packet_length | CONFOM TO ISO/IEC13818-1 |
| PES_priority | 0b |
| data_alignment_indicator | 0b |
| copyright | 0b |
| PTS_DTS_flags | 00b,10b or 11b |
| ESCR_flag | 0b |
| ES_rate_flag | 0b |
| DSM_trick_mode_flag | 0b |
| additional_copy_info_flag | 0b |
| PES_CRC_flag | 0b |
| PES_extension_flag | Reter to Fig.31 |
| PES_header_data_length | Reter to Fig.31 |
| PES_private_data_flag | 0b, if exists |
| pack_header_field_flag | 0b, if exists |
| program_packet_sequence_counter_flag | 0b, if exists |
| P-STD_buffer_flag | 0b, if exists |
| PES_extension_flag_2 | 0b, if exists |
| stuffing_byte | STVFFED FULLY WITH '0xFF' |

Fig.31

| CONSTRAIN FOR PES_extension_flag AND PES_header_data_length | | | | | | |
|---|---|---|---|---|---|---|
| PES packet | | encode_condition=01b | | | encode_condition=11b | |
| STORED DATA | MULTIPLEXED POSITION | VALUE OF PES_extension_flag AND PES_header_data_length | BYTE LENGTH OF stuffing_byte | | VALUE OF PES_extension_flag AND PES_header_data_length | BYTE LENGTH OF stuffing_byte |
| MPEG2-Video, MPEG1-Audio | FIRST FOLLOWING TIP PACKET | PES_extension_flag=1b PES_header_data_length=V1+3 | 2 | | PES_extension_flag=0b PES_header_data_length=V1 | 0 |
| | OTHERS | PES_extension_flag=0b PES_header_data_length=V1 | 0 | | | |
| AC-3 audio | FIRST FOLLOWING TIP PACKET | PES_extension_flag=1b PES_header_data_length=V1+7 | 6 | | PES_extension_flag=0b PES_header_data_length=V1+4 | 4 |
| | OTHERS | PES_extension_flag=0b PES_header_data_length=V1+4 | 4 | | | |

Fig.35

| | | ATTRIBUTE OF ELEMENTARY STREAM FOR encode_condition=11b | |
|---|---|---|---|
| | | NTSC | PAL |
| Video | Source picture resolution | 720x480,704x480, 352x480,352x240 (*Note1) | 720x576,704x576, 352x576,352x288 (*Note1) |
| | Aspect ratio | Display aspect ratio (*Note1) of 4:3 or 16:9 | |
| | Bit rate | 9.8Mbps (MAXIMUM) | |
| | GOP length | 36 or less display fields | 30 or less display field |
| | Sequence_end_code | once in end of VOB | |
| | Closed Captioning data | GOP layer user_data (same format as DVD VR) Picture layer (same format as ATSC) | N/A |
| | Teletext | N/A | Teletext transport packet (same format as DVB) |
| | WSS | (Tip transport packet) | Tip transport packet Picture layer user_data (SESF original formaT) |
| Audio | Quantization | 16bits | |
| | Sampling frequency | 48KHz | |
| | Bit rate | 64-384Kbps for MPEG-1 Audio, 64-448Kbps for AC-3 (*Note1) | |
| | Number of audio channels | 1-2ch for MPEG-1 Audio, 1-5.1ch for AC-3 (*Note1) | |

Fig.36

| | | ATTRIBUTE OF ELEMENTARY STREAM FOR encode_condition=01b | |
|---|---|---|---|
| | | NTSC | PAL |
| Video | Source picture resolution | 720x480,704x480, 544x480,480x480, 352x480,352x240 (*Note2) | 720x576,704x576, 544x576,480x576, 352x576,352x288 (*Note2) |
| | Aspect ratio | Display aspect ratio (*Note2) of 4:3 or 16:9 | |
| | Bit rate | 9.8Mbps (MAXIMUM) | |
| | GOP length | 36 or less display fields | 30 or less display fields |
| | Sequence_end_code | at least 90 display fields for sequence_end_code (*Note3) | at least 75 display fields for sequence_end_code (*Note3) |
| | Closed Captioning data | GOP layer user_data (same format as DVD VR) Picture layer (same format as ATSC) | N/A |
| | Teletext | N/A | Teletext transport packet (same format as DVB) |
| | WSS | (Tip transport packet) | Tip transport packet Picture layer user_data (SESF original format) |
| Audio | Quantization | 16bits | |
| | Sampling frequency | 48KHz | |
| | Bit rate | 64-384Kbps for MPEG-1 Audio, 64-448Kbps for AC-3 (*Note1) | |
| | Number of audio channels | 1-2ch and dual mono for MPEG-1 Audio, 1-5.1ch and dual mono for AC-3 (*Note4) | |

Fig.38

PACK HEADER OF PACK IN MPEG2-PS

| Field | Number of bits | Permitted value |
|---|---|---|
| Pack_start_code | 32 | 000001BAh |
| '01' | 2 | 01b |
| SCR_base[32..30] | 3 | |
| marker_bit | 1 | 1b |
| SCR_base[29..15] | 15 | |
| marker_bit | 1 | 1b |
| SCR_base[14..0] | 15 | |
| marker_bit | 1 | 1b |
| SCR_extension | 9 | |
| marker_bit | 1 | 1b |
| program_mux_rate | 22 | 6270h |
| marker_bit | 1 | 1b |
| marker_bit | 1 | 1b |
| reserved | 5 | 11111b |
| pack_stuffing_length | 3 | 000b |

Fig.39

| PACKET HEADER OF PACKET IN MPEG2-PS | | |
|---|---|---|
| Field | Number of bits | Permitted value |
| PES_priority | 1 | 0b |
| data_alignment_indicator | 1 | 0b |
| copyright | 1 | 0b |
| ESCR_flag | 1 | 0b |
| ES_rate_flag | 1 | 0b |
| DSM_trick_mode_flag | 1 | 0b |
| additional_copy_info_flag | 1 | 0b |
| PES_CRC_flag | 1 | 0b |
| PES_extension_flag | 1 | same value as Constrained SESF |
| PES_header_data_length | 8 | same value as Constrained SESF |
| PES_private_data_flag | 1 | 0b, if exists |
| pack_header_field_flag | 1 | 0b, if exists |
| Program_packet_sequence_counter_flag | 1 | 0b, if exists |
| P-STD_buffer_flag | 1 | 1b, if exists |
| PES_extension_flag_2 | 1 | 0b, if exists |
| stuffing_byte | 8*N | stuffed fully with '0×FF' |

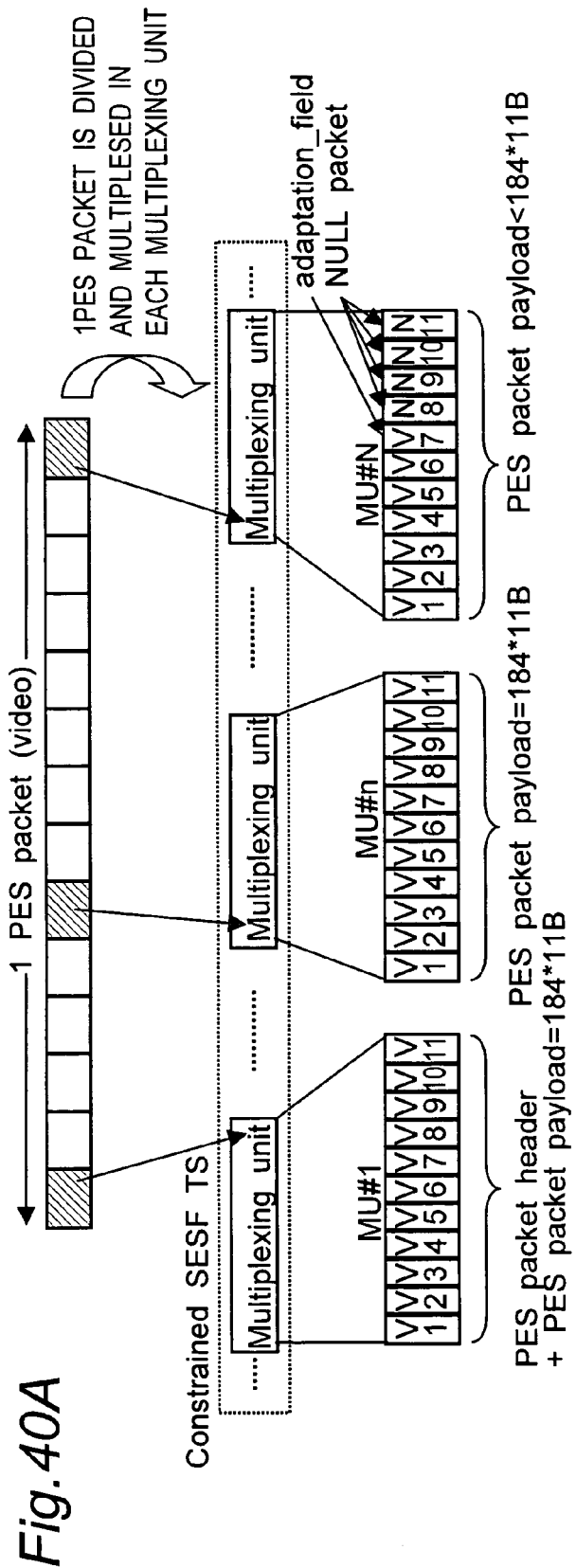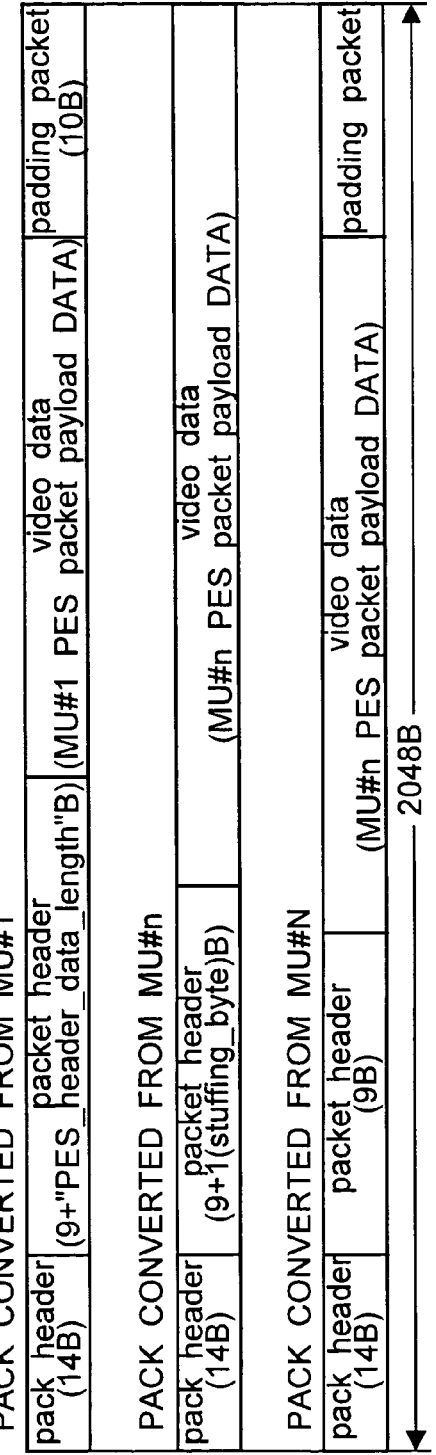
Fig.40A
Fig.40B

Fig. 42

| BIT RATE ALLOWED IN Constrained SESF | MAXIMUM BYTE LENGTH OF PES PACKET PAYLOAD (AC-3 audio) | MAXIMUM BYTE LENGTH OF PES PACKET PAYLOAD (MPEG1-audio) |
|---|---|---|
| 64 Kbps | 1792 | 1920 |
| 80 Kbps | 1920 | 1920 |
| 96 Kbps | 1920 | 1728 |
| 112 Kbps | 1792 | 1680 |
| 128 Kbps | 1536 | 1920 |
| 160 Kbps | 1920 | 1920 |
| 192 Kbps | 1536 | 1728 |
| 224 Kbps | 1792 | 1344 |
| 256 Kbps | 1024 | 1536 |
| 320 Kbps | 1280 | 1920 |
| 384 Kbps | 1536 | 1152 |
| 448 Kbps | 1792 | N/A |

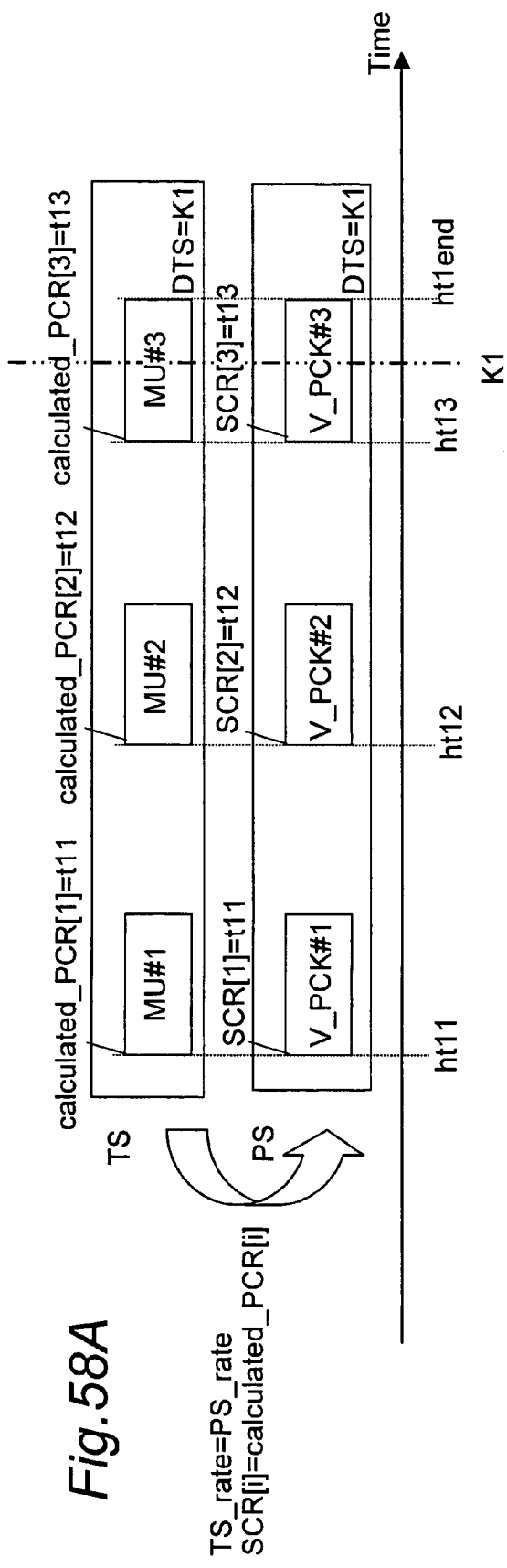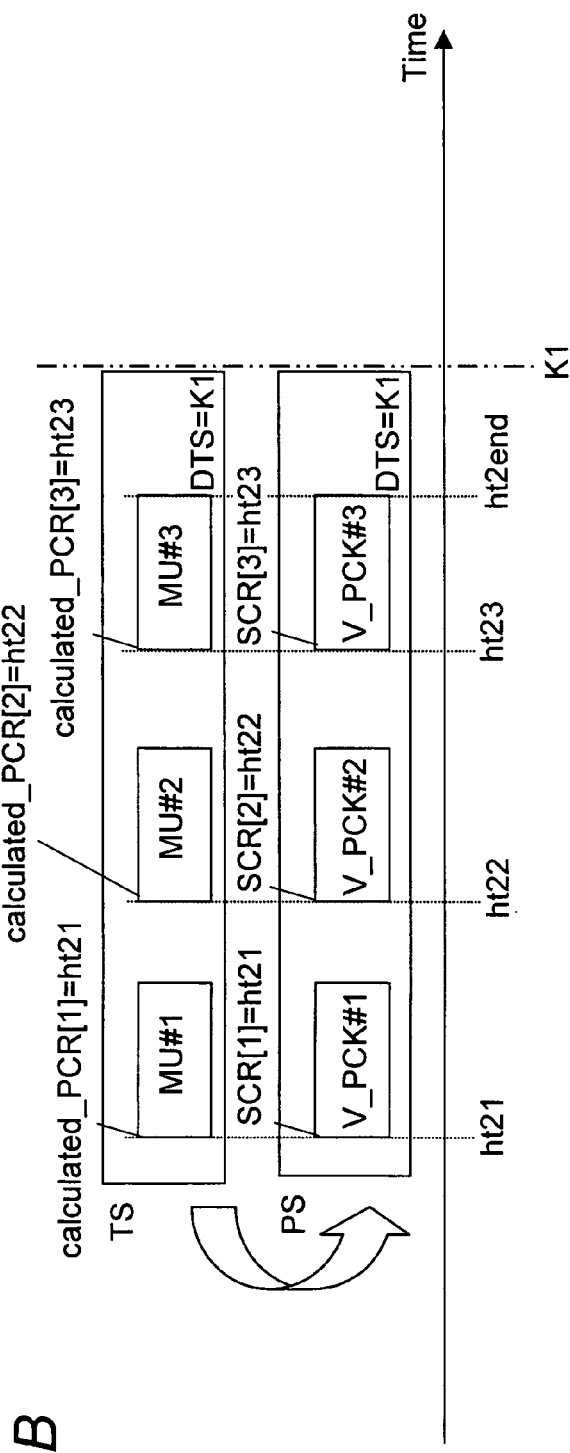

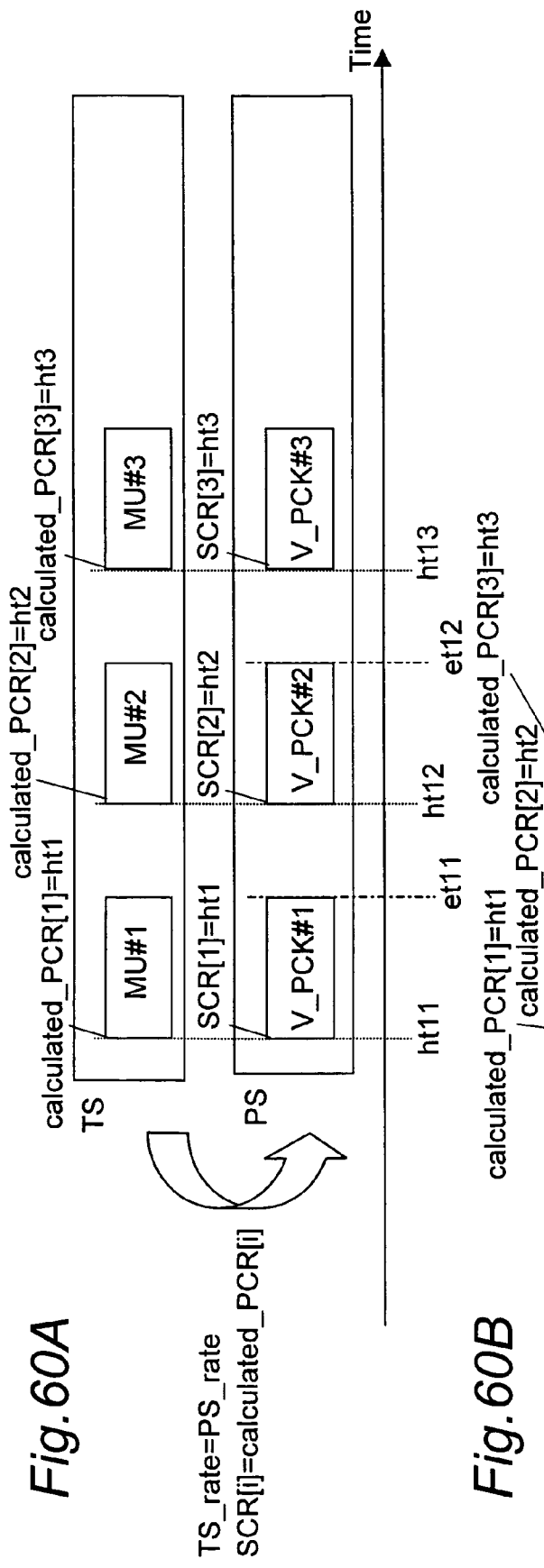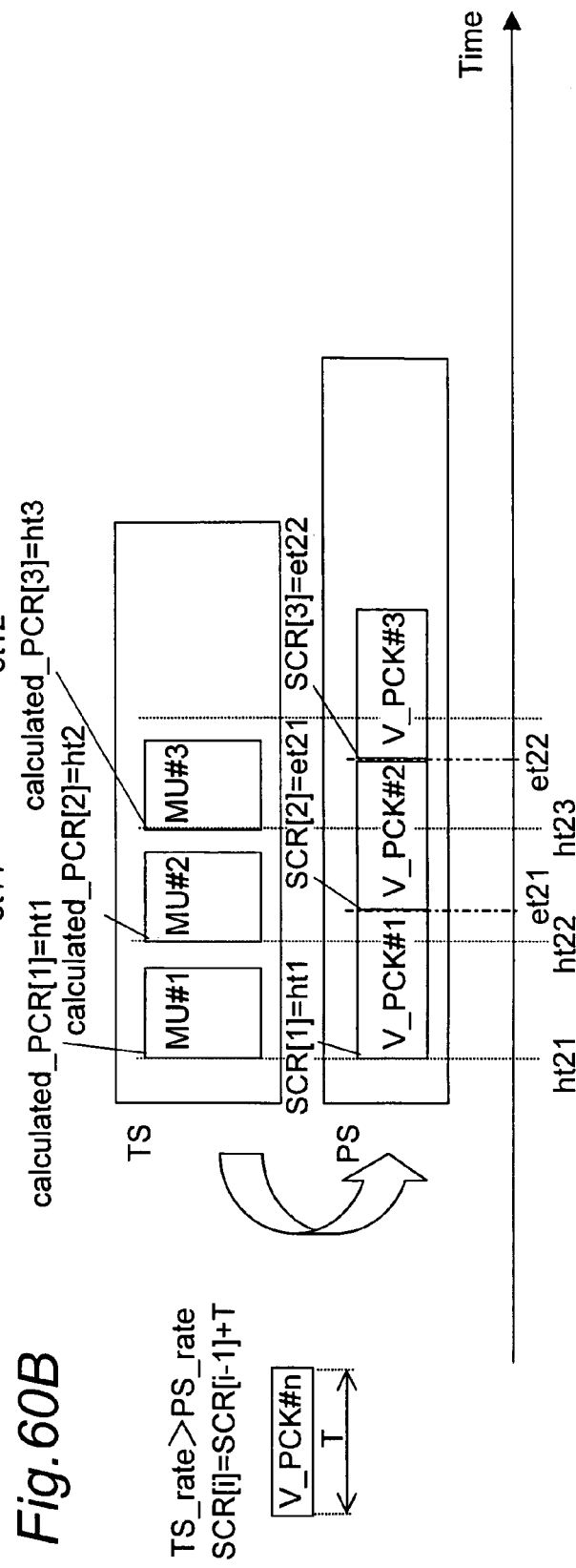

METHOD AND AN APPARATUS FOR STREAM CONVERSION, A METHOD AND AN APPARATUS FOR DATA RECORDING, AND DATA RECORDING MEDIUM

TECHNICAL FIELD

The present invention relates to a readable, recordable data recording medium for recording multimedia data including moving picture (video) data, still picture data, audio data, and formatting data for data broadcasting. This invention also relates to a system and method for recording data to this data recording medium.

BACKGROUND ART

Where 4.7 GB was until recently the maximum storage capacity for rewritable optical discs, phase-change DVD-RAM media with a storage capacity of tens of gigabytes are now available. DVD-RAM media are already used as a storage medium in the computer industry, and are expected to soon be used as a recording and playback medium in the audio-video (AV) field as a result of the development of economical encoders and decoders implementing the MPEG-1 and MPEG-2 digital AV data coding standards.

Digital broadcasting has already started in Japan, making it possible to multiplex video, audio, and data for multiple programs to an MPEG transport stream (MPEG-TS below). Digital broadcast recorders using hard disk drives or DVD drives are also available.

These next-generation digital broadcast recorders often record the broadcast content as it was broadcast without converting the MPEG-TS. So that the recorder does not need to be able to internally process both the MPEG-TS and MPEG program stream (MPEG-PS below), these recorders are expected to encode even external analog AV content from line input terminals (i.e., user content) to the MPEG-TS for recording.

The current DVD theoretical standards (such as DVD-Video, DVD-Audio, DVD Video Recording, and DVD Stream Recording standards) use the MPEG-PS for AV stream recording. This means that to convert content recorded using the MPEG-TS, such as in the above digital broadcast recorder, to the DVD-Video format, for example, the MPEG-TS must be converted to an MPEG-PS.

Converting an MPEG-TS multiplexed content stream to an MPEG-PS, however, requires complex computations for decoder buffer management. The conversion process therefore takes longer, requires re-encoding the elementary stream, may degrade the image and sound quality, and is thus generally difficult to accomplish.

DISCLOSURE OF INVENTION

The present invention is therefore directed to solving these problems, and an object of this invention is to provide a data recording medium for recording data to an MPEG transport stream whereby content recorded in an MPEG-TS format can be converted quickly and simply to an MPEG-PS format. A further object is to provide a system and a method for recording, converting, and playing back data using this data recording medium.

A stream conversion apparatus according to the invention is provided for converting a first stream including video data and audio data multiplexed in a specific format to a second stream, the first stream having a structure for storing data segmented in first blocks, the second stream having a structure for storing data segmented in second blocks, the maximum data size of the first and second blocks being different.

With the constrained format, a specific number of consecutive first blocks in the first stream are managed as a unit (Multiplexing Unit), the specific number is set so that a total amount of data stored in the unit does not exceed an amount of data stored to one second block, and all data stored in the same unit are the same video stream or the same audio stream. An input start time to a system decoder of a destination second block to which the stream is converted is the same as the later one of a first candidate time and a second candidate time. The first candidate time is the input start time to the system decoder of a source unit being converted. The second candidate time is the time at which input to the system decoder of the second block immediately before the destination second block to which the source unit is converted ends.

The stream conversion system includes a reading section operable to read the first stream from the recording medium; a conversion section operable to convert the read first stream to a second stream; and a recording section operable to record the converted second stream to the recording medium. The conversion section converts, by unit, the first blocks composing the unit to one second block without changing the multiplexing order of the first blocks, and selects the later one of the first and second candidate times as the time stamp information of the converted second block to set the decoder input start time of the second block.

A plurality of consecutive units in the first stream may be managed as a capsule in which a control block is inserted. The first block located at the head of the unit may include first time stamp information (ATS[i]) indicating an input start time to a system decoder based on a first reference value. The control block may contain the first time stamp information (ATS_tip) based on the first reference value, and second time stamp information (PCR_tip) based on a second reference value different from the first reference value. The second time stamp information (calculated_PCR[i]) of the first block located at the head of each unit and input start time (SCR[i]) to the system decoder of each second block included in the second stream converted from the first stream can be obtained from the following formulas, $$SCR[1] = \text{calculated\_PCR}[1]$$

$$SCR[i] = \max(SCR[i-1]+T, \text{calculated\_PCR}[i])$$

$$\text{calculated\_PCR}[i] = PCR\_tip + (ATS[i] - ATS\_tip + C)$$

where i is an integer which is 2 or more, T is the minimum transfer time of a second block, and C is a correction factor for overflow of ATS[i].

A recording apparatus according to the invention is provided for multiplexing video information and audio information to record the information to a recording medium in a format enabling conversion from a first stream to a second stream, the first stream having a structure for storing data segmented in first blocks, the second stream having a structure for storing data segmented in second blocks, the maximum data size of the first and second blocks being different.

With the format, a specific number of consecutive first blocks in the first stream are managed as a unit (Multiplexing Unit), the specific number is set so that a total amount of data stored in the unit does not exceed an amount of data stored to one second block, and all data stored in the same unit are the same video stream or the same audio stream. An input start time to a system decoder of a destination second block to which the stream is converted is the same as the later one of a first candidate time and a second candidate time. The first candidate time is the input start time to the system decoder of a source unit being converted. The second candidate time is the time at which input to the system decoder of the second block immediately before the destination second block to which the source unit is converted ends, The first stream is converted to the second stream by converting, by unit, the first blocks composing the unit to one second block without changing the multiplexing order of the first blocks, and selecting the later one of the first and second candidate times as the time stamp information of the converted second block to set the decoder input start time of the second block.

The recording apparatus includes: an encoding section operable to encode the video information and audio information to be recorded to the first stream according to the format; a recording section operable to record the encoded first stream to the recording medium; and a control section operable to control the encoding section and recording section. The control section anticipates the second stream converted from the encoded first stream when encoding the first stream, and then encodes the first stream so that at least one of a buffer underflow and buffer overflow occurs in neither the encoded first stream or the anticipated second stream.

In the recording apparatus, a plurality of consecutive units in the first stream may be managed as a capsule in which a control block is inserted. The first block located at the head of the unit may include first time stamp information (ATS[i]) indicating an input start time to a system decoder based on a first reference value. The control block may contain the first time stamp information (ATS_tip) based on the first reference value, and second time stamp information (PCR_tip) based on a second reference value different from the first reference value.

The second time stamp information (calculated_PCR[i]) of the first block located at the head of each unit and input start time (SCR[i]) to the system decoder of each second block included in the second stream converted from the first stream can be obtained from the following formulas, $$SCR[1] = calculated\_PCR[1]$$

$$SCR[i] = max(SCR[i-1]+T, calculated\_PCR[i])$$

$$calculated\_PCR[i] = PCR\_tip + (ATS[i] - ATS\_tip + C)$$

where i is an integer which is 2 or more, T is the minimum transfer time of a second block, and C is a correction factor for overflow of ATS[i].

In the recording apparatus, transfer rate conditions allowed for audio data and video data may be different in the first stream and second stream. The control section may control the encoding section such that the first stream meets these transfer rate conditions in both the encoded first stream and anticipated second stream.

According to these transfer rate conditions, the maximum transfer rate allowed for a first block storing video data in the first stream may be greater than or equal to the maximum transfer rate allowed for a first block storing audio data. The maximum transfer rate allowed for a second block storing video data in the second stream may be equal to the maximum transfer rate allowed for a second block storing audio data.

A recording medium according to the present invention is provided for recording video data and audio data multiplexed in a format enabling converting a first stream to a second stream, the first stream having a structure for storing data segmented in first blocks, the second stream having a structure for storing data segmented in second blocks, the maximum data size of the first and second blocks being different.

With the format, a specific number of consecutive first blocks in the first stream are managed as a unit (Multiplexing Unit), the specific number is set so that a total amount of data stored in the unit does not exceed an amount of data stored to one second block, and all data stored in the same unit are the same video stream or the same audio stream. An input start time to a system decoder of a destination second block to which the stream is converted is the same as the later one of a first candidate time and a second candidate time, the first candidate time being the input start time to a system decoder of a source unit being converted, and the second candidate time being the time at which input to the system decoder of the second block immediately before the destination second block to which the source unit is converted ends. The first stream is converted to the second stream by converting, by unit, the first blocks composing the unit to one second block without changing the multiplexing order of the first blocks, and selecting the later one of the first and second candidate times as the time stamp information of the converted second block to set the decoder input start time of the second block.

A stream conversion method according to the present invention is provided for converting a first stream including video data and audio data multiplexed in a specified format to a second stream, the first stream having a structure for storing data segmented in first blocks, the second stream having a structure for storing data segmented in second blocks, the maximum data size of the first and second blocks being different.

With the constrained format, a specific number of consecutive first blocks in the first stream are managed as a unit (Multiplexing Unit), the specific number is set so that a total amount of data stored in the multiplexing unit does not exceed an amount of data stored to one second block, and all data stored in the same unit are the same video stream or the same audio stream. An input start time to a system decoder of a destination second block to which the stream is converted is the same as the later one of a first candidate time and a second candidate time, the first candidate time being the input start time to the system decoder of a source unit being converted, the second candidate time being the time at which input to the system decoder of the second block immediately before the destination second block to which the source unit is converted ends.

The stream conversion method includes, in order to convert the first stream read out from a recording medium to the second stream, converting, by unit, the first blocks composing, by unit, the unit composing the unit to one second block without changing the multiplexing order of the first blocks, and selecting the later one of the first and second candidate times as the time stamp information of the converted second block to set the decoder input start time of the second block.

A recording method according to the present invention is provided for multiplexing video information and audio information to record the information to a recording medium in a format enabling conversion from a first stream to a second stream, the first stream having a structure for storing data segmented in first blocks, the second stream having a structure for storing data segmented in second blocks, the maximum data size of the first and second blocks being different.

With the format, a specific number of consecutive first blocks in the first stream are managed as a unit (Multiplexing Unit), the specific number is set so that a total amount of data stored in the unit does not exceed an amount of data stored to one second block, and all data stored in the same unit are the same video stream or the same audio stream. An input start time to a system decoder of a destination second block to which the stream is converted is the same as the later one of a first candidate time and a second candidate time. The first candidate time is the input start time to the system decoder of the source unit being converted. The second candidate time is the time at which input to the system decoder of the second block immediately before the destination second block to which the source unit is converted ends.

The first stream is converted to the second stream by converting, by unit, the first blocks composing the unit to one second block without changing the multiplexing order of the first blocks, and selecting the later one of the first and second candidate times as the time stamp information of the converted second block to set the decoder input start time of the second block.

The recording method includes, when encoding the first stream, anticipating the second stream converted from the encoded first stream, and encoding the first stream so that at least one of buffer underflow or buffer overflow occurs in neither the encoded first stream or the anticipated second stream.

A program according to the present invention enables a computer to execute the stream conversion method or recording method of the invention.

EFFECTS OF THE INVENTION

A data recording and reproducing apparatus according to the present invention efficiently encodes and decodes externally input AV data while maintaining decoder compatibility when self-encoding the AV data to an MPEG transport stream. The MPEG-TS recorded to the data recording medium is multiplexed in block units of 2 KB or less to improve compatibility and convertibility to an MPEG-PS. Because the MPEG-TS is multiplexed to allow for easy conversion to an MPEG-PS, the MPEG-TS can be converted to an MPEG-PS quite easily with sequential processing of transport stream packets without considering buffer management. Furthermore, by defining the relationship between the TS packet transfer timing information (ATS) and PS pack transfer timing information (SCR) and the correlation to the header, the MPEG-TS can be dependably converted to an MPEG-PS conforming to a specified decoder reference model.

BRIEF DESCRIPTION OF DRAWINGS

FIG. 2 is a block diagram of the drive of a DVD recorder;

FIGS. 6A and 6B show logical data spaces of the disc;

FIGS. 10A to 10C show the MPEG transport stream (MPEG-TS);

FIGS. 11A to 11C show the MPEG program stream (MPEG_PS);

FIGS. 12A to 12D show a TS packet;

FIGS. 13A, 13B, 13C1 and 13C2 show examples of PAT table and PMAP table;

FIGS. 14A to 14C show the arrangement of video objects on disc;

FIGS. 15A and 15B show the data structure of video management information;

FIG. 17 shows the relationship between an object, object information, and PGC information in the video management information;

FIG. 23 shows the data structure of Tip packet;

FIG. 24 shows the data structure of Data_ID;

FIG. 25 shows the data structure of display_and_copy_info;

FIG. 26 shows the data structure of encode_info;

FIG. 27 shows the data structure of PES_info;

FIG. 28 shows the data structure of MakersPrivateData;

FIG. 29A describes PID of Tip packet, and FIG. 29B describes stream_type of Tip packet;

FIG. 30 shows the field values of the PES packet header in a Constrained SESF stream;

FIG. 31 shows PES_extension_flag and PES_header_data_length in a Constrained SESF stream;

FIG. 35 shows the elementary stream attributes of a Constrained SESF when encode_condition="11b";

FIG. 36 shows the elementary stream attributes of a Constrained SESF when encode_condition="01b";

FIG. 38 shows part of the data structure of the pack header of a pack in MPEG-2 program stream;

FIG. 39 shows part of the data structure of the packet header in an MPEG-2 program stream;

FIGS. 40A and 40B show conversion from a Constrained SESF to an MPEG_PS for a video pack;

FIG. 42 is a table of audio bit rates allowed by the Constrained SESF, and the maximum payload length stored to one audio PES packet for AC-3 and MPEG-1 Audio at the corresponding bit rates;

FIG. 58A describes buffer management of the MPEG-TS and anticipated MPEG-PS when the bit rate is the same in the MPEG-TS being converted and the resulting MPEG-PS (when buffer underflow occurs);

FIG. 58B describes buffer management of the MPEG-TS and anticipated MPEG-PS when the bit rate is the same in the MPEG-TS being converted and the resulting MPEG-PS (when buffer underflow does not occur);

FIG. 60A describes determining the time stamp information (SCR) set in the packs of the converted MPEG-PS (when the MPEG-TS and MPEG-PS with the same bit rate);

FIG. 60B describes determining the time stamp information (SCR) set in the packs of the converted MPEG-PS (when the MPEG-TS transfer rate is higher than the MPEG-PS transfer rate)

BEST MODE FOR CARRYING OUT THE INVENTION

Figure 1:
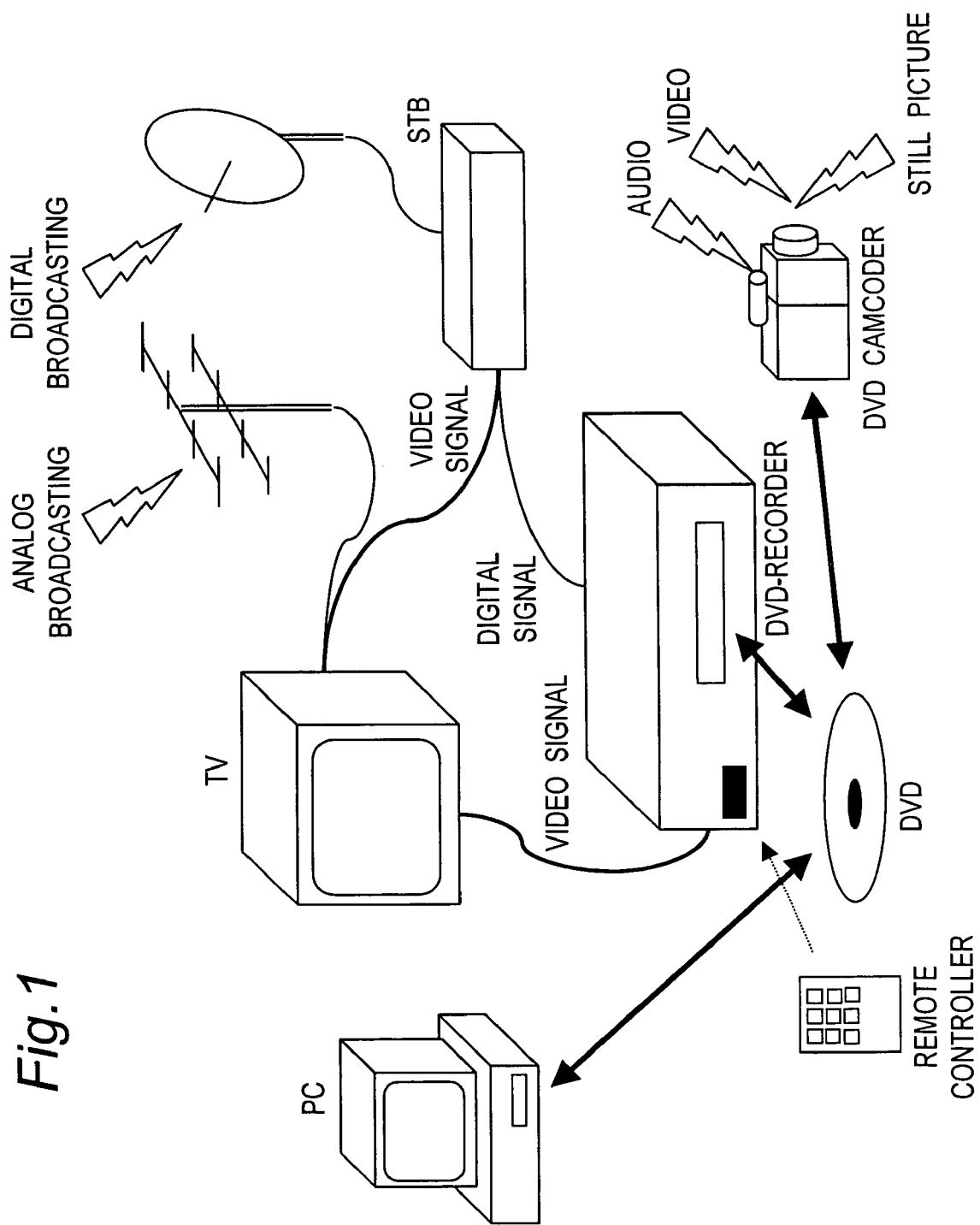
FIG. 1 is a schematic diagram of an exemplary interface between a DVD recording apparatus and other components used in conjunction therewith.

A DVD disc, DVD recorder, and DVD player are described in the following sequence below with reference to the accompanying figures as specific embodiments of a data recording medium, recording system, and playback system according to the present invention.

The essential points of the present invention are described in section 8, summary of the invention, and section 9, detailed description of the embodiments. It will be noted, however, that all of the following are embodiments of the invention though they vary in their relationship to the invention.

1. Summary of a DVD recorder system
2. Functional summary of a DVD recorder
3. Summary of a DVD disc
4. Summary of reproduced AV data
5. Summary of AV data management information and playback control
6. Basic operation of the playback function
7. Basic operation of the recording function
8. Summary of the invention
9. Detailed description of the embodiments Note that for simplicity "TS2PS conversion" as used below means converting the MPEG transport stream (MPEG-TS) to an MPEG program stream (MPEG-PS), and "DVD format" refers both the format of the DVD-Video standard and the format of the DVD-Video Recording standard, both of which are MPEG-PS formats.

1. Summary of a DVD Recorder System

FIG. 1 is a schematic diagram used to describe a DVD recorder and the interface between a DVD recorder and other equipment.

As shown in FIG. 1, a DVD optical disc is loaded into the DVD recorder for recording and reproducing video data. The DVD recorder is typically operated with a remote control.

Video data can be input to the DVD recorder using analog signals, such as from analog broadcasts, or digital signals, such as from digital broadcasts. Analog broadcasts are generally received by the receiver built in to a television, for example, demodulated, and input the DVD recorder as an NTSC or other type of analog video signal. Digital broadcasts are usually received and demodulated to a digital signal by a set-top box (STB) receiver and input to the DVD recorder for recording.

Video data recorded to a DVD is similarly reproduced and externally output by the DVD recorder. As with the input, the video can be output as an analog signal or digital signal. Analog signal output can be output directly to the television while digital signal output is passed through the STB for conversion to an analog signal before input to the television for viewing.

In addition to DVD recorders, DVD camcorders and personal computers can also be used to record and play back video data to and from DVDs. DVDs containing video data recorded by a device other than a DVD recorder can also be loaded into the DVD recorder for playback.

Audio data is also normally recorded with the video data in both analog and digital broadcasts, and this audio data can be likewise recorded and reproduced by the DVD recorder.

Furthermore, the video data is generally moving picture data (such as a movie), but may also be or include still pictures. These still pictures can be recorded using the still imaging function of a DVD camcorder, for example.

Various digital interfaces can be used to connect the STB and DVD recorder, including IEEE 1394, ATAPI, and SCSI.

It will also be noted that the NTSC composite video signal is noted above for signals passed between the DVD recorder and television, but a component signal in which the luminance signal and color difference signal are sent separately could be used.

Digital interfaces such as DVI are also being developed to replace the analog interface used for video transfers between the AV equipment and television, and the DVD recorder and television are expected to be connected via a digital interface before long.

2. Functional Summary of a DVD Recorder

FIG. 2 is a block diagram showing the functions of a DVD recorder. A typical DVD drive has an optical pickup 101 for reading data from a DVD-RAM disc 100, an ECC (error correction code) processor 102, track buffer 103, switch 104 for changing track buffer 103 input and output, an encoder 105, and a decoder 106.

As shown in the figure data is recorded to a DVD-RAM disc 100 in sector units as the smallest recording unit. One sector contains 2 KB of data. Sectors are then grouped into ECC blocks with 32 sectors/ECC block. The ECC processor 102 applies error correction to ECC block units.

Figure 4:
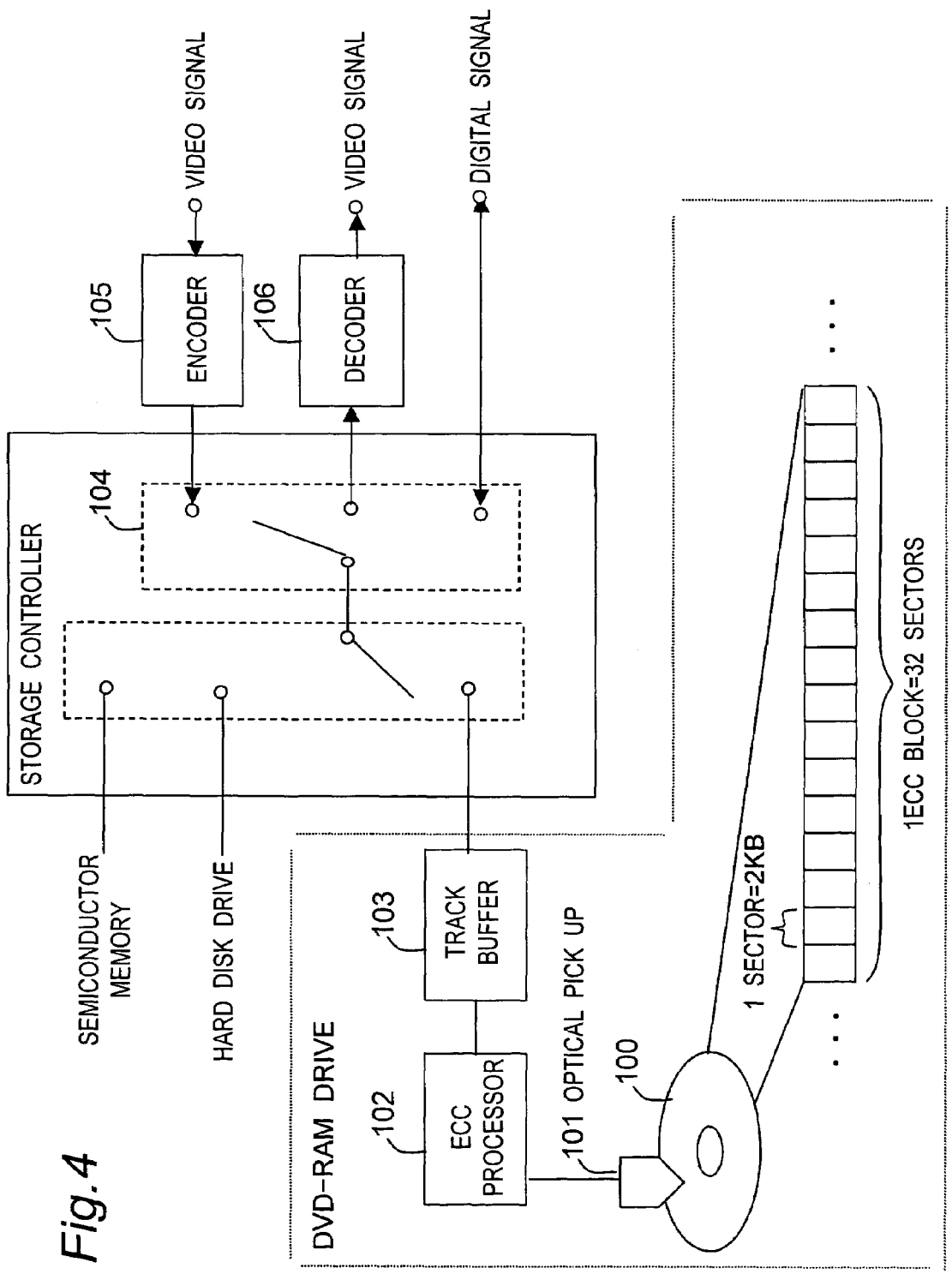
FIG. 4 is a block diagram of a DVD recorder having a semiconductor memory card and hard disk drive.

The DVD recorder may also use semiconductor memory cards or hard disk drives as data storage media in addition to DVD discs. FIG. 4 is a block diagram of a DVD recorder equipped with a semiconductor memory card and hard disk drive in addition to a DVD disc drive.

It should be noted that one sector could be 512 bytes, 8 KB, or other unit. Each ECC block could also contain only 1 sector, or 16 sectors, 64 sectors, or other number of sectors. As the amount of data that can be stored to the disc increases, both the sector size and number of sectors in each ECC block are expected to increase.

The track buffer 103 records AV data at a variable bit rate (VBR) so that AV data can be recorded more efficiently to the DVD-RAM disc 100. The DVD-RAM disc 100 read/write rate (Va) is a fixed rate, but the bit rate (Vb) of the AV data varies according to the complexity of the content (images in the case of video). The track buffer 103 is therefore used as a buffer to absorb this difference between the read/write rate (Va) and AV data bit rate (Vb).

By using this track buffer 103 even more effectively the AV data can be recorded non-contiguously to the disc 100 as described below with reference to FIGS. 3A and 3B.

Figure 3A:
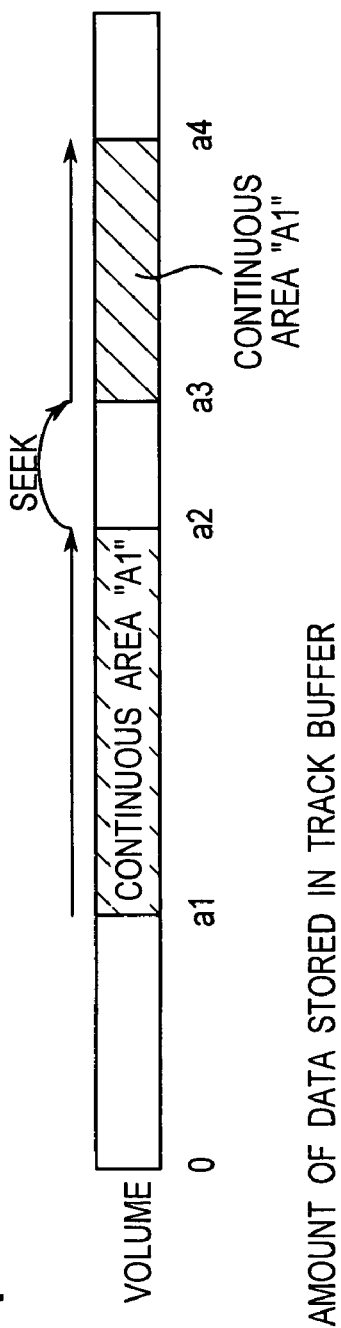
FIG. 3A is a graph illustrating the correlation between data accumulation in a track buffer.
Figure 3B:
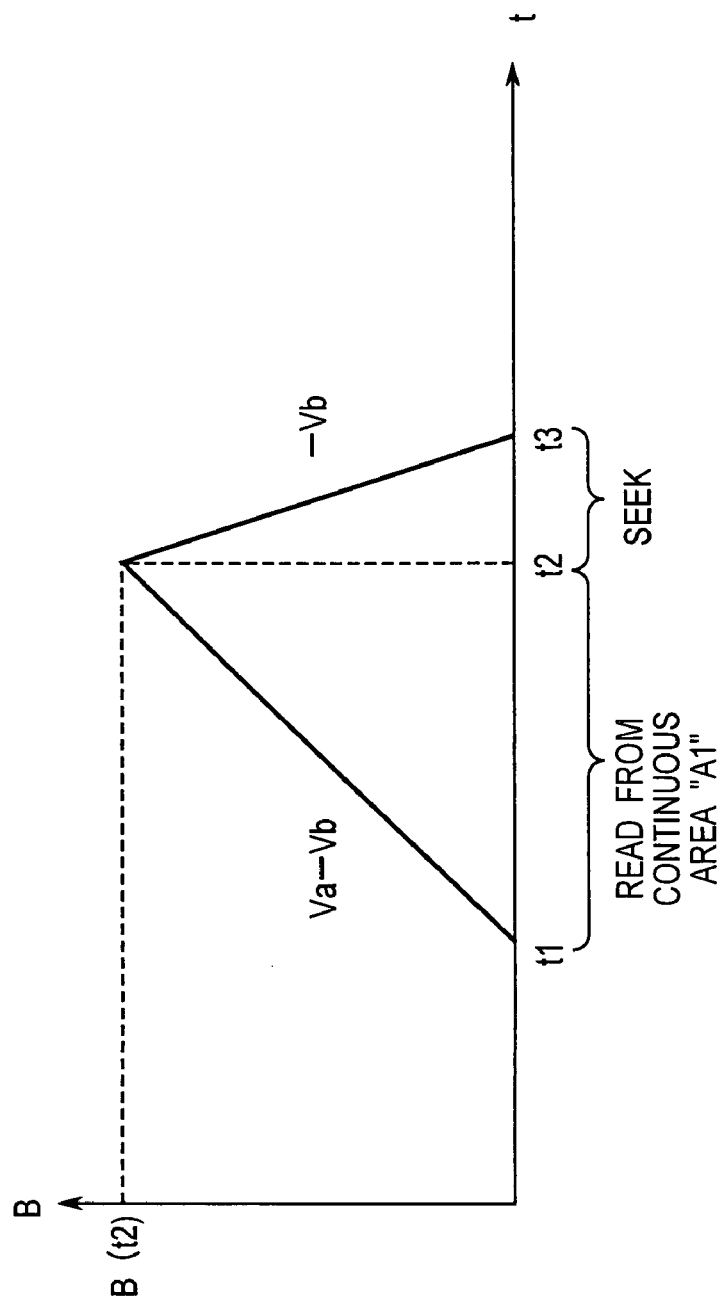
FIG. 3B is a contiguous area on disc.

FIG. 3A shows the address space of an optical disc. When AV data is recorded to contiguous area [a1, a2] and contiguous area [a3, a4] that is non-contiguous to [a1, a2] as shown in FIG. 3A, continuous playback of the AV data while seeking from a2 to a3 can be sustained by supplying data accumulated in the track buffer 103 to the decoder 106. This is shown in FIG. 3B.

AV data read starting from address a1 is input to the track buffer 103 from time t1 while data output from the track buffer 103 also starts. Data thus accumulates in the track buffer 103 at the rate (Va−Vb), that is, the difference between the track buffer input rate Va and the track buffer output rate Vb. This continues to the end of contiguous area [a1, a2] at location a2, that is, time t2. If the amount of data accumulated in the track buffer 103 during this time is B(t2), data can be supplied to the decoder 106 during the period from time t2 to time t3 at which reading from location a3 starts by consuming the data B(t2) stored in track buffer 103.

In other words, if at least a certain minimum amount of data ([a1, a2]) is stored before the seek operation, the AV data can be continuously supplied to the decoder when a seek occurs.

The size of the contiguous area enabling AV data to be continuously supplied to the decoder when converted to the number of ECC blocks N_ecc can be determined from the following equation:

$$N\_ecc = Vb * Tj / ((N\_sec * 8 * S\_size) * (1 - Vb/Va))$$

where N_sec is the number of sectors per ECC block, S_size is the sector size, and Tj is the seek performance (maximum seek time).

There could also be a defective sector in the contiguous area. The size of the contiguous area considering this factor can be determined from the following equation:

$$N\_ecc = dN\_ecc + Vb * (Tj + Ts) / ((N\_sec * 8 * S\_size) * (1 - Vb/Va))$$

where dN_ecc is the tolerated defective sector size, and Ts is the time required to skip a defective sector in the contiguous area. The resulting size is also expressed as the number of ECC blocks.

Reading, that is reproducing, data from a DVD-RAM disc is used by way of example above and it will be obvious that the same concept applies to writing, that is, recording, data to a DVD-RAM disc.

It will thus be apparent that non-contiguously recorded AV data can be continuously reproduced from and recorded to a DVD-RAM disc insofar as a certain minimum amount of data is contiguously recorded to the disc. This area is referred to as a contiguous disc area (CDA) with respect to DVD media.

3. Summary of a DVD Disc

Figure 5A:
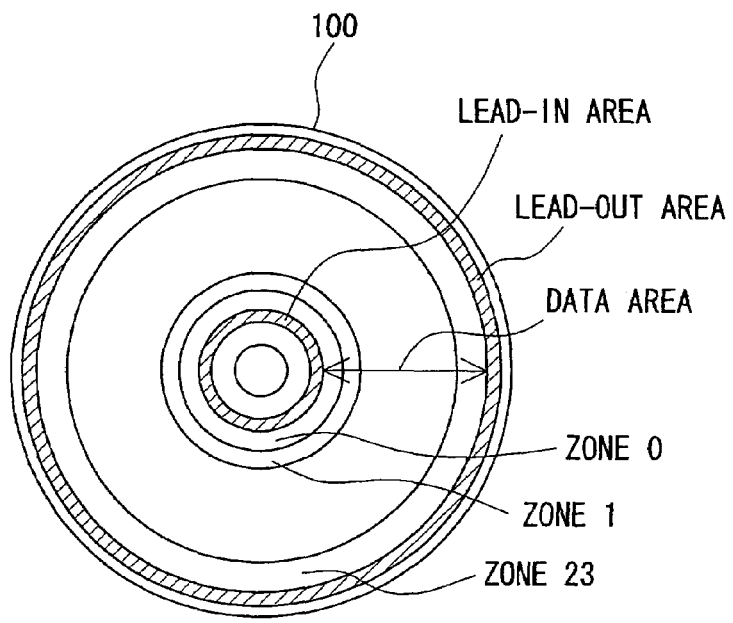
FIG. 5A shows physical structure of a typical disc.
Figure 5B:
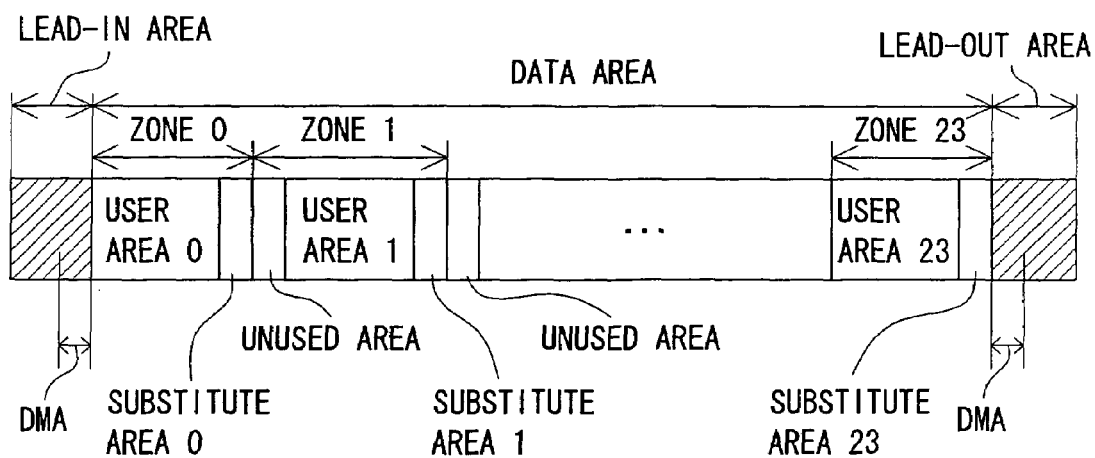
FIG. 5B shows a format of a typical disc.

FIGS. 5A and 5B show a plan view and physical structure of a DVD-RAM disc as a type of recordable optical disc. It should be noted that a DVD-RAM disc is usually loaded to a DVD recorder in a disc cartridge to protect the recording surface of the disc. However, if the recording surface is protected by some other means or a certain amount of surface damage is tolerable, the disc could be loaded directly to the DVD recorder without using a disc cartridge.

DVD-RAM media are phase change recording media. Data recorded to the disc is managed in sector units, and is recorded with an address enabling access. As noted above, 32 sectors are grouped as one error correction unit to which an error correction code is added. This unit is called an ECC block.

FIG. 5A is a plan view showing the recording area of a DVD-RAM disc as exemplary of a recordable optical disc. The DVD-RAM disc has a lead-in area in the center at the inside circumference, a lead-out area around the outside circumference, and a data area between the lead-in area and lead-out area. Reference signals for servo stabilization when the optical pickup accesses the disc, and media identification signals enabling the type of optical disc to be identified, are recorded in the lead-in area. The same reference signals and media ID signals are also recorded to the lead-out area. The data area is segmented into sectors (each storing 2048 bytes) as the smallest access unit.

The data area of a DVD-RAM disc is also segmented into multiple zones so that a rotational control method called Z-CLV (Zone Constant Linear Velocity) can be used for recording and playback.

FIG. 5A shows plural zones formed concentrically on the DVD-RAM disc. In this example the DVD-RAM disc is divided into 24 zones, labelled zone 0 to zone 23. The rotational angular velocity of the DVD-RAM is set differently in each zone such that it increases in proximity to the inside circumference and is constant while the optical pickup accesses data in the same zone. This increases the recording density of the DVD-RAM and enables easier rotational control during recording and playback.

FIG. 5B shows the lead-in area, lead-out area, and zones 0 to 23 concentrically arranged in FIG. 5A when viewed in a line through the disc radius.

The lead-in area and lead-out area each include a defect management area (DMA). The defect management area is for recording location information indicating the location of a sector containing a defect, and substitute sector location information indicating in which substitute area the sector substituted for the defective sector is located.

Each zone includes a user area in the center of the zone, and a substitute area and an unused area at the boundary of the zone. The user area is the area that can be used by the file system as a recording area. The substitute area is the area substituted for a defective sector in the zone. The unused area is an area not used for data recording, and is approximately two tracks wide. The sector address is recorded to the same position in adjacent tracks within each zone, but with Z-CLV the sector address is recorded to a different position in tracks adjacent to the zone boundary. This unused area is therefore provided to prevent sector address detection errors in tracks adjacent to the zone boundary.

There are, therefore, sectors not used for data recording at the zone boundaries. A logical sector number (LSN) is therefore assigned to each physical sector in the user area of a DVD-RAM disc to continuously identify only those sectors used for data recording sequentially from the inside circumference.

FIGS. 6A and 6B show the logical data space of a DVD-RAM disc comprising logical sectors. The logical data space is called the "volume space" and is used to record user data.

Data recorded in the volume space is managed with a file system. More specifically, volume structure information for managing a group of sectors storing data as a "file" and a group of files as a "directory" is recorded to the beginning and end of the volume area. This embodiment of the invention uses the UDF file system as defined in ISO 13346.

The above-noted group of sectors are not necessarily located contiguously within the volume space, and can be split into separate parts. Of the sectors constituting each file, the file system therefore manages each group of contiguous sectors in the volume space as an extent, and manages each file as a set of related extents.

Figure 7A:
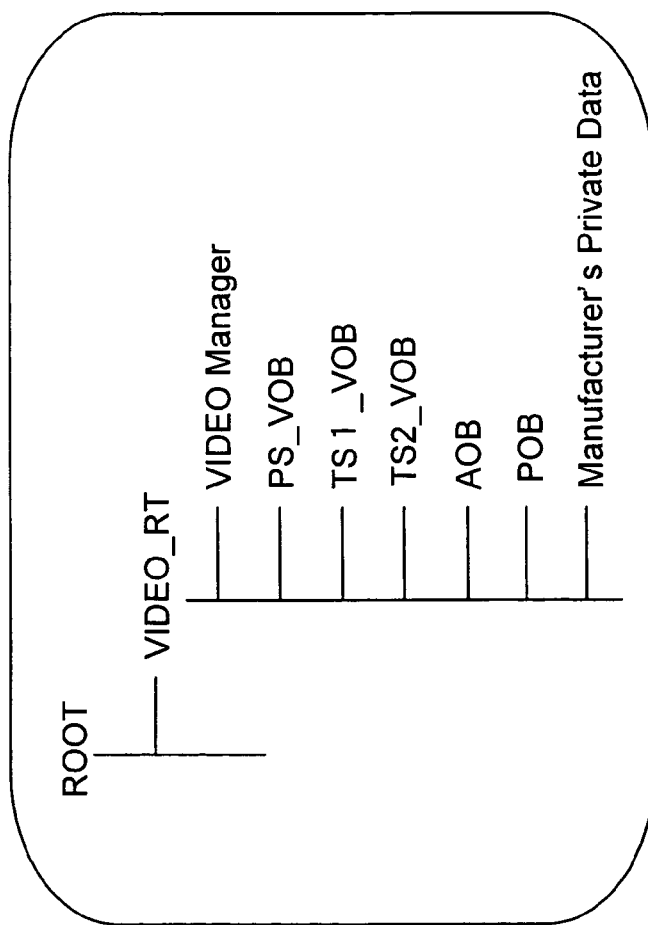
FIG. 7A shows the disc directory.
Figure 7B:
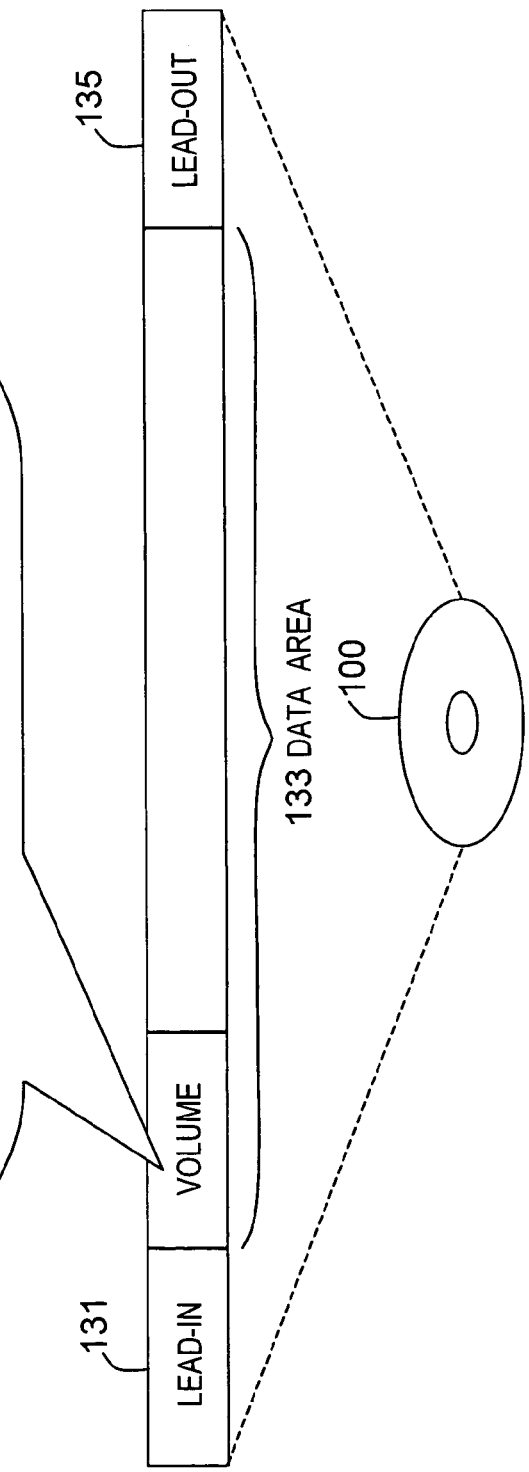
FIG. 7B shows the file structure.

FIGS. 7A and 7B show the structure of a directory and file recorded to DVD-RAM. Below the root directory is the VIDEO_RT directory, and below VIDEO_RT are the various object files containing the playback data and a VIDEO Manager file containing management information such as the playback sequence and various attributes.

Objects are data structures conforming to MPEG standards, and include PS_VOB, TS1_VOB, TS2_VOB, AOB, POB, and MNF (Manufacturer's Private Data).

PS_VOB, AOB, and POB are MPEG program streams (PS), and TS1_VOB and TS2_VOB are MPEG transport streams (TS). The program stream has a data structure designed for storing AV data to package media. The transport stream has a data structure intended for communications media.

PS_VOB, TS1_VOB and TS2_VOB are objects of primarily video data but containing both video data and audio data. In principle, TS1_VOB objects are encoded by the DVD recorder with an explicitly managed internal picture structure. TS2_VOB objects are encoded externally to the DVD recorder, and part of the internal picture structure and data structure is unknown.

Typically, TS1_VOB is an object obtained by encoding externally input analog video signal by the DVD recorder to the transport stream, and TS2_VOB is an object obtained by recording externally input digital video signal directly to the disc without further encoding by the DVD recorder.

AOB and POB are MPEG program streams. AOB objects contain primarily audio data, and POB objects contain primarily still pictures.

The MNF is used to store information specific to a particular manufacturer.

"Primarily video data" and "primarily audio data" above indicate that a high bit rate is allocated. VOB are used in moving picture and similar applications, and AOB are used in music applications.

4. Summary of Reproduced AV Data

Figure 8:
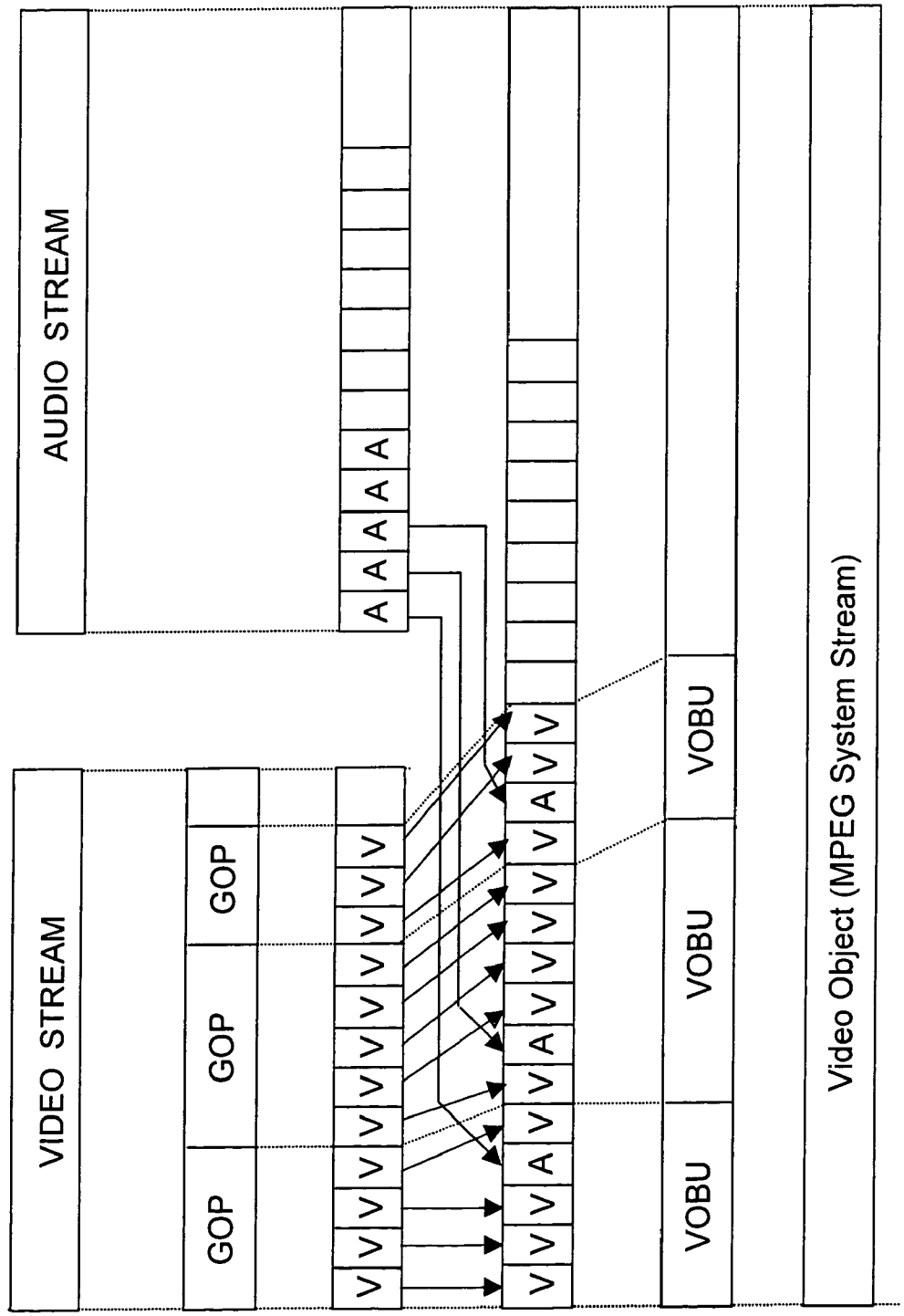
FIG. 8 shows the structure of a video object.

FIG. 8 shows the structure of MPEG data recorded as AV objects to a DVD.

As shown in FIG. 8, the video stream and audio stream are segmented and multiplexed. The MPEG standard refers to the multiplexed streams as the system stream. In the case of DVD, a system stream in which DVD-specific information is set is called a VOB (Video OBject). The segmentation unit is called "pack" or "packet", and is approximately 2 KB in size.

The video stream is encoded according to the MPEG standard, while it is compressed with variable bit rate such that the bit rate is increased in complex images such as images containing much movement. The pictures in an MPEG stream are encoded as I-pictures, P-pictures, or B-pictures. I-pictures are spatially compressed and complete within each frame. P-pictures and B-pictures are temporally compressed using inter-frame correlations. A series of pictures including at least one I-picture is referred to as a Group of Pictures (GOP) in MPEG. GOP is the access point for fast play and other special play modes, which are made possible by the presence of at least one intra-frame compressed I-picture.

In addition to using MPEG audio, the audio stream of a DVD can be encoded using AC-3, LPCM, or other encoding technique.

As also shown in FIG. 8 the Video Object Unit (VOBU) is the data unit multiplexing the video data of a GOP with the associated audio data. VOBU may include information to manage a section of the moving picture achieved by itself as header information.

A program stream (PS) and transport stream (TS) are included in the system stream described with reference to FIG. 8. As noted above, the program stream has a data structure intended for package media and the transport stream data structure is intended for communications media.

Figure 9:
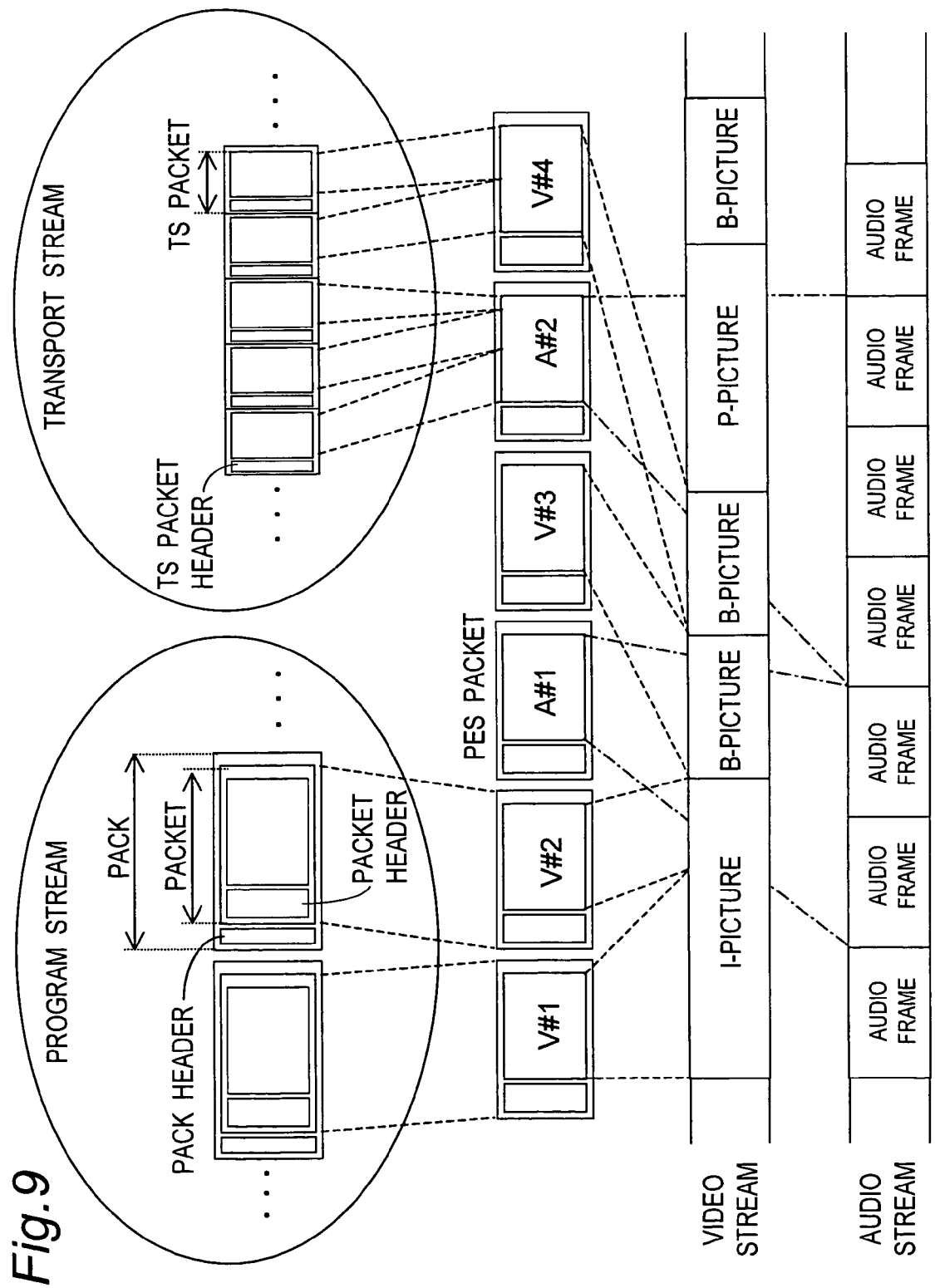
FIG. 9 shows the MPEG system stream.

FIG. 9 shows the concept of the program stream and transport stream data structures.

The program stream contains fixed length packs that are the smallest unit for data transfer and multiplexing. Each pack contains one or more packets. Both packs and packets have a header part and a data part. The data part is referred to as the payload in MPEG. For compatibility with the sector size, the fixed length of a pack in DVD is 2 KB. A pack can contain multiple packets, but because packs storing DVD video and audio contain only one packet, 1 pack equals 1 packet except in special cases.

The data transfer and multiplexing unit of the transport stream contains fixed length TS packets. TS packet size is 188 bytes for compatibility with ATM transmissions, a communications standard. One or more TS packets form a PES packet.

The PES packet concept is common to both the program stream and transport stream, and the data structure is the same. Packets stored in program stream packs directly form PES packets, and a group of one or more transport stream TS packets form a PES packet.

The PES packet is the smallest encoding unit and stores video data and audio data with common encoding. More specifically, video data and audio data encoded with different coding methods are not present in the same PES packet. However, if the coding method is the same, it is not necessary to ensure the picture boundaries and audio frame boundaries. As shown in FIG. 9 plural frames may be stored to one PES packet.

FIGS. 10A to 10C and FIGS. 11A and 11C show the data structures of the transport stream and program stream.

As shown in FIGS. 10A to 10C and FIGS. 12A to 12D, each TS packet contains a TS packet header, adaptation field, and payload. The TS packet header stores a Packet Identifier (PID) whereby the video, audio, or other stream to which the TS packet belongs can be identified.

The Program Clock Reference (PCR) is stored to the adaptation field. The PCR is the reference value for the system time clock (STC) of the device decoding the stream. The device typically demultiplexes the system stream based on the PCR timing, and then reassembles the video stream and other streams.

The Decoding Time Stamp (DTS) and Presentation Time Stamp (PTS) are stored to the PES header. The DTS denotes the decoding timing of the picture or audio frame stored to the PES packet, and the PTS denotes the presentation timing of the video or audio output.

It should be noted that the PTS and DTS need not be written to every PES packet header. Decoding and output are possible insofar as the PTS and DTS are written to the header of the PES packet where the first data of the I-picture is stored.

The TS packet structure is shown in detail in FIGS. 12A to 12D.

As shown in FIGS. 12B to 12D, the adaptation field stores the PCR and a random access presentation flag. This flag indicates whether data that is at the beginning of the video or audio frame and can be used as an access point is stored in the corresponding payload. In addition to the above-noted PID, the TS packet header also stores a unit start indication flag indicating the beginning of a PES packet, and adaptation field control data indicating whether an adaptation field follows.

FIG. 11A to 11C show the structure of packs in the program stream. A pack contains the SCR in the pack header and a stream_id in the packet header of packets stored in the pack. The SCR is effectively identical to the transport stream PCR, and the stream_id to the PID. The PES packet data structure is also the same as in the transport stream, and the PTS and DTS are stored in the PES header.

One major difference between the program stream and transport stream is that the transport stream allows for multiple programs. That is, in terms of program units, the program stream can carry only one program but the transport stream can simultaneously transmit multiple programs. This means that the playback device must be able to identify the video streams and audio streams constituting each program carried in the transport stream.

FIGS. 13A and 13B show the PAT table and PMAP table used to transmit structure information for the audio stream and video stream of each program. As shown in FIGS. 13A and 13B, the PMAP table stores information relating to the combination of video and audio streams used in each program, and the PAT table stores information correlating programs and PMAP tables. The playback device can therefore reference the PAT table and PMAP table to detect the video and audio streams for the program to be output.

How the program stream packs and transport stream TS packets described above are arranged on the disc is described next with reference to FIGS. 14A to 14C.

As shown in FIG. 14A there are 32 sectors in an ECC block.

As shown in FIG. 14B, the packs (PS Packs) forming a video object (PS_VOB) of a program stream type are located at the sector boundaries. This is because the pack size and sector size are both 2 KB.

Video objects (TS1_VOB, TS2_VOB) in the transport stream format, however, is recorded to have a 188 byte packet paired with a 4 byte Arrival Time Stamp (ATS) denoting the decoder input time. When recording an externally encoded stream, the ATS is generated and added by the DVD recorder, and indicates the timing at which the packet was received by the DVD recorder from an external source.

5. Summary of AV Data Management Information and Playback Control

FIGS. 15A and 15B and FIGS. 16A and 16B show the data structure of the video management information file (Video Manager) shown in FIGS. 7A and 7B.

The video management information includes object information describing such management information as where objects are recorded on disc, and playback control information describing the playback sequence of the objects.

FIG. 15 shows an example in which the objects recorded to the disc include PS_VOB#1-PS_VOB#n, TS1_VOB#1-TS1_VOB#n, and TS2_VOB#1-TS2_VOB#n.

As shown in FIGS. 15A and 15B, a PS_VOB information table, TS1_VOB information table, and TS2_VOB information table are separately recorded according to the object types. Each of these tables stores VOB information for each object.

The VOB information includes general information about the corresponding object, object attribute data, an access map for converting the object playback time to a disc address value, and management information for the access map. The general information includes identification information for the corresponding object and object recording time. The attributes include video stream attributes (V_ATR) such as the video stream coding mode, the number of audio streams (AST_Ns), and audio stream attributes (A_ATR) such as the audio stream coding mode.

There are two reasons why an access map is required. The first is so that program chain information (playback path information to define a playback path) avoids directly referencing object recording positions based on a sector address value, for example, and instead can indirectly reference object locations based on the object playback time. Object recording positions can change with RAM media as a result of editing the object, for example. This increases the amount of program chain information that must be updated if the program chain information references object recording positions directly based on the sector address. If the objects are referenced indirectly based on the playback time, however, it is not necessary to update the program chain information and only the access map needs to be updated.

The second reason is that the audio stream typically has two reference bases, the time base and data (bit stream) base, but the correlation therebetween is not perfect.

For example, using a variable bit rate (a method of changing the bit rate according to the complexity of the image) is becoming the norm with MPEG-2 Video, an international standard for video stream encoding. In this case there is no proportional relationship between the amount of data from the stream start and playback time, and random access based on the time base is therefore not possible. An access map is used to resolve this problem by converting between the time base and data (bit stream) base.

As shown in FIG. 15A, the playback control information includes a user-defined program chain information table, original program chain information table, and title search pointer.

Figure 16A:
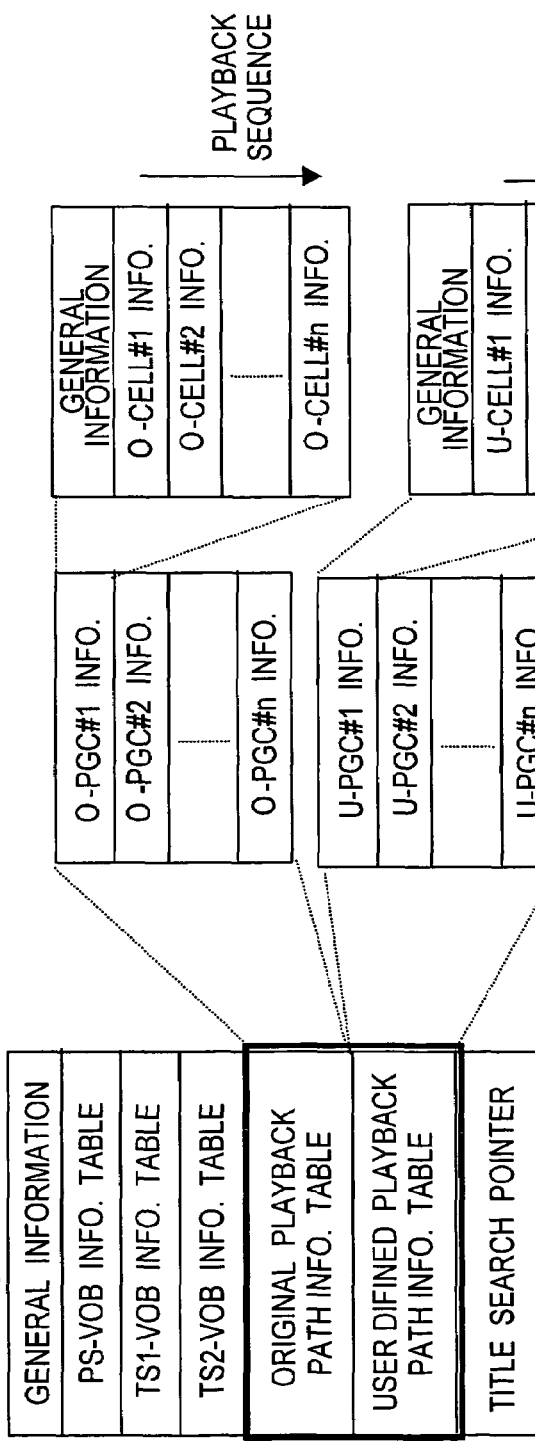
FIGS. 16A and 16B show the data structure of video management information.

As shown in FIG. 16A there are two types of program chain information: originally defined program chain information generated automatically by the DVD recorder to describe all objects recorded during object recording, and user-defined program chain information enabling a user to freely define a particular playback sequence. The program chain information is uniformly referred to as PGC information on a DVD, the user-defined program chain information is referred to as the U_PGC information, and the original program chain information as the O_PGC information. The U_PGC information and O_PGC information are tables listing the cell information describing the cells in the object playback period. The object playback period indicated by the O_PGC information is called an original cell (O_CELL), and the object playback period indicated by the U_PGC information is called a user cell (U_CELL).

A cell indicates the object playback period using the object playback start time and playback end time; the playback start and end times are converted by the access map described above to the actual location where the object is recorded on disc.

Figure 16B:
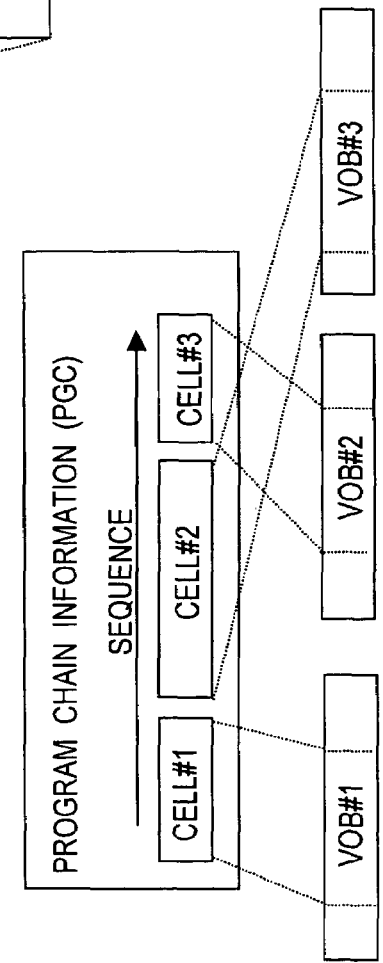

As shown in FIG. 16B a cell group indicated by the PGC information defines a continuous playback sequence reproduced sequentially according to the order of entries in the table.

FIG. 17 shows a specific relationship between objects, cells, PGC, and access map.

As shown in FIG. 17 the original PGC information 50 contains at least one cell information 60, 61, 62, 63.

Each cell information 60, 61, . . . defines the object to be reproduced as well as the object type, and object playback period. The order of the cell information in the PGC information 50 defines the playback sequence of the objects defined by each cell when the objects are reproduced.

Each cell information (cell information 60, for example) includes a Type 60a indicating the type of specific object, an Object ID 60b identifying a particular object, and a start presentation time Start_PTM 60c and end presentation time End_PTM 60d in the object on the time base.

During data playback, the cell information 60 is sequentially read from the PGC information 50, and the objects specified by each cell are reproduced for the playback period defined by the cell.

The access map 80c converts the start and end time information contained in the cell information to the object address on disc.

This access map is the map information described above and is generated and recorded when the objects are recorded. The picture structure of the object data must be analyzed in order to generate the map. More specifically, it is necessary to detect the I-picture location shown in FIG. 9, and detect the PTS and other time stamp data, that is, the I-picture playback time shown in FIG. 10 and FIG. 11.

Problems occurring when generating the PS_VOB, TS1_VOB, and TS2_VOB map information are described next.

As described with reference to FIG. 1, the PS_VOB and TS1_VOB are primarily generated by the DVD recorder encoding a received analog broadcast to an MPEG stream. The I-picture and time stamp data are therefore generated by the DVD recorder, the internal data structure of the stream is known to the DVD recorder, and the map information can be generated with no problem.

As also described with reference to FIG. 1, the. TS2_VOB is a received digital broadcast recorded directly to the disc by the DVD recorder with no intermediate encoding. Because the recorder thus does not generate the time stamp information and determine the I-picture locations as it does when recording a PS_VOB, the DVD recorder does not know the internal data structure of the stream and must therefore detect this information from the recorded digital stream.

To do this the DVD recorder detects the I-picture and time stamp information as described below for the map information of a TS2_VOB recording a stream encoded externally to the recorder.

First, I-pictures are detected by detecting the random access indication information (random_access_indicator) of the TS packet adaptation field shown in FIG. 12 or detecting the unit start indication information (payload_unit_start_indicator) in the TS packet header. The time stamp is detected by detecting the PTS in the PES header. Note that the PCR from the adaptation field or the TS packet arrival time at the DVD recorder can be used instead of the PTS for the time stamp. In any case, the DVD recorder detects I-picture locations based on information in a high level system layer and does not need to analyze the data structure of the MPEG stream video layer. This is because the system overhead required to analyze the video layer in order to generate the map information is great.

There are also cases in which system layer detection is not possible. The map information cannot be generated in such cases and it is therefore necessary to indicate that there is no valid map information. The DVD recorder indicates this using the map management information shown in FIG. 15(b).

The map management information shown in FIG. 15(b) contains map validity information and a self-encoding flag. The self-encoding flag indicates that an object was encoded by the DVD recorder, and thus indicates that the internal picture structure is known and that the map information time stamp information and I-picture location information is accurate. The map validity information indicates whether or not there is a valid access map.

Examples of when the system layer cannot be detected include when the adaptation field is not set and when the digital stream is not an MPEG transport stream. Various digital broadcasting standards and formats are used around the world, and there will naturally be cases in which the DVD recorder records objects for which it cannot generate a map. For example, if a DVD recorder designed for the Japanese market and recording digital broadcasts in Japan is used in the United States to record digital broadcasts in the United States, there will likely be cases in which the DVD recorder cannot generate a map for the recorded objects.

The DVD recorder can, however, sequentially reproduce from the beginning objects for which map information is not generated. In this case video from the recorded digital stream can be reproduced by outputting it through a digital interface to a STB appropriate to the stream.

6. Basic Operation of the Playback Function

The playback operation of a DVD recorder/player for reproducing content recorded to an optical disc as described above is described next below with reference to FIG. 18.

Figure 18:
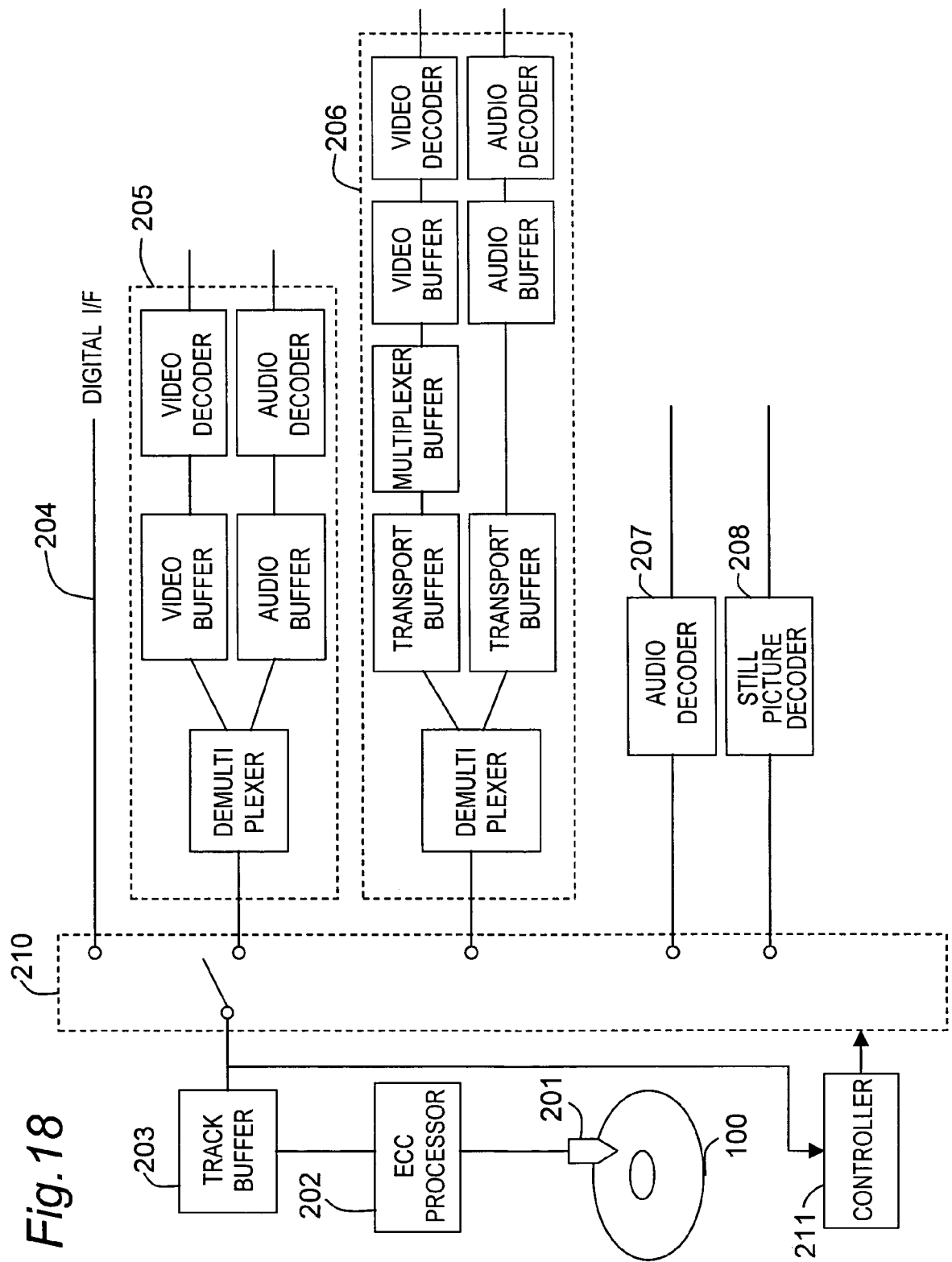
FIG. 18 is a block diagram showing the functional configuration of a playback (reproducing) apparatus.

As shown in FIG. 18 the DVD player has an optical pickup 201 for reading data from the optical disc 100, an ECC processor 202 for error correction processing of the read data, a track buffer 203 for temporarily storing the read data after error correction, a PS decoder 205 for reproducing video objects (PS_VOB) and other program streams, a TS decoder 206 for reproducing digital broadcast objects (TS2_VOB) and other transport streams, an audio decoder 207 for reproducing audio objects (AOB), a still picture decoder 208 for decoding still picture objects (POB), a switching means 210 for changing data input to the decoders 205 to 208, and a controller 211 for controlling the various parts of the player.

Data recorded to the optical disc 100 is read by the optical pickup 201, passed through the ECC processor 202 and stored to track buffer 203. Data stored to the track buffer 203 is then input to and decoded and output by the PS decoder 205, TS decoder 206, audio decoder 207, or still picture decoder 208.

The controller 211 determines what data to read based on the playback sequence defined by the program chain information (PGC) shown in FIGS. 16A and 16B. Using the example shown in FIGS. 16A and 16B, the controller 211 thus first reproduces part (CELL #1) of VOB #1, then part (CELL #2) of VOB #3, and finally VOB #2 (CELL #3).

Using the cell information of the program chain information (PGC) shown in FIG. 17, the controller 211 can also capture the type of cell reproduced, corresponding objects, and the playback start and end times of the objects. The controller 211 inputs data for the object period identified from the cell information to the appropriate decoder.

The controller 211 also identifies the objects to be reproduced based on the Object ID of the cell information. The controller 211 also identifies the cell, which is the playback period of the identified object, by converting the Start_PTM and End_PTM of the cell information to a disc address value by referencing the access map of the corresponding VOB information.

A player according to this embodiment of the invention also has a digital interface 204 for supplying the AV stream to an external device. It is therefore possible to supply the AV stream to an external device through an IEEE 1394, IEC 958, or other communications means. This is so that, for example, when the player does not have an internal decoder for decoding a TS2_VOB not encoded by the recorder/player the TS2_VOB can be output directly without decoding through the digital interface 204 to an external STB for decoding and presentation via the STB.

When the digital data is directly output to an external device, the controller 211 determines whether random access playback is possible based on the map information shown in FIG. 15(*b*). If the access point data flag (random access presentation flag) is valid, the access map contains I-picture location information. In this case the controller 211 is able to access and output digital data containing an I-picture to an external device through the digital interface in response to fast play and other requests from the external device. Furthermore, time-base access is also possible if the time access information flag is valid. In this case the controller 211 can access and output digital data including the picture data at a specified playback time to an external device through the digital interface in response to a time-base access request from an external device.

7. Basic Operation of the Recording Function

The configuration and operation of a DVD recorder according to the present invention for recording and reproducing an optical disc as described above is described next below with reference to FIG. 19.

Figure 19:
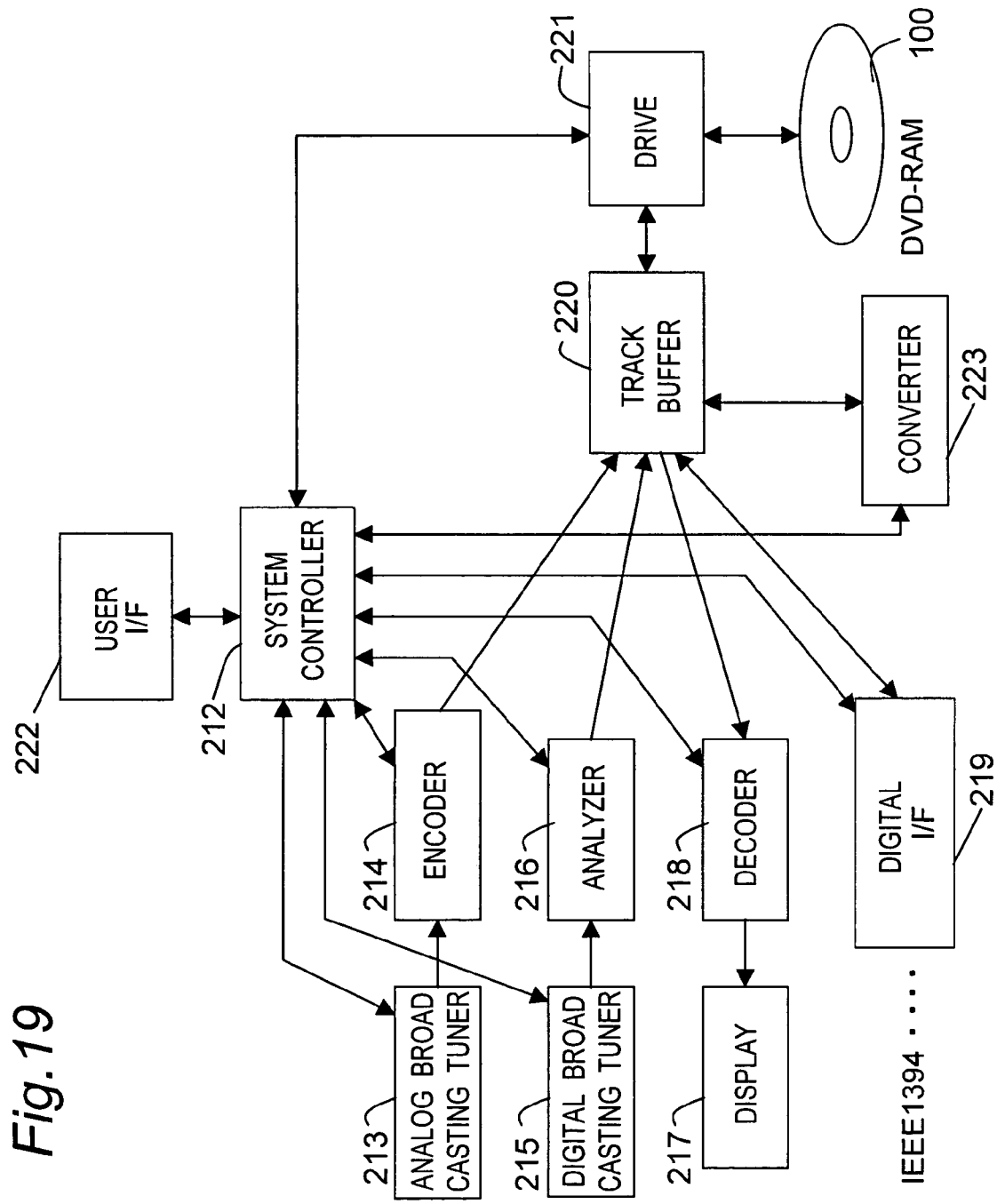
FIG. 19 is a block diagram showing the functional configuration of a recording apparatus.

As shown in FIG. 19 the DVD recorder has a user interface 222 for receiving user requests and displaying information and prompts to the user, a system controller 212 for handling the overall management and control of the DVD recorder, an analog broadcast tuner 213 for receiving VHF and UHF broadcasts, an encoder 214 for converting analog signals to digital signals and encoding the digital signals to an MPEG program stream, a digital broadcast tuner 215 for receiving digital satellite broadcasts, an analyzer 216 for interpreting the MPEG transport stream sent from a digital satellite, a presentation unit 217 such as a television and speakers, and a decoder 218 for decoding the AV stream. The decoder 218 has first and second decoders, for example, such as shown in FIG. 18. The DVD recorder also has a digital interface 219, track buffer 220 for temporarily storing write data, a drive 221 for writing data to the disc, and a converter 223. The digital interface 219 is an IEEE 1394 or other communications interface for outputting data to an external device. The converter 223 converts the transport stream to a program stream according to the flow chart shown in FIG. 37 and described further below.

With a DVD recorder thus comprised the user interface 222 first receives a request from the user. The user interface 222 then passes the request to the system controller 212, and the system controller 212 interprets the user request and instructs the various modules to run appropriate processes.

Recording includes self-encoding in which the DVD recorder encodes the input digital data, and outside encoding for recording already encoded digital data to disc without further encoding.

7.1 Recording by Self-Encoding

Recording with self-encoding is described first below using by way of example encoding and recording an analog broadcast to a PS_VOB stream.

The system controller 212 sends a receive command to the analog broadcast tuner 213 and an encode command to the encoder 214.

The encoder 214 then video-encodes, audio-encodes, and system-encodes the AV data from the analog broadcast tuner 213, and passes the encoded data to the track buffer 220.

Immediately after encoding starts, the encoder 214 sends the time stamp data at the beginning of the MPEG program stream being encoded to the system controller 212 as the playback start time (PS_VOB_V_S_PTM), and parallel to the encoding process sends the data required to create the access map to the system controller 212. This value is set as the Start_PTM of the cell information shown in FIG. 17 and generated later. The time stamp information is generally the PTS, but the SCR can be used instead.

The system controller 212 then sends a record command to the drive 221, and the drive 221 thus extracts and records data accumulated in the track buffer 220 to the DVD-RAM disc 100. A contiguous data area (CDA) as described above is also found in the recordable area of the disc and the data is recorded to the located contiguous data area.

Recording typically ends when the user inputs a stop recording command. Stop recording commands from the user are input through the user interface 222 to the system controller 212, and the system controller 212 then sends a stop command to the analog broadcast tuner 213 and encoder 214.

The encoder 214 stops encoding when it receives the stop encoding command from the system controller 212, and sends the time stamp data of the last data in the last encoded MPEG program stream to the system controller 212 as the playback end time (PS_VOB_V_E_PTM). This value is set as the End_PTM of the cell information shown in FIG. 17. The PTS is normally used for the time stamp information but the SCR can be used instead.

After ending the encoding process the system controller 212 generates the playback control information and VOB information (PS_VOBI) for the PS_VOB shown in FIG. 15.

The VOB information generated here includes map management information and an access map appropriate to the object type. The system controller 212 sets the map validity information of the map management information to "valid," and sets the self-encoding flag ON.

Original playback information (O_PGC information, see FIGS. 16A and 16B) in which the object to be recorded is one of the playback objects is generated as the playback control information. This O_PGC information is added to the original program chain information table. The original program chain information (O_PGC information) contains cell information. The cell information Type is set to PS_VOB.

The system controller 212 then instructs the drive 221 to stop recording data accumulated in the track buffer 220 and to record the VOB information (PS_VOBI) for PS_VOB and playback control information. The drive 221 thus records this information and the remaining data in the track buffer 220 to the optical disc 100, and the recording process ends.

It will be obvious that an analog broadcast could be encoded to TS1_VOB. In this case the encoder 214 must be an encoder for converting the analog signal to a digital signal and encoding the digital signal to the MPEG transport stream, and the type information in the cell information is set to TS1_VOB. The PTS or PCR can be used for the Start_PTM and End_PTM.

7.2 Recording by Outside Encoding

Recording with outside encoding is described next below with reference to recording a digital broadcast. The recorded object type in this case is TS2_VOB.

A digital broadcast recording request from the user is passed from the user interface 222 to the system controller 212. The system controller 212 then instructs the digital broadcast tuner 215 to receive and instructs the analyzer 216 to analyze the received data.

An MPEG transport stream sent from the digital broadcast tuner 215 is passed through the analyzer 216 to the track buffer 220.

To generate the VOB information (TS2_VOBI) of the encoded MPEG transport stream (TS2_VOB) received as a digital broadcast, the analyzer 216 first extracts the time stamp data at the beginning of the transport stream as the start time information (TS2_VOB_V_S_PTM) and sends it to the system controller 212. This start time value is set as the Start_PTM of the cell information shown in FIG. 17 and generated later. The time stamp information is the PCR or PTS. The timing at which the object is sent to the DVD recorder could alternatively be used.

The analyzer 216 then analyzes the system layer of the MPEG transport stream to detect the information needed for access map generation. The I-picture locations in the object are detected based on the random access indicator (random_access_indicator) in the adaptation field of the TS packet header as described above, or the unit start indication information (payload_unit_start_indicator) in the TS packet header.

The system controller 212 then outputs a record command to the drive 221, and the drive 221 thus extracts and records data accumulated in the track buffer 220 to the DVD-RAM disc 100. The system controller 212 also instructs the drive 221 where to record on the disc based on the file system allocation data. A contiguous data area (CDA) as described above is also found in the recordable area of the disc and the data is recorded to the located contiguous data area.

Recording typically ends when the user inputs a stop recording command. Stop recording commands from the user are input through the user interface 222 to the system controller 212, and the system controller 212 then sends a stop command to the digital broadcast tuner 215 and analyzer 216.

In response to the received stop command from the system controller 212, the analyzer 216 stops analyzing the received data and sends the time stamp data at the end of the last analyzed MPEG-TS to the system controller 212 as the playback end time (TS2_VOB_V_E_PTM). This value is set as the End_PTM of the cell information shown in FIG. 17. The PCR or PTS is used for the time stamp information but the timing when the object was sent to the DVD recorder can be used instead.

After ending the digital broadcast reception process, the system controller 212 generates the playback control information and VOB information (TS2_VOBI) for the TS2_VOB as shown in FIG. 15 based on the information received from the analyzer 216.

The VOB information generated here includes map management information and an access map appropriate to the object type. The system controller 212 sets the map validity information of the map management information to "valid" when the I-picture locations in the objects were detected and the access map could be generated. The self-encoding flag is set OFF. When a valid access map could not be generated the map validity information is set to an "invalid" state. Examples of when a valid access map cannot be generated include when a corresponding digital broadcast is not received and when there is no random access information set in the adaptation field. When the signal is input directly through the digital interface the signal may also not be an MPEG transport stream, and in this case, too, the map validity flag is set to "invalid."

Original playback information (O_PGC information) as shown in FIGS. 16A and 16B for the recorded object as one of the playback objects is generated as the playback control information. This O_PGC information is added to the original program chain information table. The original program chain information O_PGC information) contains cell information of which type information is set to "TS2_VOB".

The system controller 212 then instructs the drive 221 to stop recording data accumulated in the track buffer 220 and to record the VOB information (TS2_VOBI) for TS2_VOB and playback control information. The drive 221 thus records this information and the remaining data in the track buffer 220 to the optical disc 100, and the recording process ends.

While the above recording operations are described with reference to recording start and end commands input by the user, it will be obvious that the same essential operation applies to timer recordings such as used in a VCR, for example. In this case the system controller automatically issues the recording start and end commands instead of the user, and there is no essential change in DVD recorder operation.

8. Main Concept of the Invention

A data recording medium according to the present invention is a medium for recording data of various different formats, including analog broadcast or digital broadcast content and various types of data input through an analog/digital interface. A data recording apparatus according to the present invention is an apparatus for recording AV data to the same data recording medium.

More particularly, externally input AV data is recorded as an MPEG-TS, and a stream adding decoder input time information (time stamp information) for each MPEG-TS packet is recorded to each MPEG-TS packet is recorded to the data recording medium of the present invention. The time stamp information added to the MPEG-TS packets and the time stamp information added to the MPEG-PS packs after conversion are correlated based on a specific relation.

Figure 20:
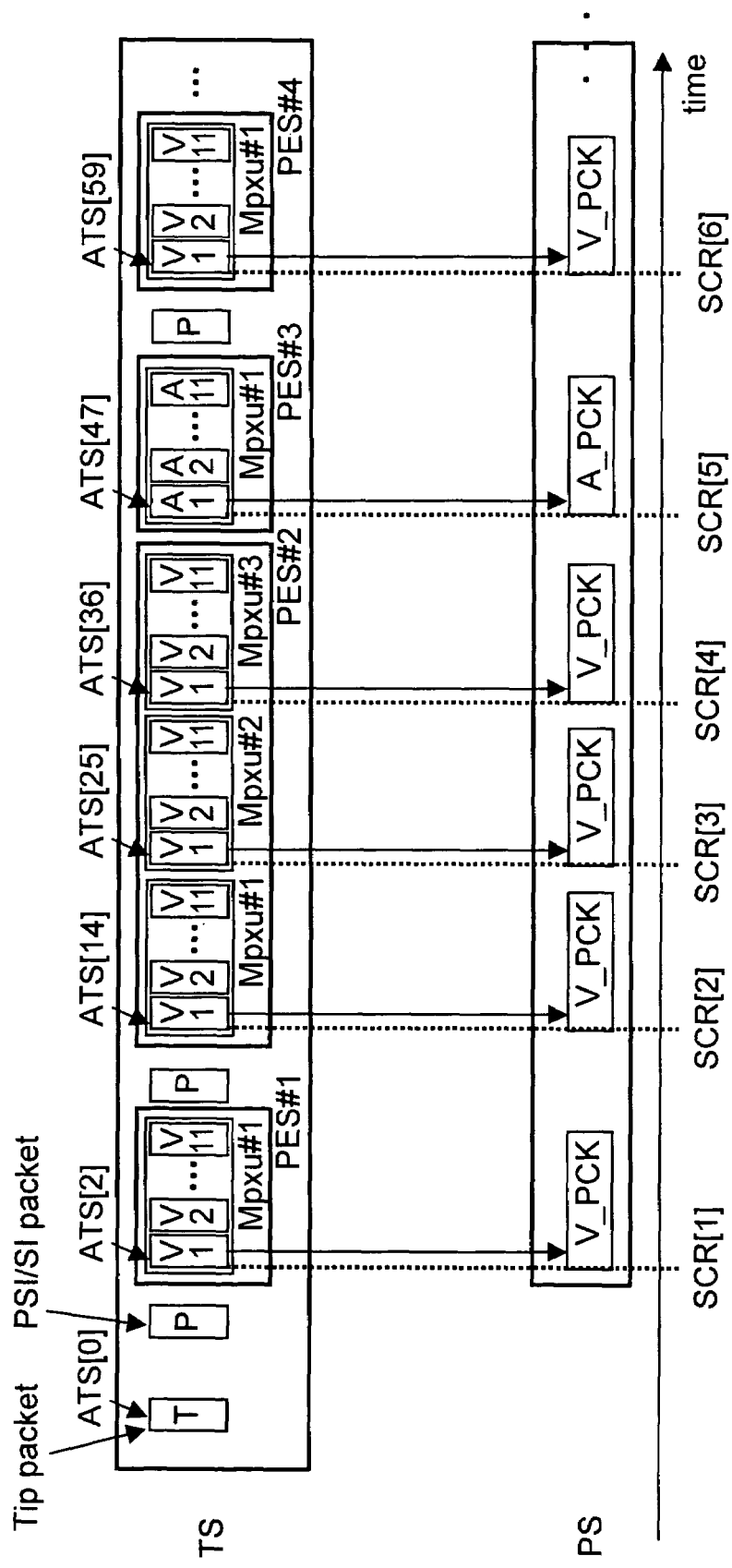
FIG. 20 describes the correlation between an MPEG-TS encoded for easy conversion to an MPEG-PS, and the MPEG-PS after conversion.

FIG. 20 shows an MPEG transport stream (MPEG-TS) and the conversion of an MPEG-TS to an MPEG program stream. As shown in this figure the MPEG-TS contains a PSI (Program Specific Information) packet containing MPEG-TS control information, places recorder-specific and content-specific information in a private use stream (Tip packet), and records the decoder input time (ATS) for each packet in a format appropriate to accumulation.

For easier conversion from a multiplexed MPEG-TS to an MPEG-PS, a specific number (one or more) of MPEG-TS packets are system-encoded to one continuous unit for multiplexing (multiplexing unit) for recording as an MPEG-TS. One multiplexing unit is determined so that data amount of one multiplexing unit corresponds to that of one MPEG-PS data pack. Introducing this multiplexing unit concept makes it simple to convert from an MPEG-TS to MPEG-PS by simply converting MPEG-TS packets in multiplexing units to MPEG-PS video packs or audio packs, and an MPEG-TS can therefore be easily converted to an MPEG-PS.

9. Detailed Description of the Embodiments
9.1 Encoder Configuration

The encoder of a data recording apparatus according to the present invention is described next below using by way of example self-encoding AV input to an MPEG-TS.

Figure 21:
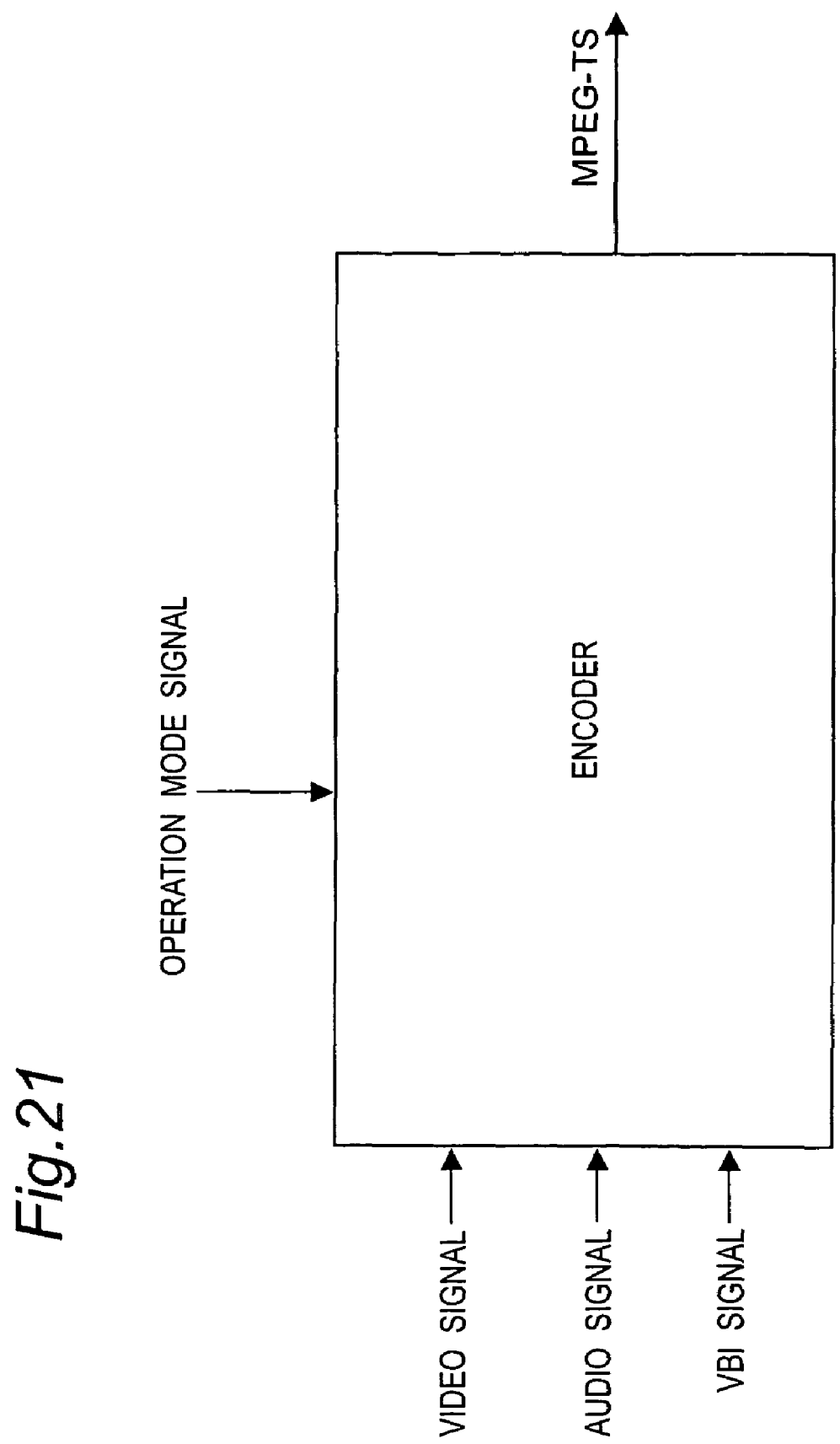
FIG. 21 is a block diagram of the encoder of a data recording apparatus according to the present invention.
Figure 22:
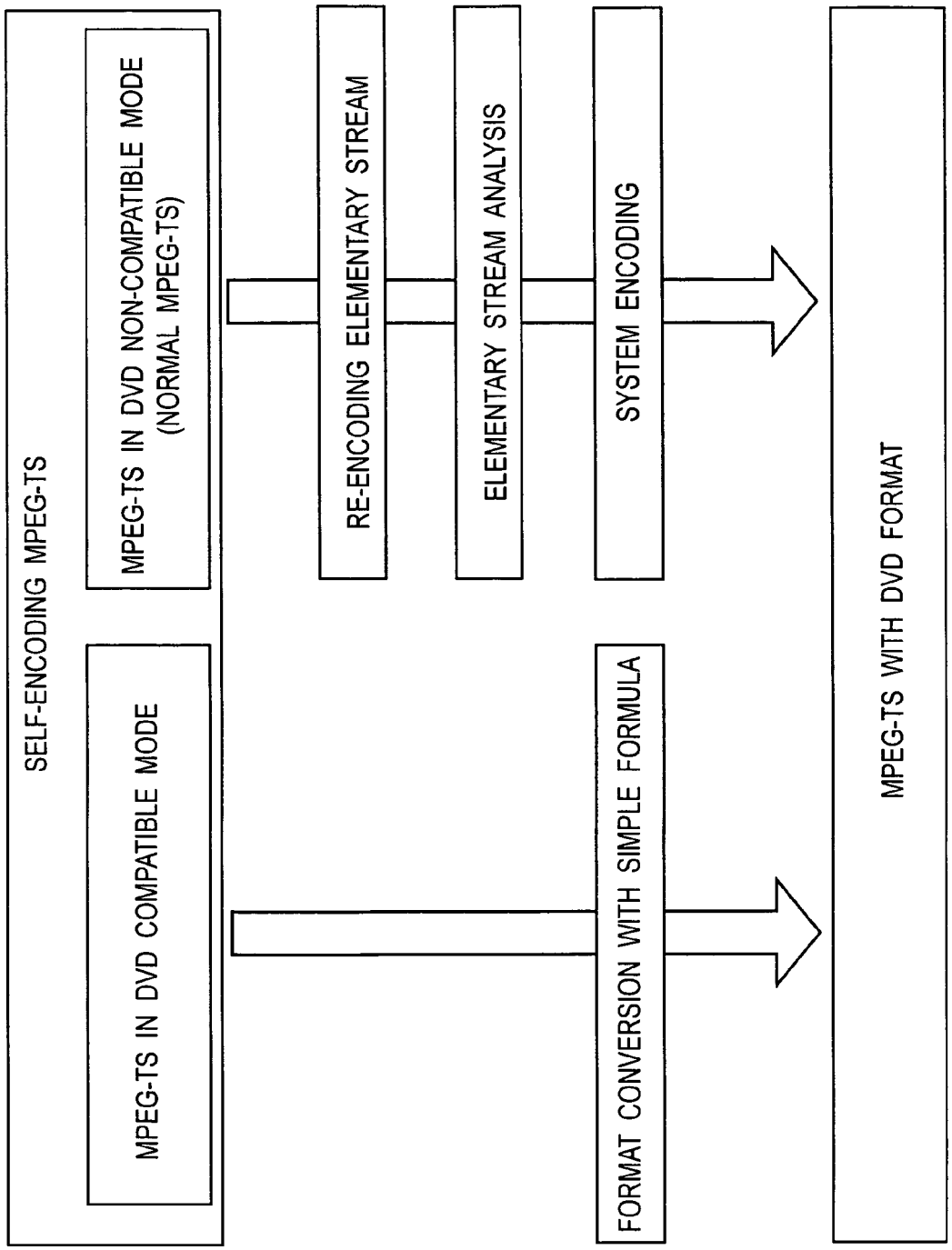
FIG. 22 shows differences in processes for converting from a self-encoded MPEG-TS to DVD formats due to differences in system encoding.

The configuration of an encoder in a data recording apparatus according to the present invention is shown in FIG. 21. The encoder receives video, audio, and vertical blanking interval (VBI) signals to encode them to a transport stream.

Encoder operating modes include a DVD-Video compatibility mode, DVD Video Recording compatibility mode, and a normal mode. The encoder generates an MPEG-TS that can be easily converted by the method further described below to the DVb-Video standard when in the DVD-Video compatibility mode, generates an MPEG-TS that can be easily converted by the method described below to the DVD. Video Recording ("DVD VR" below) standard when in the DVD Video Recording compatibility mode, and generates an MPEG-TS having specific attributes when in the normal mode. When recording in the normal mode it is acceptable to use audio coding methods other than those defined by the DVD standards, and tolerance values in the video coding method (such as the GOP length) may be outside the range of values defined by the DVD standards.

9.2 Self-Encoded MPEG-TS

A preferred embodiment of an MPEG-TS format self-encoded by a data recording apparatus according to the present invention is described below, specifically describing the differences between a normal MPEG-TS (below labelled "SESF") and an MPEG-TS that can be easily converted to an MPEG-PS (below called a "Constrained SESF").

In the example described below, each MPEG-TS stream stores information describing encoding conditions for the stream in a VOBI storing attribute information. By thus storing information describing encoding conditions in the management information, that is, outside the stream, it can be quickly determined whether or not the stream can be easily converted to a DVD-Video or DVD VR format without analyzing the stream. This information about the stream encoding conditions can be stored to the Tip packet (described below).

These stream encoding conditions are stored in a 2-bit "encode_condition" flag. The values of this flag are defined below.

00b: normal MPEG-TS (SESF)
01b: MPEG-TS that can be easily converted to a stream in DVD VR format (Constrained SESF)
10b: reserved
11b: MPEG-TS that can be easily converted to a stream in DVD-Video format (Constrained SESF)

Whether a stream can be easily converted to a DVD-Video or DVD VR stream format can thus be easily determined by reading the encode_condition field of the VOBI set as described above. It will be noted that "easily converted" as used herein means convertible by the method described below.

9.3 Constrained SESF Stream Format

Figure 55:
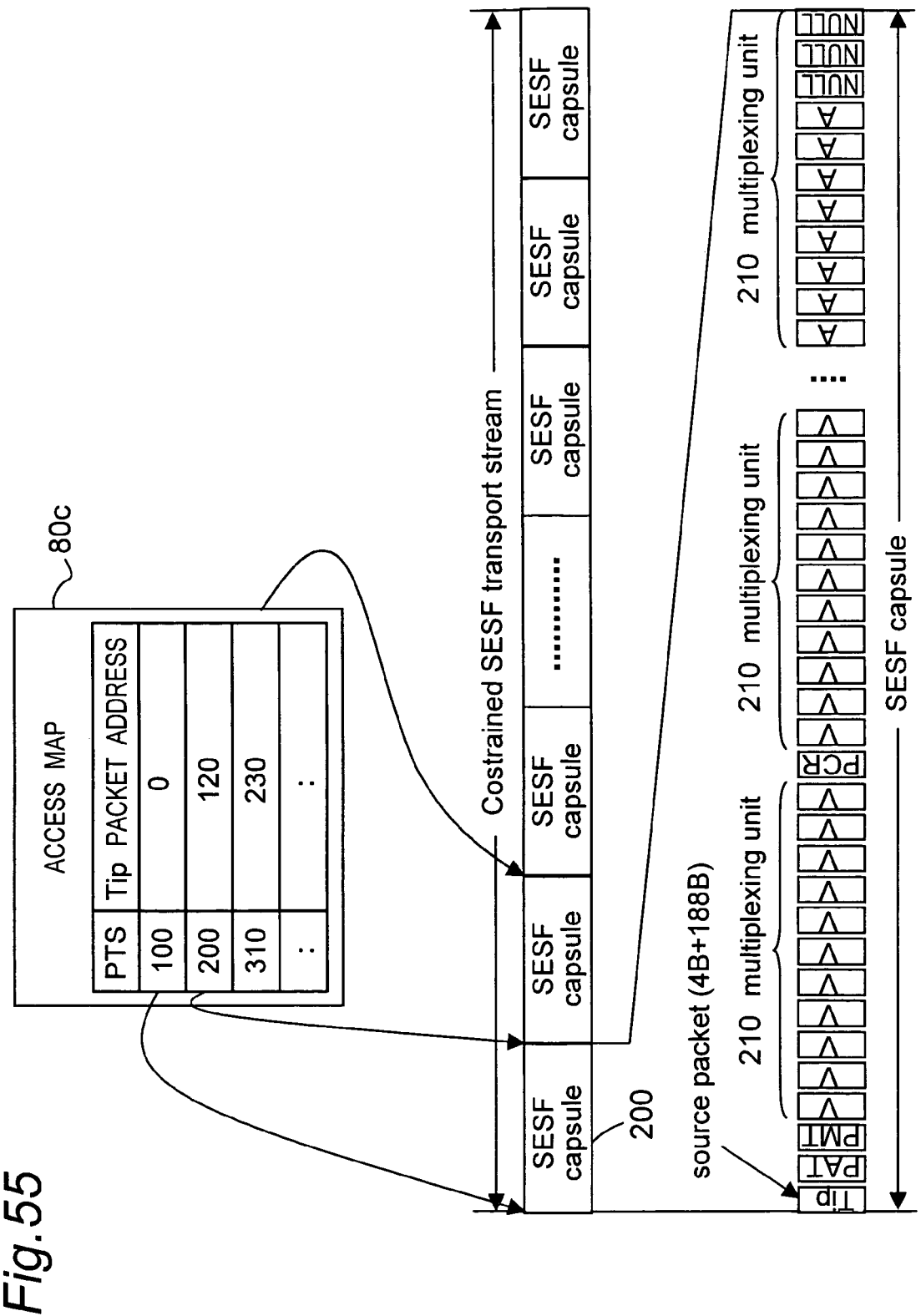
FIG. 55 shows the Constrained SESF stream format.

The stream format of a Constrained SESF transport stream is shown in FIG. 55. A Constrained SESF contains plural SESF capsules. A SESF capsule starts with a Tip packet (described in detail below) and contains a specified number of multiplexing units. The presentation time stamp (PTS) of each SESF capsule and the Tip packet address information is correlated by an address map. As will become clear below, in TS2PS conversion, a conversion process is performed for each SESF capsule.

FIG. 20 shows the correlation between each packet in one SESF capsule and MPEG-PS packs. As shown in FIG. 20 a TS packet (referred to as a Tip packet below) storing specific information about the stream is inserted to a Constrained SESF. The Tip packets embedded in a Constrained SESF are described below with reference to FIG. 23 to FIGS. 29A and 29B.

<Tip Packet>

FIG. 23 shows the complete structure of a Tip packet. As shown here each Tip packet stores a Data_ID identifying the packet as a Tip packet, display_and_copy_info corresponding to DCI_CCI field of DVD VR and containing display control and copy control information, encode_info storing stream encoding information, and MakersPrivateData storing data specific to the manufacturer and added by the manufacturer.

As shown in FIG. 23 and FIG. 24, the PCR value needed for the SCR calculation further described below is written to the adaptation field of the Tip packet. This adaptation field is a fixed byte length and thus enables accessing various information in the Tip packet using a fixed address.

FIG. 25 shows the Data_ID field structure. The Data_ID field contains a Data_Identifier for identifying the packet as a Tip packet. This Data_Identifier is a 3-byte field storing value "0x544950" denoting "TIP" in ASCII code. The decoder of the playback drive can identify Tip packets by reading the value of this field.

FIG. 26 shows the structure of the display_and_copy_info field. Generating the RDI packs when converting the Constrained SESF to the DVD VR format is facilitated by writing the same structure and information as the DCI_CCI field of the RDI Unit in the DVD VR standard to this display_and_copy_info field. (It is noted that details about the DCI_CCI field of the DVD VR standard can be found in "DVD Specifications for Rewritable/Re-recordable Disc, Part 3, Video Recording," and in Japanese Patent No. 3162044. While some of the field names may be different in these documents, the field definitions are the same so as to enable direct conversion to the DVD VR format.)

FIG. 27 shows the structure of the encode_info field. The video_resolution field stores the resolution of the video stream following the Tip packet. The values of this encode_info field are defined below.

0000b: 720×480(NTSC), 720×576(PAL)
0001b: 704×480(NTSC), 704×576(PAL)
0010b: 352×480(NTSC), 352×576(PAL)
0011b: 352×240(NTSC), 352×288(PAL)
0100b: 544×480(NTSC), 544×576(PAL)
0101b: 480×480(NTSC), 480×576(PAL)
Others: reserved The DVD VR format allows the resolution to change during a single continuous recording. Streams of different resolutions are managed in separate VOBs, and seamless stream connections are assured during playback by the recorder. When the resolution changes during Constrained SESF recording, this video_resolution field is used to identify the point from which the VOB must change when converted to the DVD VR format.

In a Constrained SESF recorded to facilitate conversion to the DVD-Video format (encode_condition=11b) a change in resolution within a stream is not permitted.

The encode_condition field stores the same information stored in a VOBI. The reason why this information is stored not only in the stream management information but also embedded in the stream is that even if the stream is copied through a digital interface such as IEEE 1394 the recorder receiving the stream can easily determine if the stream can be easily converted to a DVD format by simply confirming the value of this encode_condition field in the Tip packet. The recorder can determine the encoding conditions of at least the elementary streams between one Tip packet and the next Tip packet (i.e., the SESF capsule) in the received stream.

VOBU_S_PTM from the DVD VR standard is recorded to the FVFPST field. This is to eliminate the need to analyze the encoded video stream following the Tip packet to calculate the playback time of the first presented video field when converting a Constrained SESF to a DVD-Video or DVD VR format.

The FVFPST field contains a 32-bit field denoting the video field presentation time with 90 kHz precision, and a 16-bit field denoting the presentation time with 27 MHz precision, which cannot be expressed in the 32-bit field.

FIG. 28 shows the MakersPrivateData. As shown in FIG. 28 the MakersPrivateData contains a maker_ID field identifying the manufacturer that generated the Constrained SESF, and a maker_private_data field containing other specific information added by the manufacturer.

FIGS. 29A and 29B show exemplary stream_type values denoting the Tip packet PID and stream type. Because both PID and stream_type values are reserved by the MPEG and other standards, the values used are selected so as to not interfere with these reserved values and to denote private data outside the MPEG standard.

It will thus be apparent that various stream attributes are extracted and stored to the Tip packet stored in a Constrained SESF. How the fields described above are used during conversion to a DVD format is described in further detail below.

9.4 System-Encoding Conditions

System-encoding conditions for Constrained SESF are described next in detail. It should be noted that the following system-encoding conditions are not applicable to an SESF for which the encode_condition field is neither set to "01b" or "11b", that is, an SESF that is not a Constrained SESF.

<Multiplexing Unit>

Each TS packet storing the-elementary streams of a Constrained SESF has a unit for multiplexing (multiplexing unit) of data stored in 2-KB packs according to a DVD format.

Figures 57A, 57B:
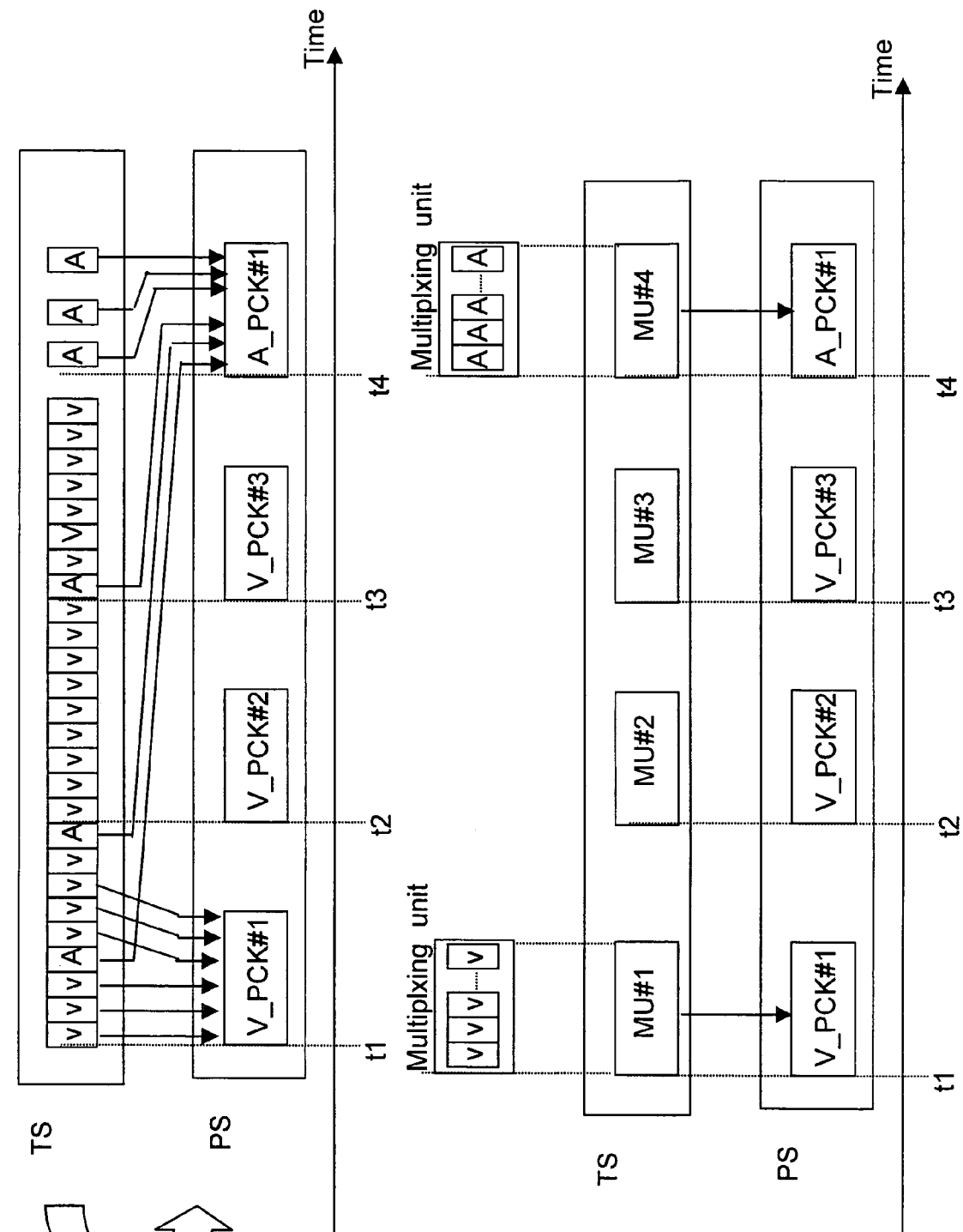
FIG. 57A describes conversion from an unconstrained MPEG-TS to an MPEG-PS, and FIG. 57B describes conversion from a constrained MPEG-TS to an MPEG-PS.

Why this concept of multiplexing units is introduced is described briefly with reference to FIGS. 57A and 57B. FIG. 57A describes converting an MPEG-TS in an unconstrained format to an MPEG-PS. To convert an MPEG-TS to an MPEG-PS the multiplexing order of the TS packets (video packets and audio packets) that are the multiplexing units of the MPEG-TS must be changed so that each pack in the MPEG-PS contains only one type of data. This is because the TS packets (188 bytes) that are the MPEG-TS multiplexing unit are smaller than the packets (2 KB) that are the MPEG-PS multiplexing unit. More specifically, it is necessary to collect and stuff only video packets from the MPEG-TS to MPEG-PS video packs (V_PCK), and collect and stuff only audio packets from the MPEG-TS to MPEG-PS audio packs (A_PCK). As shown in FIG. 57(a), the multiplexed sequence of audio packets (A packets) storing audio data in the MPEG-TS is changed in the converted MPEG-PS and stored in audio pack A_PCK #1 at the end of the stream.

FIG. 57(b) describes converting a constrained format MPEG-TS to an MPEG-PS. In this constrained format eleven consecutive TS packets are managed as one multiplexing unit. The total amount of data stored in one multiplexing unit is determined so as to not exceed the amount of data stored in one pack. It should be noted that the amount of data (or data size) referred to here does not include the pack or packet header information and means only the video or audio data. Furthermore, the eleven consecutive TS packets managed as one multiplexing unit all store the same type of data, video or audio.

It will thus be obvious that by introducing multiplexing units as described above it is not necessary to change the multiplexing sequence of the TS packets that are the MPEG-TS multiplexing units when converting a constrained format MPEG-TS to an MPEG-PS.

As shown in FIG. 20, all TS packets stored in one multiplexing unit store only one type of elementary stream and TS packets storing different types of elementary streams are not stored in a single multiplexing unit. It will also be noted that it may be necessary for a multiplexing unit (such as the multiplexing unit storing the last part of the stream) to also store a null packet, and mixing a null packet into a multiplexing unit is therefore not prohibited. Including a null packet is also necessary to clarify the relationship between multiplexing unit and packs.

One multiplexing unit thus contains 11 consecutive TS packets, and the elementary stream (payload data) in each multiplexing unit is completely stored to the one corresponding pack. This similarly constrains the pack relationship.

The TS packet storing the PES packet header is the first TS packet in a multiplexing unit. This correlates the packet header of the pack (called the PES packet header in the MPEG-TS) to the PES packet header in the Constrained SESF, and enables the consecutive TS packets to be easily converted in sequence.

When the PES packets storing the video stream are divided between multiple multiplexing units, all multiplexing units other than the multiplexing unit containing the last byte of the PES packet store 2024 bytes (=184×11) of TS packet payload data. This enables the most efficient stream transfers and makes sequential processing by TS packet unit easier during TS2PS conversions. If multiplexing units other than the last multiplexing unit are allowed to contain less than 2024 bytes, it will not be possible to determine the value of the PES_packet_length field stored to the packet header of each MPEG-PS pack on-the-fly when converting the first TS packet in a multiplexing unit during TS2PS conversion.

A PES packet storing an audio stream starts at the first TS packet in one multiplexing unit and ends within that multiplexing unit. This is easy to understand if storing a PES packet storing an audio stream to multiple multiplexing units is considered. If one audio PES packet is divided between multiple multiplexing units, the internal structure of the audio stream will need to be analyzed when, converting the second and subsequent multiplexing units to MPEG-PS packs because the PTS must be determined or the number of audio frames in one pack must be determined in order to generate the packet header.

A multiplexing unit is thus defined as described above. An encoder that generates a Constrained SESF performs the system-encoding with constraints of the multiplexing unit described above.

9.5 Constraints on the PES Packet Header in a Constrained SESF

Some constraints on the field values of the PES packet header in a Constrained SESF are described next.

As shown in FIG. 30 some PES packet header fields allow only fixed values. This is to prevent the need for unnecessary processing during conversion to a DVD format. "Unnecessary processing" as used here means processing fields that are added or deleted by values differing from values defined by the DVD format. In other words, the object of these constraints on the PES packet header is to minimize the fields that are added to or deleted from the header during TS2PS conversion.

It should be noted that the PES_packet_length field can be set to 0 in a PES packet storing MPEG-TS video. The value stored to the PES_packet_length field must therefore be calculated during TS2PS conversion from the packet header length stored to the pack and the byte length of the payload data.

The PTS_DTS_flags field denotes whether the PTS or DTS is defined. The PTS_DTS_flags field value in the Constrained SESF is set according to the following rules.

If the PES packet stores a video stream, PTS_DTS_flags is set to 11b under the following conditions:
1) A frame-encoded I-picture is stored to the PES packet;
2) A frame-encoded P-picture is stored to the PES packet;
3) A pair of field-encoded I-pictures are stored to the PES packet;
4) A pair of field-encoded P-pictures are stored to the PES packet; or
5) A field-encoded I-picture is followed by a field-encoded P-picture in the PES packet.

If the PES packet stores an audio stream, one or more audio frames always starts in the PES packet and PTS_DTS_flags is set to 10b (11b if the DTS is defined).

Constraints are also applied to the PES_extension_flag and PES_header_data_length fields to enable sequential processing by TS packet unit during TS2PS conversion. These constraints are shown in FIG. 31.

As shown in FIG. 31 the field values are defined according to the type of elementary stream, PES packet location, and encode_condition value.

V1 in FIG. 31 is the sum of the byte length of the PTS field and DTS field in the PES packet. That is,
if PTS_DTS_flags=00b, V1=0;
if PTS_DTS_flags=10b, V1=4;
if PTS_DTS_flags=11b, V1=10.

This constraint is necessary to enable sequential processing by TS packet when converting to DVD-Video or DVD VR, instead of compiling the packs after determining the payload length of each pack, as noted above.

The PES packet header is thus defined as described above. An encoder that generates a Constrained SESF performs system-encoding with the constraints described above.

9.6 Constraints on the Tip Packet Insertion Interval

Constraints relating to the insertion interval of Tip packets inserted to a Constrained SESF are described next.

The decoder input time denoted by the Tip packet ATS (ATS1) and the decoder input time indicated by the ATS (ATS2) of the Tip packet storing the video or audio stream first input to the decoder after the Tip packet must be related as follows.

$$ATS1+T<=ATS2$$

where T is the minimum transfer time of a PS pack, This minimum transfer time T is the shortest time from the start to the end of PS pack input to the decoder. In other words, the above equation shows that the ATS interval of each TS packet must be greater than the interval enabling at least the converted PS pack to be input to the system decoder. T is obtained from the next formula.

$$T=(PS\_pack\_size*8*system\_clock\_frequency)/PSrate$$

PS_pack_size is the byte length of one MPEG-PS pack generated by TS2PS conversion, system_clock_frequency is the frequency of the MPEG-PS decoder reference clock, and PSrate is the multiplex rate of the MPEG-PS generated by TS2PS conversion.

PS_pack_size, system_clock_frequency, and PSrate are further defined as follows by the DVD format:
PS_pack_size=2048 bytes
system_clock_frequency=27,000,000 Hz
PSrate=10,080,000 bits/second.

The relationship between ATS1 and ATS2 is therefore:
ATS1+43885.714 . . . <=ATS2 and ATS1+43886=ATS2 is therefore the minimum value of ATS2.

More specifically, the TS2PS conversion described below converts a Tip packet to a 2 KB NV_PCK (when converted to DVD-Video) or RDI_PCK (when converted to DVD VR), and if the above equation is not satisfied transfer of the next elementary stream starts sooner and could exceed the DVD system transfer rate of 10.08 Mbps.

It should be noted that the same effect can be achieved by assuring the above-described interval between AV data transfers before and after each Tip packet, and the invention shall not be limited to inserting a period in which AV data is not transferred only after Tip packet transfer.

An integer number of GOPs are aligned between two consecutive Tip packets (that is, in one SESF capsule). This is so that data from one Tip packet to the TS packet immediately before the next Tip packet (that is, SESF capsule) corresponds to VOBU in DVD format and the concept of a DVD format VOBU is thus also achieved in a Constrained SESF. VOBU in DVD format (such as DVD VR) must contain an integer number of GOPs.

The time on the playback time base from one Tip packet to the next Tip packet must be 0.4 second or longer and 1.0 second or less. The playback time for the playback data following the last Tip packet must be 0.4 sec or longer and 1.2 second or less if encode_condition=11b (DVD-Video or DVD VR mode), and 1.0 second or less if encode_condition=01b (DVD VR mode). This is because a Tip packet means the start of a VOBU and to conform to each DVD format.

The access map for time-address conversion points uniquely (1:1) to each Tip packet. This is so that conversion can start immediately by VOBU unit in DVD format during TS2PS conversion.

It should be noted that it is not necessary for the access map to point to every Tip packet. For example, the AV data following the last Tip packet in a Constrained SESF is handled differently from other Tip packets since it is different from other Tip packets, for example, different playback time, lack of following by a next Tip packet and so on, No problem with playback or conversion is thus created by not registering the last Tip packet in the access map, and can therefore be handled as an exception with consideration for the hardware configuration of the recorder. It is also possible that the access map does not point to each Tip packet because of such external factors as limitations on the size of the access map.

Constraints on the Tip packet insertion interval are thus defined as described above. An encoder that generates a Constrained SESF performs the system-encoding within the constraints described above.

9.7 Constraints Relating to Decoder Control

Constraints relating to Constrained SESF decoder control, specifically buffer management, are described next below.

A Constrained SESF must be generated to satisfy the standards defined by the standard decoder model T_STD in MPEG-TS. This enables an STB, for example, having a T_STD-conforming decoder to decode the Constrained SESF insofar as the stream type is compatible.

The MPEG-TS standard decoder model T_STD and the MPEG-PS standard decoder model P_STD are substantially identical in operation and processing capacity, but differ in the input rate of the audio stream to the decoder. More specifically, referring to FIG. 18, except for AAC (Advanced Audio Coding), the transfer rate to the audio buffer from the transfer buffer before the audio decoder is a fixed 2 Mbps in the T_STD. The P_STD, however, can input each stream to the decoder at the system rate, which with DVD is 10.08 Mbps.

This means the same buffer management cannot be used for a Constrained SESF and DVD format.

While the same buffer management thus generally cannot be used for a Constrained SESF and DVD format, extremely fast, simple conversion can be achieved when converting a Constrained SESF to DVD format without repeating the system encoding process if the SCR (System Clock Reference) denoting the decoder input start time of the converted packs can be calculated using the ATS assigned to each TS packet. Calculation of the SCR using the ATS is described in further detail below.

A Constrained SESF according to the present invention must be pre-encoded so that it conforms to the T_STD and so that the MPEG-PS generated by the below-described conversion process conforms to the P_STD.

In other words, a Constrained SESF is a stream encoded to an MPEG-TS so that it also conforms to the P_STD when converted by the process described below to an MPEG-PS.

The constraints relating to buffer management for a Constrained SESF are described above. It should be noted that an SESF is simply encoded to conform to the T_STD without being aware of the above constraints.

Examples of an MPEG-TS and MPEG-PS not conforming to the T_STD and P_STD models are described below.

Figure 32:
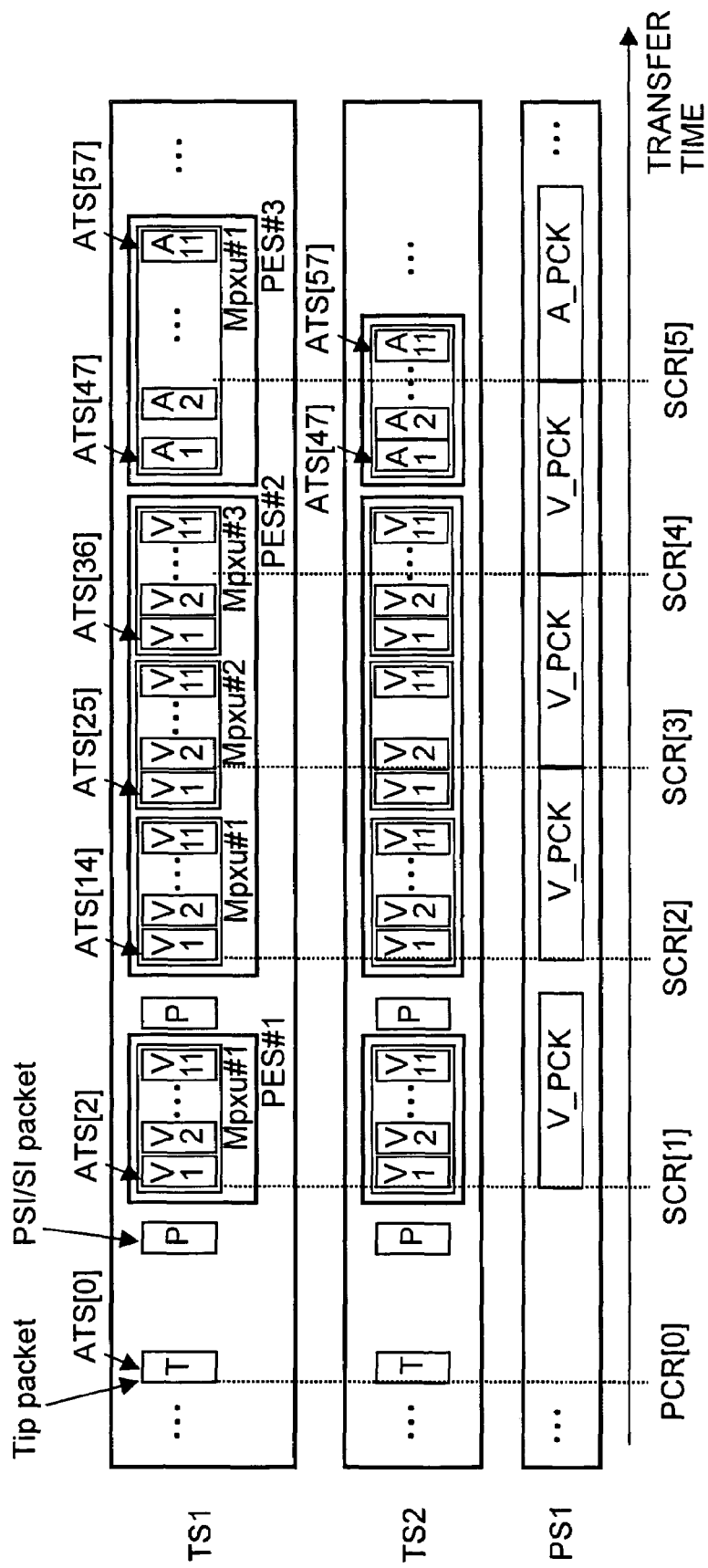
FIG. 32 shows an example of an MPEG-TS self-encoded such that it does not conform to the T_STD model.

An MPEG-TS self-encoded to enable conversion to an MPEG-PS but not conforming to the T_STD model is described first with reference to FIG. 32.

Stream TS1 is an MPEG transport stream that is system-encoded according to the T_STD model. Stream TS2 is an MPEG transport stream that does not conform to the T_STD model.

More specifically, the values of ATS[47] to ATS[57] in stream TS2 are set to exceed the allowable audio data transfer rate of an MPEG-TS. This causes the audio transport buffer (see FIG. 18) to overflow, thus not meeting the requirements of the T_STD model. The values of ATS[47] to ATS[57] in stream TS1, however, are set to an audio data transfer rate allowed in the MPEG-TS. This stream can thus be correctly converted to an MPEG program stream PS1 conforming to the P_STD model by the SCR conversion formula described below. Stream TS2 also does not conform to T_STD but can be converted to PS1 using the SCR conversion formula described below. In order to convert stream TS2 to MPEG-TS conforming to T_STD, the transfer time interval of the audio packets specified by ATS[47] to ATS[57] must be spread out so that a transport buffer overflow does not occur.

Figures 33A, 33B:
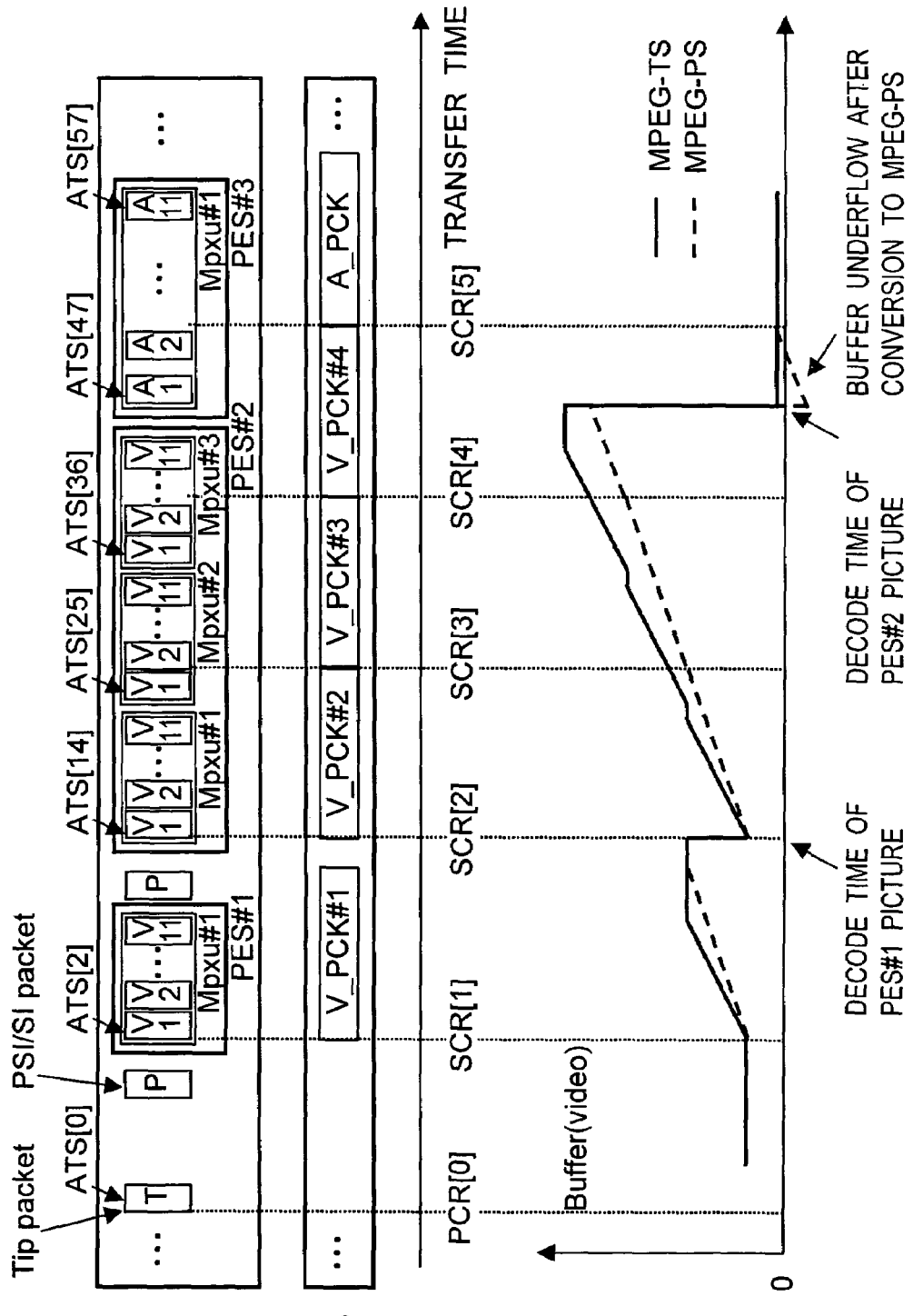
FIGS. 33A and 33B show an example of an MPEG_PS converted from an MPEG-TS such that the MPEG_PS does not conform to the P_STD model.

An example where the MPEG-TS conforms to the T_STD model but the MPEG-PS converted from the MPEG-TS does not conform to the P_STD model is described next with reference to FIGS. 33A and 33B. Stream TS3 is an MPEG transport stream and steam PS3 is an MPEG program stream converted from MPEG transport stream TS3. FIG. 33(b) shows the change in the video data buffer state when decoding each. The PES #1 picture decoding time is SCR [2], and PES #2 picture decoding time is between SCR [4] and SCR [5].

As shown in FIG. 33B, in transport stream TS3, data transfer of PES #1 and PES #2 completes by a start of decoding picture data in PES #1 and PES #2. In program stream PS3, however, V_PCK#1 data is transferred successfully to the decoder for PES #1, but when decoding PES #2 V_PCK #4 data is not transferred in time and a buffer underflow occurs because decoding began before data transfer was completed. The program stream therefore does not conform to the P_STD model. To avoid this and assure that PES #2 transfer is completed in time, the ATS (ATS [14], ATS [25], ATS [36]) of each TS packet in the MPEG-TS converted to V_PCK #2 to V_PCK #4 can be shifted to a time before PES #2 picture data is decoded.

Because buffer management preventing buffer underflow and overflow states is thus necessary for both the encoded MPEG-TS and MPEG-PS converted therefrom, it is necessary when encoding the MPEG-TS to anticipate both the encoded MPEG-TS and the MPEG-PS converted therefrom.

FIGS. 58A and 58B describe buffer management for the MPEG-TS and anticipated MPEG-PS when the MPEG-TS before conversion and the MPEG-PS after conversion have the same bit rate. Buffer management of the anticipated MPEG-PS can be assumed in the present embodiment to be the same as buffer management for the encoded MPEG-TS. This is because the time stamp information (calculated_PCR) set in the multiplexing units of the MPEG-TS converted to an MPEG-PS and the time stamp information set in the MPEG-PS packs after conversion are the same.

FIG. 58A shows an example in which a buffer underflow occurs. Data transfer of the encoded MPEG-TS is not completed by the target time K1, that is, the DTS timing. It is therefore anticipated that data transfer of the converted MPEG-PS will also not be completed in time.

To avoid this buffer underflow state the MPEG-TS time stamp information must be set so that data transfer is completed by time K1, the DTS timing, as shown in FIG. 58B. It can thus be anticipated that a buffer underflow will also not occur with the converted MPEG-PS.

Figure 59A:
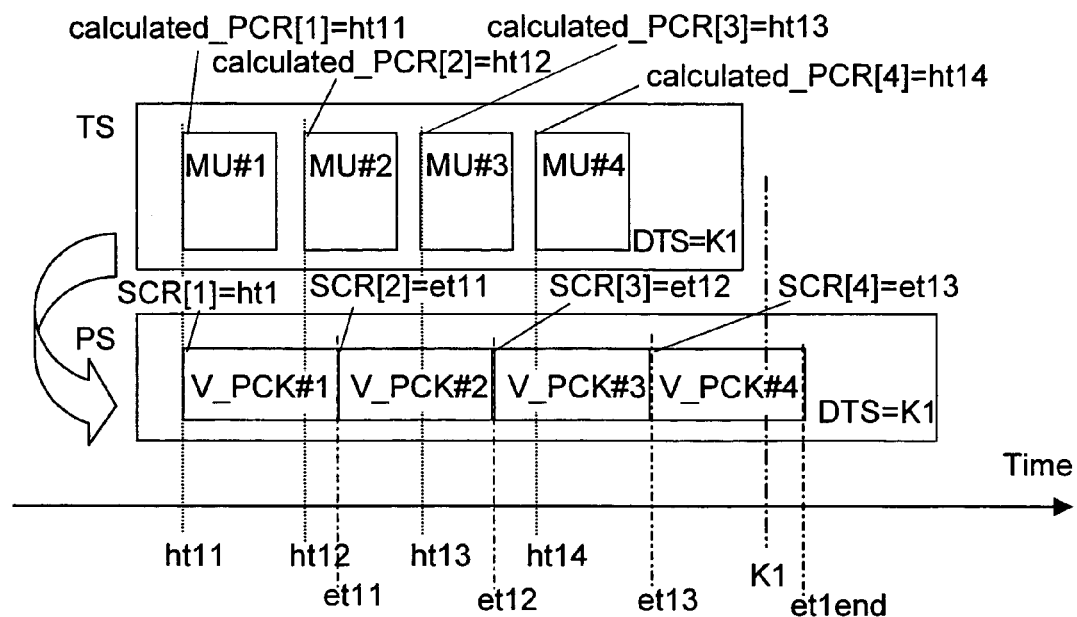
FIG. 59A describes buffer management of the MPEG-TS and anticipated MPEG-PS when the bit rate of the MPEG-TS being converted is higher than the bit rate of the resulting MPEG-PS (when a buffer underflow occurs only with the MPEG-PS)
Figure 59B:
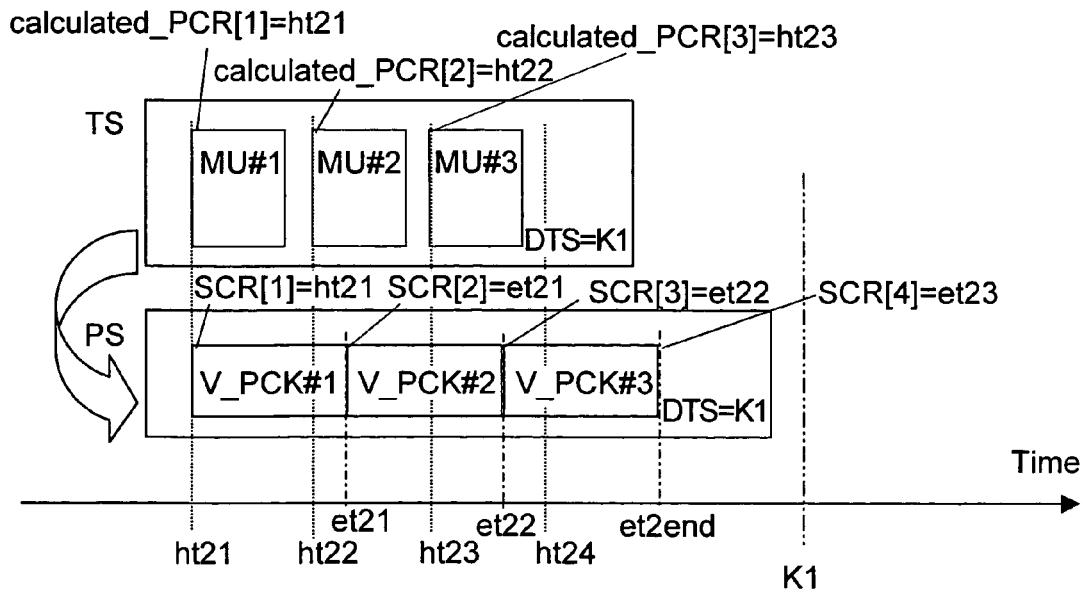
FIG. 59B describes buffer management of the MPEG-TS and anticipated MPEG-PS when the bit rate of the MPEG-TS being converted is higher than the bit rate of the resulting MPEG-PS (when a buffer underflow does not occur)

FIGS. 59A and 59B describe buffer management for the MPEG-TS and anticipated MPEG-PS when the bit rate of the MPEG-TS being converted is higher than the resulting MPEG-PS. Buffer management of the anticipated MPEG-PS cannot be assumed to be the same as buffer management of the encoded MPEG-TS in this case. Separate buffer management is therefore required for the MPEG-PS.

A buffer underflow occurs only with the MPEG-PS in the case shown in FIG. 59A. Data transfer is completed by the target time K1 (DTS timing) with the encoded MPEG-TS, and a buffer underflow does not occur. Data transfer is not completed by target time K1 (DTS timing) with the converted MPEG-PS, however, and a buffer underflow occurs. Therefore, data transfer must also end by time K1, the DTS timing, in order to avoid a buffer underflow with the MPEG-PS. If the resulting MPEG-PS is an MPEG-PS used by the DVD standard, the system transfer rate cannot be increased. It is therefore necessary to reduce the image rate as shown in FIG. 59B or otherwise reduce the total amount of transfer data in order to ensure that the data can be completely transferred to the decoder in time.

<ATS-SCR Conversion>

A method for determining the SCR of the PS packs when a Constrained SESF stream is converted to a program stream is described next. It should be noted that because the SCR is calculated when new packs are generated, the SCR must be calculated only when converting the first TS packet in the multiplexing unit.

The basic concept for determining the SCR is described first. The time stamp information (SCR) set to the packs of the MPEG-PS after conversion is shown in FIGS. 60A and 60B for two different cases.

FIG. 60A shows a case in which the bit rate is the same in the MPEG-TS and MPEG-PS. In this case the same value as the time stamp information (calculated_PCR) set in the corresponding multiplexing unit of the MPEG-TS is set to the time stamp information (SCR) of the MPEG-PS packs.

FIG. 60B shows a case in which the MPEG-TS transfer rate is higher than the MPEG-PS transfer rate. In this case the buffer input completion time (SCR[i−1]+T) of the immediately preceding pack is set to the SCR[i] of each pack (V_PCK) in the program stream after conversion. Why the SCR is thus set is described below.

If the calculated_PCR[i] of the multiplexing unit corresponding to SCR[i] is set as in the case shown in FIG. 60A, a time earlier than the buffer input completion time (SCR[i−1]+T) of the immediately preceding pack will be set to the SCR. If the SCR is set to this timing the stream will be unplayable by current DVD recorders, and this must be avoided. It should be noted that the MPEG-TS bit rate is set higher than in the MPEG-PS because the maximum transfer rate is slower for audio than for video.

Determining the SCR is described in further detail below.

In Constrained SESF stream, as shown in FIG. 55 a SESF capsule includes a Tip packet and a predetermined number of TS packets composing Multiplexing Unit. Since transferred in sync with a decoder reference time STC (System Time Clock), the stream includes PCR packet to reset STC.

As shown in FIG. 14 each TS packet is added with a first time stamp information (ATS) indicating a transferred time to the decoder. A reference time of this first time stamp information (ATS) is different from the decoder reference time.

Thus, Tip packet contains second time stamp information (PCR_tip) based on the decoder reference time as well as the first time stamp information (ATS_tip) based on the same reference time as the TS packet. By referring to Tip packet, the decoder can calculate the second time stamp information (PCR) from the first time information (ATS) of each TS packet.

Figure 61:
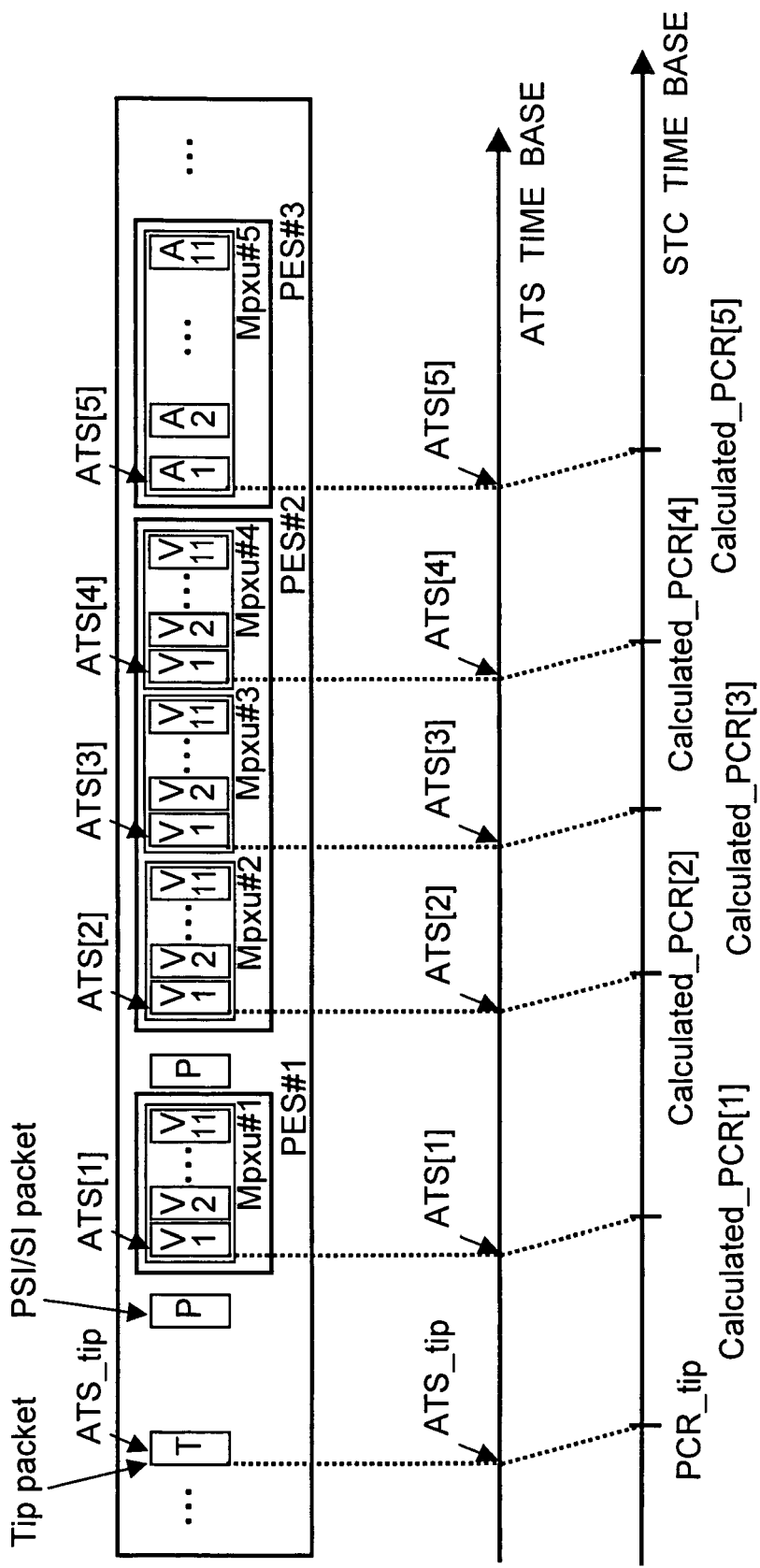
FIG. 61 shows the correlation between the relative transfer time ATS added to each TS packet, and the transfer time calculated_PCR[n] of the first TS packet in the multiplexing unit.

As shown in FIG. 61, the second time stamp information calculated from the first time stamp information (ATS[i]) of each TS packet located at the head of Multiplexing unit becomes second time map information for each Multiplexing unit (referred to as "calculated PCR[i]" below).

For example, the PCR value (PCR[i]) of a TS packet is obtained from the following equation using the PCR (PCR_tip) and ATS value (ATS_tip of the first Tip packet in an SESF capsule and the ATS value ATS[i] of the next TS packet if carry (column overflow) of the ATS value is not considered.

$$PCR[i] = PCR\_tip + (ATS[i] - ATS\_tip)$$

To determine calculated_PCR[1] which indicates the decoder input time of the first multiplexing unit in case of FIG. 61, for example, the following formula can be used.

$$\text{calculated\_PCR}[1] = PCR[2]$$
$$= PCR\_tip + (ATS[2] - ATS\_tip).$$

The calculated_PCR for each multiplexing unit is likewise calculated while considering ATS column overflow.

Figure 34:
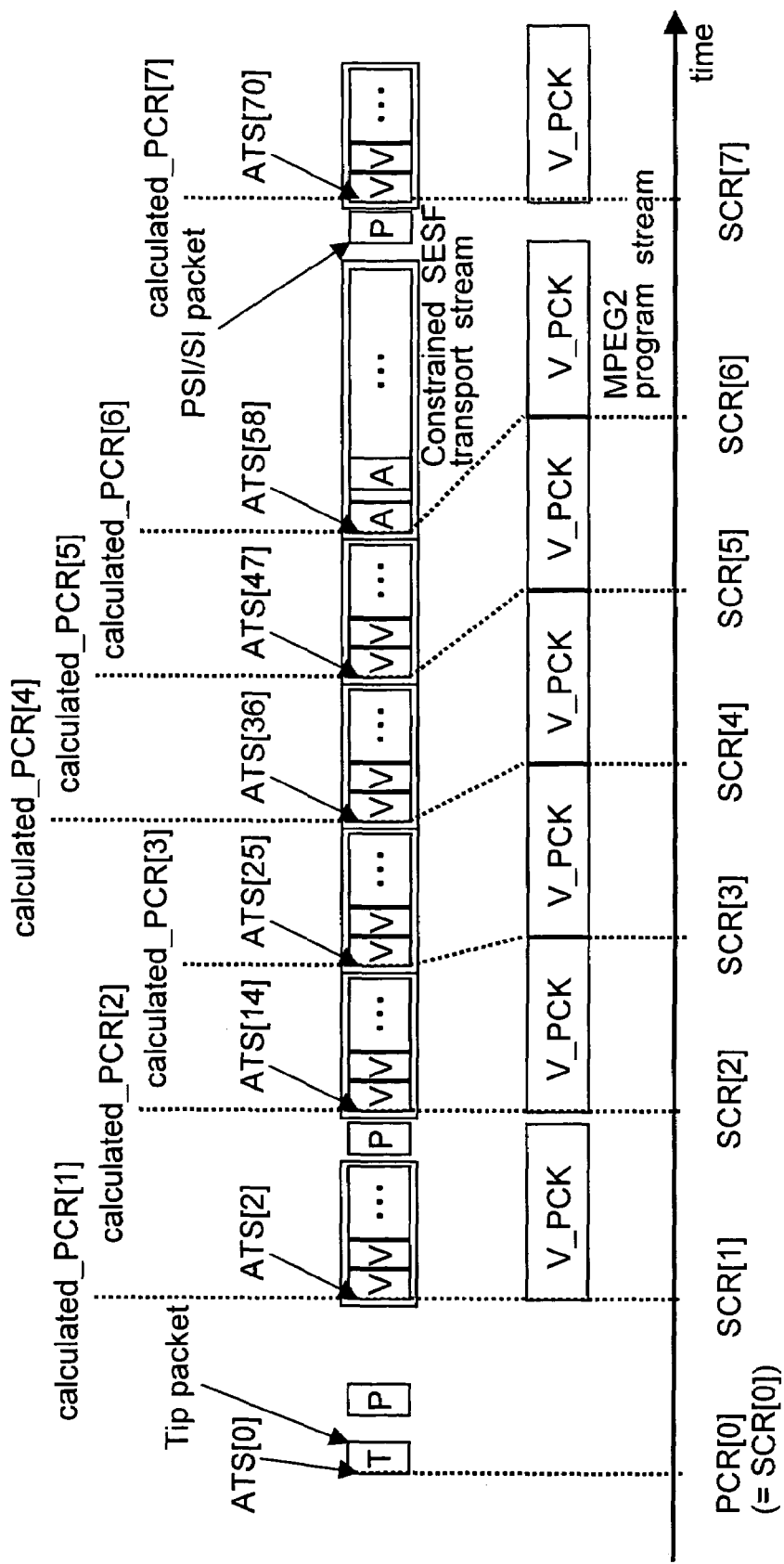
FIG. 34 shows SCR calculation.

FIG. 34 shows the relationship between the calculated_PCR and SCR when converting from a Constrained SESF to MPEG-PS, and shows the first part of the capsule shown in FIG. 55. The ATS assigned in ascending order from the stream start to the TS packets at the beginning of each multiplexing unit are denoted in FIG. 34 as ATS[k]. The same notation is used for the calculated_PCR and SCR. The PCR value calculated in the order of appearance for the first TS packet in each multiplexing unit is shown as the calculated_PCR [i] (where i=1, 2, . . . ). The SCR of the converted packs is likewise denoted SCR [i].

As described above the maximum video stream transfer rate allowed by the T_STD model is 15 Mbps (the transfer rate from the multiplex buffer to the video buffer cannot exceed 15 Mbps for the MP@ML, and the audio stream input rate is limited to a rate lower than the video. (transfer rate from a transport buffer to an audio buffer does not exceed 2 Mbps except for AAC). Thus unlike a multiplexing unit storing video data, a multiplexing unit storing audio data is therefore transferred at a low rate. Therefore, if the video data transfer rate is to be raised to near the 9.8 Mbps maximum transfer rate of the DVD format, video data TS packets must be transferred at a higher rate than the DVD transfer rate (10.08 Mbps) in order to assure sufficient transfer time for the audio data, which has a lower transfer rate and therefore takes longer.

As will be known from FIG. 34, the transfer times of the Constrained SESF and DVD format differ.

The following relation must be true between the decoder arrival time calculated_PCR of the first TS packet in a multiplexing unit and the SCR of the packs converted therefrom.

$SCR[1] = \text{calculated\_PCR}[1]$ $SCR[i] = \max(SCR[i-1]+T, \text{calculated\_PCR}[i])$ ($i=2, 3, \ldots$)

$\text{calculated\_PCR}[i] = PCR\_\text{tip} + (ATS[i] - ATS\_\text{tip} + WA*BS)$ $T = PS\_\text{pack\_size}*8*\text{system\_clock\_frequency}/PS\text{rate}$ where PCR_tip and ATS_tip are the PCR value of the Tip packet immediately before the multiplexing unit being converted and the ATS value of that Tip packet; WA indicates how many times an overflow occurred at the ATS between ATS_tip and the ATS (ATS[i]) assigned to the first TS packet in the i-th multiplexing unit. More specifically, the ATS value is expressed as a finite bit count, there is a limit to the number that can be expressed, and overflow can occur. How many times such an overflow occurs is expressed with WA. BS is the data size corresponding to one ATS overflow. Function max(a,b) is a function for selecting the greater of a and b.

Furthermore, PS_pack_size in the SCR[i] (i=2, 3, . . . ) relation is, as noted above, the byte length of one pack in the MPEG-PS output by the TS2PS conversion process; system_clock_frequency is the frequency of the MPEG-PS decoder reference time; and PSrate is the multiplex rate of the MPEG-PS generated by the TS2PS conversion. More specifically, PS_pack_size 2048 bytes
system_clock_frequency=27,000,000 Hz
PSrate=10,080,000 bits/second.

There are two patterns for outputting packs after the first pack: outputting the packs after waiting a minimum transfer time determined by the transfer rate from the output time of the preceding pack, and outputting at the decoder input time of the first TS packet in a pack. The former method of leaving the minimum transfer time before pack output is selected when the packs are output before converting the video data to the DVD format. For example, if the packs are output at a time before the video data is converted to the DVD format, the former method of transfer after waiting a minimum transfer time determined by-the transfer rate from the output time of the preceding pack is selected.

A program stream obtained by TS2PS conversion must conform to the P_STD model as described above, and the SCR is therefore limited to values within a certain range. Therefore, the ATS value assigned to each packet of the Constrained SESF must be set with reference to the above ATS-SCR relation.

9.8 Constraints Relating to the Elementary Stream

Constraints relating to the elementary stream of the Constrained SESF are described next.

Because re-encoding the elementary streams is a very demanding process, only MPEG-2 Video is allowed for video data and AC-3, MPEG-1 Audio, and LPCM are allowed for audio data.

The Constrained SESF omits LPCM so that re-encoding of elementary stream is not necessary and buffer management can be easier. Streams allowed for a Constrained SESF are therefore limited to only MPEG-2 Video for video data and only AC-3 and MPEG-1 Audio for audio data.

Elementary stream attributes are shown in FIG. 35 when encode_condition="11b".

Because the attributes shown in the figure are set to maintain compatibility at the elementary stream level to DVD-Video or DVD VR, a Constrained SESF (encode_condition=11b) set to these attributes does not require re-encoding the elementary stream for conversion to DVD-Video or DVD VR formats, and high speed conversion is therefore possible.

FIG. 36 shows elementary stream attributes when encode_condition="01b".

Because the attributes shown in the figure are set to maintain compatibility to DVD VR at the elementary stream level, a Constrained SESF (encode_condition=01b) which is set to these attributes does not require elementary stream re-encoding for conversion to DVD VR, and high speed conversion is therefore possible.

Notes 1 to 4 in FIG. 35 and FIG. 36 are described next.

Note 1: This attribute cannot change inside the same VOB.

Note 2: This attribute can change in the TS packet storing the first elementary stream following the Tip packet. In other words, it can change only in the first video or audio TS packet in the SESF capsule.

Note 3: sequence_end_code cannot be inserted between sequence_headers where the horizontal_size, vertical_size, and aspect_ratio_information are the same.

Note 4: This attribute can change inside the same VOB.

Constraints relating to the elementary streams of a Constrained SESF are defined above.

It should be noted that by applying the encoding conditions defined above a Constrained SESF enabling fast, simple conversion to DVD format can be produced.

Figure 37:
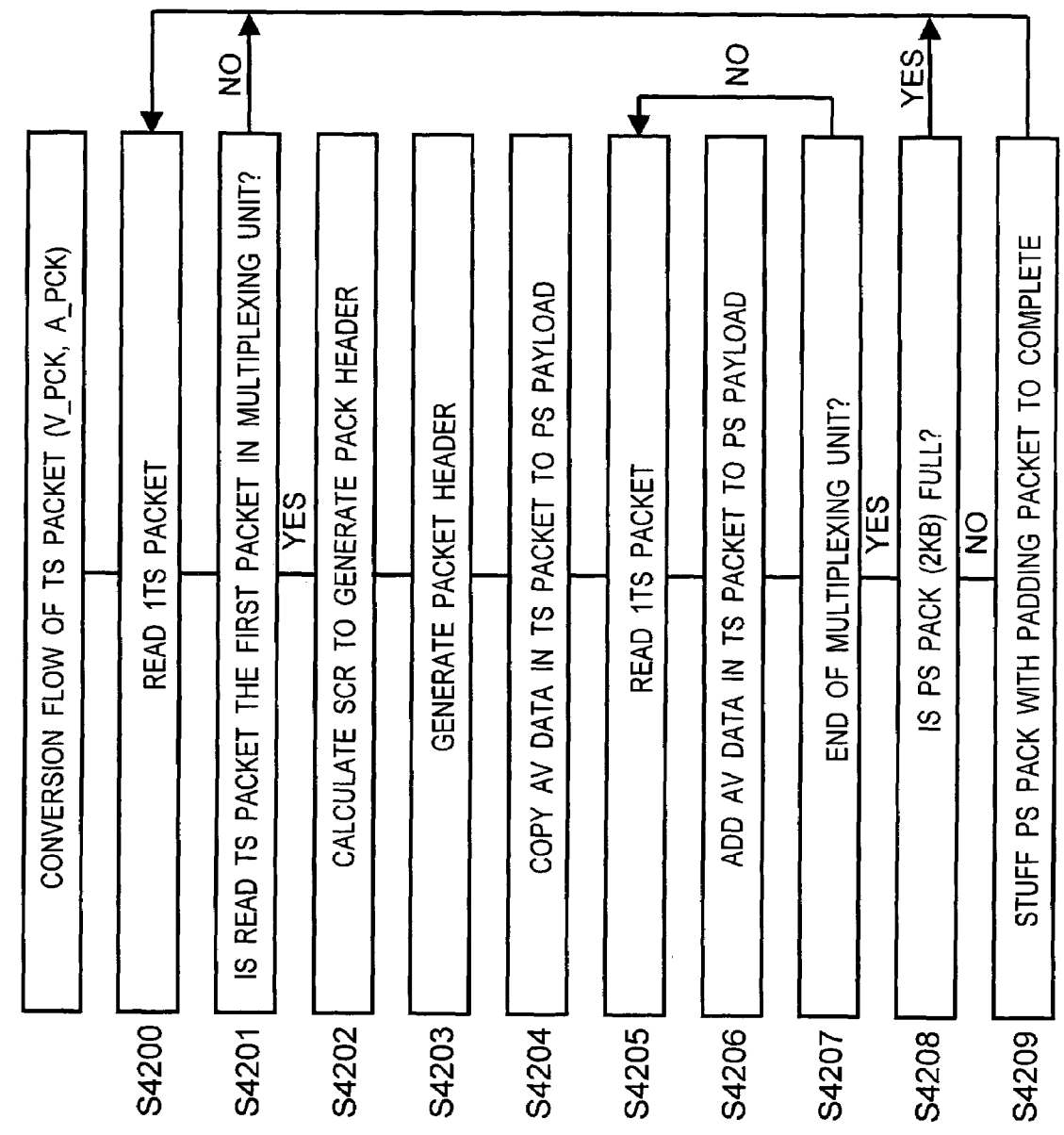
FIG. 37 shows the standard stream structure in DVD Video.

FIG. 37 is a flow chart of the process for generating program stream packs from TS packets (multiplexing units) storing AV data.

As shown in the figure, a TS packet of a Constrained SESF storing AV data is converted to a 2 KB MPEG-PS pack storing AV data using one multiplexing unit as the processing unit. This process is described step by step below.

(Step S4200) One TS packet is read from the Constrained SESF stream conversion starting point.

(Step S4201) Whether the read TS packet contains AV data and is the first TS packet in a multiplexing unit is determined.

Whether AV data is contained is determined by referencing the PID value of the TS packet which is declared by the PMT to be storing AV data.

If the preceding TS packet is a Tip packet, PSI/SI packet, or PCR packet, the TS packet thereafter that contains AV data is known to be the first TS packet in the multiplexing unit. Because the conversion starting point is assumed to be a Tip packet, the beginning of a multiplexing unit can be detected by sequentially reading the TS packets (in other words, the first TS packet that is just after the Tip packet and contains AV data is always the beginning of a multiplexing unit).

If it is determined that the TS packet is not the beginning of a multiplexing unit, or if conversion does not start from a Tip packet and the beginning of the multiplexing unit cannot be identified, control returns to step S4200 to read the next TS packet.

If the beginning of a multiplexing unit is found, control advances to the next step.

It should be noted that while not shown in this flow chart, conversion using the above-described SCR conversion method cannot be applied even for a TS packet at the beginning of the multiplexing unit if the Tip packet was not previously located, but conversion can proceed using the PCR packet instead of a Tip packet.

(Step S4202) Using the ATS assigned to the first TS packet in the multiplexing unit, the decoder input time (SCR) of the MPEG-PS pack converted from that TS packet is calculated. This SCR is calculated as described above. Once the SCR is determined the pack header shown in FIG. 38 is complete. This is because other than the SCR only fixed values are allowed in the pack header.

(Step S4203) The packet header is then generated.

The packet header is generated based on the PES packet header of the Constrained SESF. The resulting packet header must be formatted with the field values shown in FIG. 39. This is because if the header length or other field values are not constant the conversion from a Constrained SESF will not be constant and buffer management will be affected. It should be noted that fields not shown here store constant values and are therefore omitted here.

The field values of the PES packet header are defined in detail in the Constrained SESF to minimize the processing required for conversion from a PES packet header (MPEG-TS) to MPEG-PS packet header.

If the size of one PES packet is large relative to the size of one pack, one PES packet is converted to multiple packs. In this case, the followings to the packet headers of the second and subsequent packs are modified: PTS_DTS_flags in the first packet header generated from the PES packet is set to 00b; PES _extension_flag is set to 00b; the stuffing_byte length is adjusted; and PES _header_data_length is corrected.

The packet headers are thus generated by modifying partially the first packet header from the PES packet header, and modifying partially the second and later packet headers from the first packet header.

(Step S4204) The payload part of the TS packet is then simply copied sequentially from the beginning of the payload in the PS pack.

(Steps S4205 to S4207) These steps simply repeat until the multiplexing unit is completed (i.e., for the 11 TS packets). Because a null packet could be inserted, the PID (0x1FFF) of the null packet is confirmed and the TS packet payload data copied.

Only the TS packet storing the last data in one PES packet is preferably defined to have an adaptation field. As a result, all TS packets except for the TS packet storing the last data in the one PES packet store a fixed-length payload containing 184 bytes, and reading the payload data is thus easier.

(Step S4208) The byte length of the resulting program stream pack is then calculated when copying to the end of the multiplexing unit payload data is completed. If the pack length is 2048 bytes the pack is completed. If the byte length is not 2048 bytes, control steps to step S4209.

(Step S4209) If the pack is less than 2048 bytes padding packets are added to the end of the payload so that the pack length is 2048 bytes.

Conversion from a multiplexing unit storing AV data is as described above. This process simply repeats only when a multiplexing unit is detected until processing the designated part for conversion of the Constrained SESF ends.

The conversion process described above is described in further detail below for processing the different types of packs.

<Conversion to Video Packs (V_PCK)>

FIGS. 40A and 40B show the conversion from a Constrained SESF to MPEG-PS. As shown in 40A, one video PES packet is normally larger than 2 KB, and is therefore typically divided into multiple multiplexing units for multiplexing to the Constrained SESF.

Except for the last multiplexing unit in one video PES packet, the Constrained SESF is defined so that as much PES packet data as possible is stuffed into each multiplexing unit. Except for the last multiplexing unit, therefore, all multiplexing units store 2024 bytes (=184×11 bytes) of data.

By thus defining the Constrained SESF, the PES _packet_length and stuffing_byte fields can be predefined during TS2PS conversion.

The last multiplexing unit storing data for one video PES packet fills the remaining area with an adaptation field and null packets to form one complete multiplexing unit.

As shown in FIGS. 40A and 40B, the multiplexing units in one video PES packet include the following three types.

The first multiplexing unit storing the first data in the PES packet (MU #1 in the figure), multiplexing units storing data from the middle of the PES packet (MU #n where n=2, 3, . . . , N−1 in the figure), and the multiplexing unit storing the last data from the PES packet (MU #N).

The resulting packs of the TS2PS converted MPEG-PS are as shown in FIG. 40B according to these multiplexing unit types.

The pack converted from MU #1 is always generated with at least 10 bytes of empty space, and therefore has a padding packet added to the end.

If a space of 7 bytes or less is left in a pack in the DVD format, stuffing bytes (the last field in the packet header) are added to a total of 2048 bytes. If 8 or more bytes are empty, a padding packet is added.

Packs converted from MU #n have one stuffing byte added to complete the pack. The pack converted from MU #N has a padding packet added because at least 8 bytes are usually empty when the pack is compiled.

<Conversion to Audio Packs A_PCK>

Figure 41A:
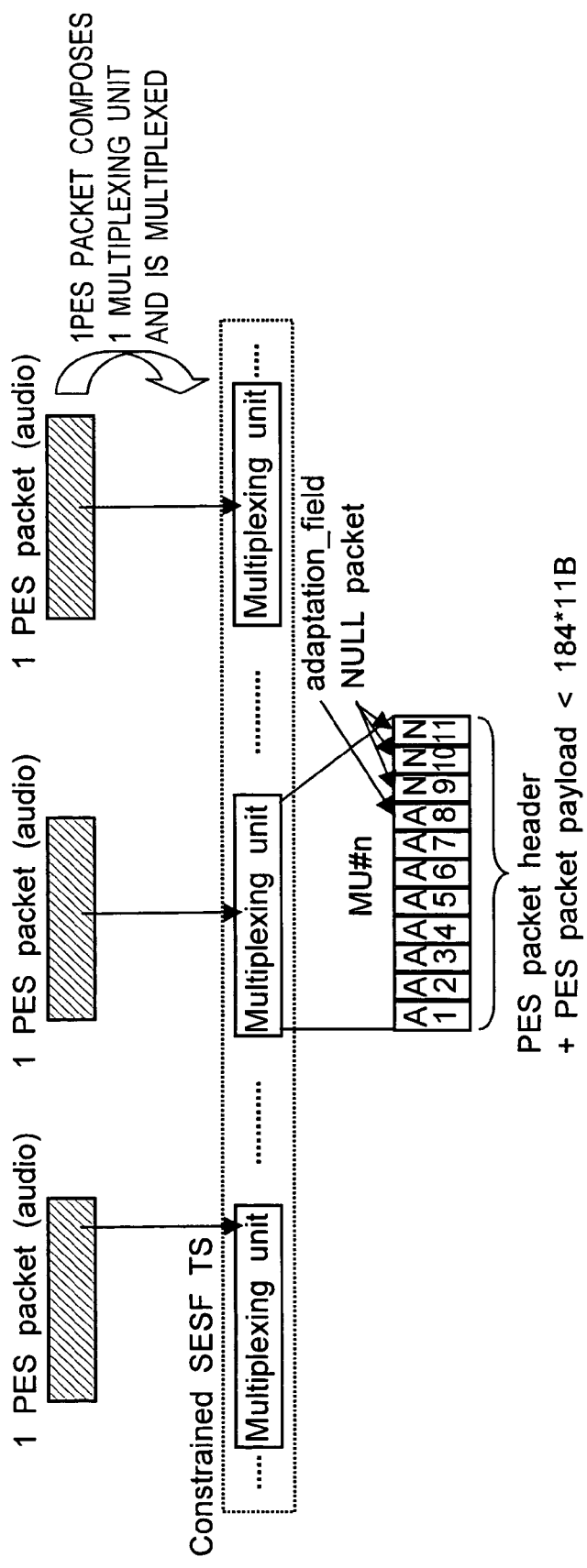
FIGS. 41A and 41B show conversion from a Constrained SESF to an MPEG_PS for an audio pack.
Figure 41B:
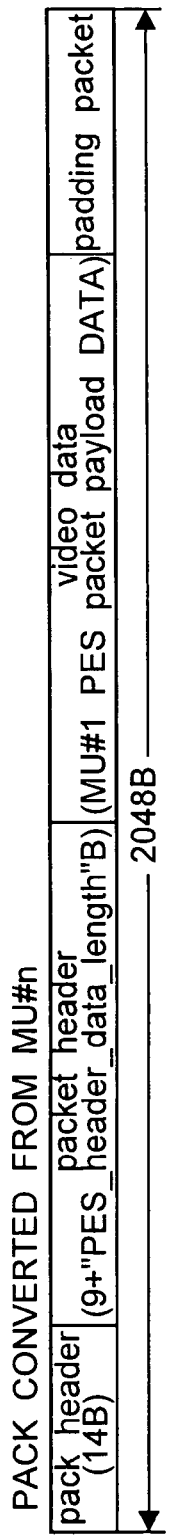

FIGS. 41A and 41B show conversion of a Constrained SESF to MPEG-PS. As shown in the figure one audio PES packet (storing one or more audio frames) is smaller than one multiplexing unit.

Because one audio PES packet will fit into one multiplexing unit, complicated conversion such as used for video PES packet conversion is not needed. That is, as shown in FIG. 41B, a padding packet is always inserted to the generated packs.

Furthermore, because the PES _packet_length does not change during TS2PS conversion, the only calculation needed for conversion is to appropriately set the stream_id during MPEG-1 Audio conversion.

FIG. 42 shows the audio bit rate allowable in a Constrained SESF and the maximum payload stored to one audio PES packet when AC-3 and MPEG-1 Audio are stored. A padding packet is always inserted because audio data exceeding the maximum byte lengths shown here will not be stored to one audio PES packet.

<TS2PS Conversion Process>

The TS2PS conversion process is described in detail with reference to the flow charts in FIG. 43 to FIG. 54.

Figure 43:
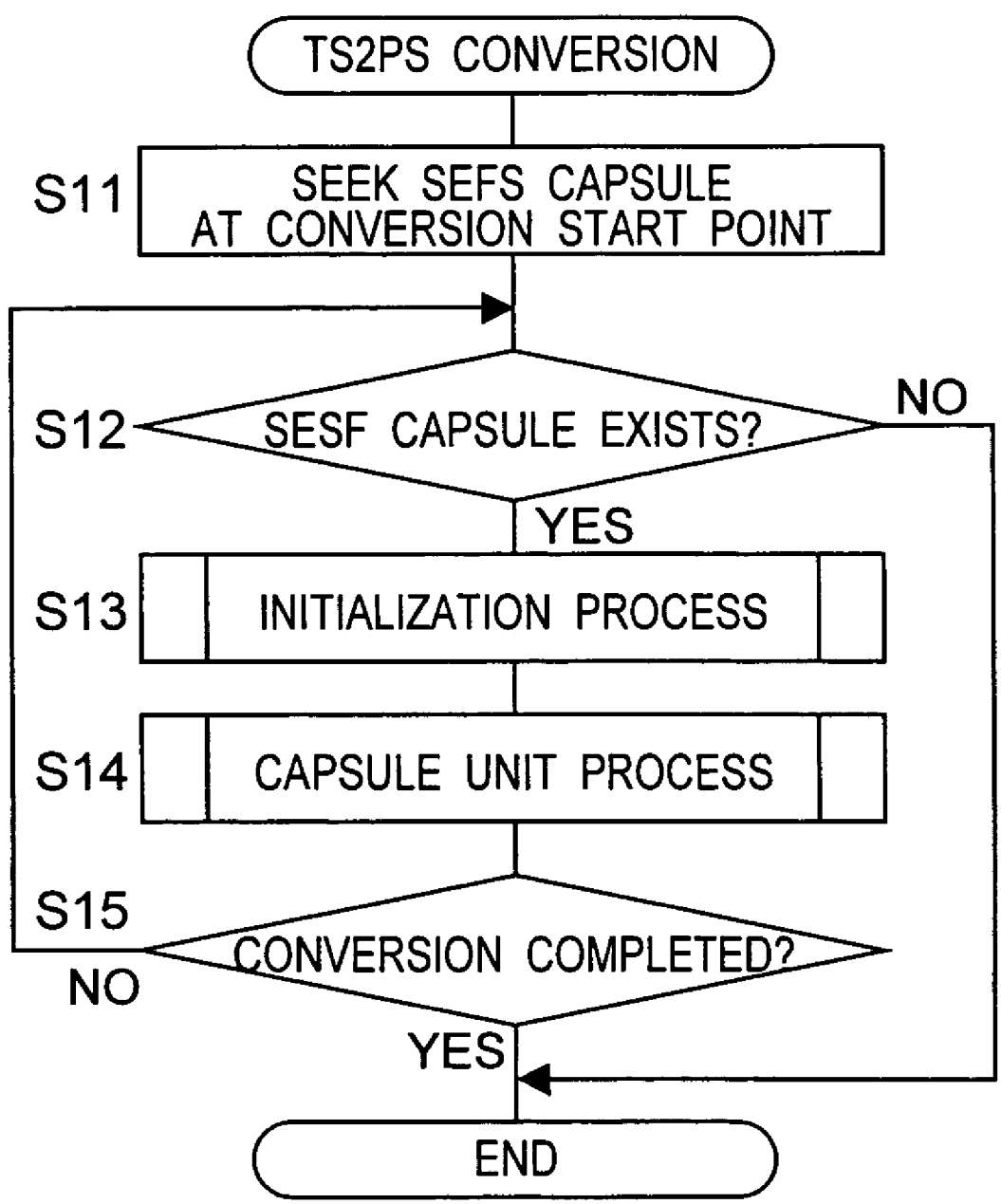
FIG. 43 is a flow chart of the overall TS2PS conversion process.

FIG. 43 is a flow chart of the main TS2PS conversion process. This process starts in response to a TS2PS conversion request from the user. The first step is to seek the first SESF capsule where conversion starts (S11). Whether the SESF capsule to process is found is then determined (S12). If it is not, the process ends. If it is found an initialization process (S13) and capsule unit process (S14) run.

Figure 44:
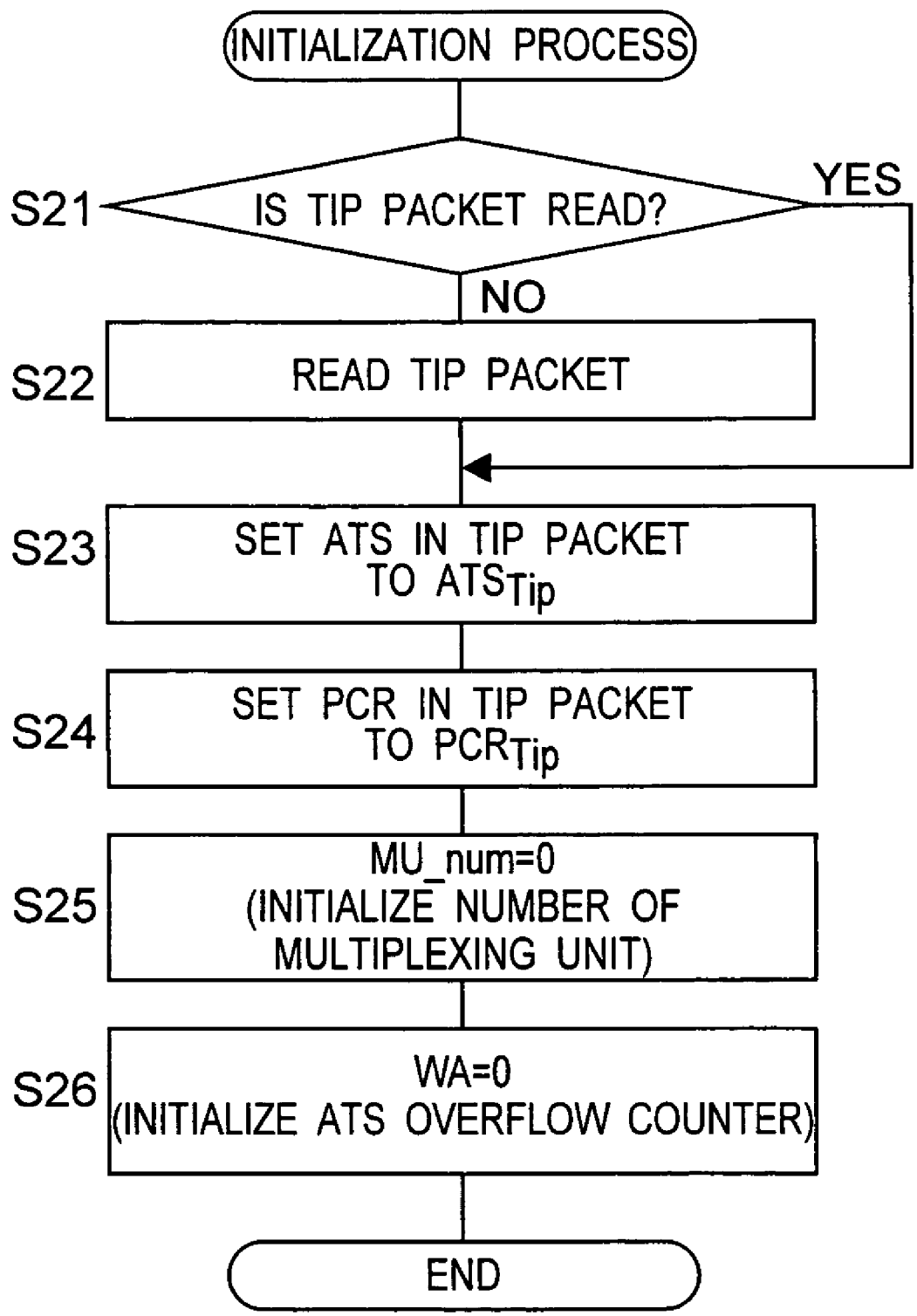
FIG. 44 is a flow chart of the initialization process in the TS2PS conversion process.

FIG. 44 is a flow chart of the initialization process (S13). This process sets and initializes the variables used in the subsequent process, and starts by determining if a Tip packet was read (S21). If the Tip packet has not been read, the Tip packet is read (S22). The ATS value of the Tip packet is then written to variable ATSTip (S23), the PCR value of the Tip packet is written to variable PCRTip (S24), variable MU_num defining the number of the multiplexing unit being processed is initialized to 0 (S25), and variable WA denoting the number of ATS overflows is initialized to 0 (S26).

Figure 45:
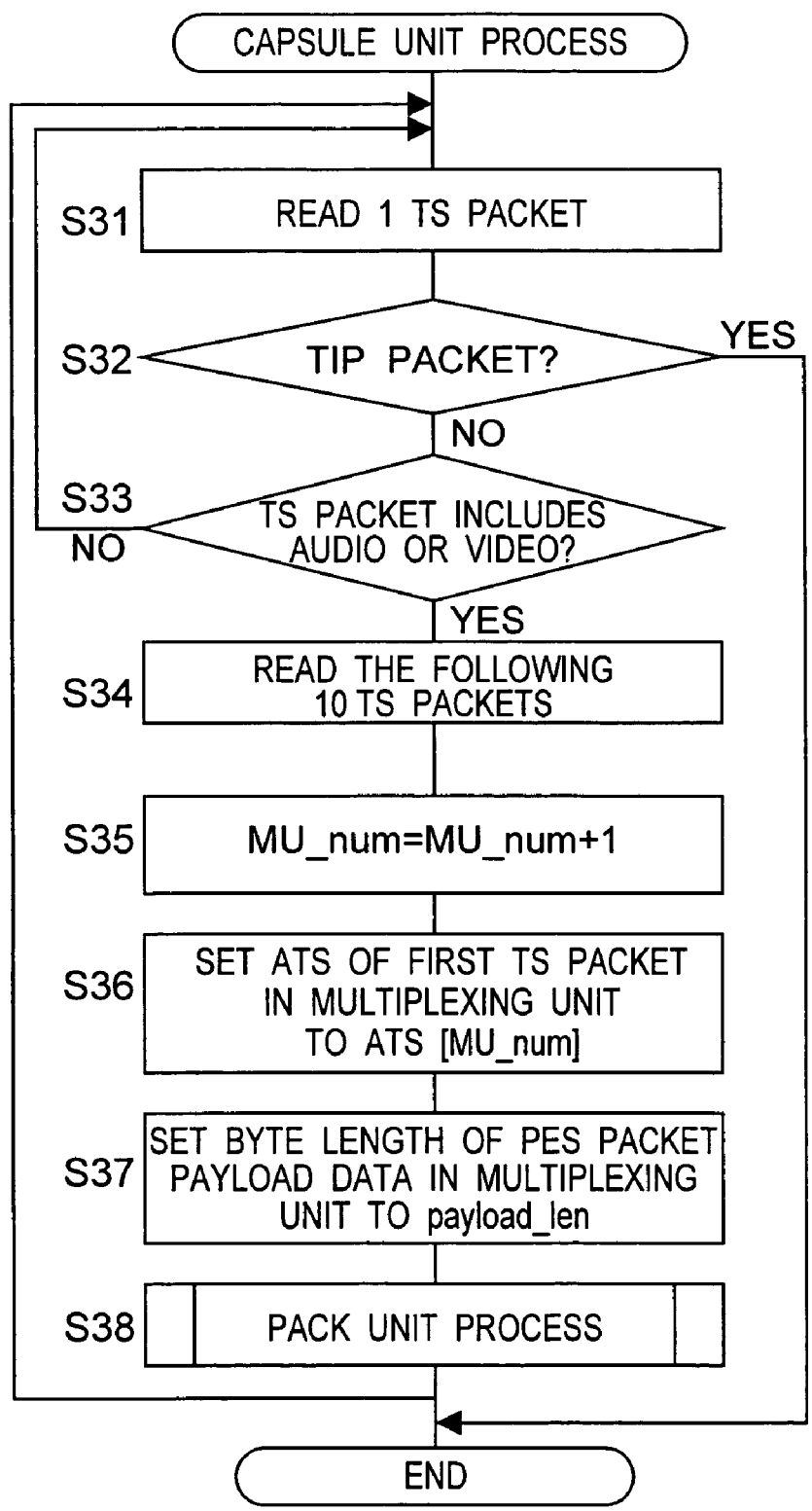
FIG. 45 is a flow chart of the capsule unit process in the TS2PS conversion process.

FIG. 45 is a flow chart of the capsule unit process (S14). This process likewise starts by reading one TS packet (S31). Whether the read TS packet is a Tip packet is then detected (S32). If the read packet is a Tip packet, processing ends. If it is not a Tip packet, whether the read TS packet contains an audio packet or video packet is detected (S33). If the TS packet contains neither an audio packet or video packet, control loops back to step S31, and TS packets are sequentially read until a TS packet containing an audio or video packet is detected (S31 to S33). If the TS packet contains an audio or video packet, the next 10 TS packets are also read (S34). MU_num is then incremented (S35). The ATS value from the first TS packet in the multiplexing unit is then written to variable ATS[MU_num] (S36). The byte length of the payload data in the PES packet of the multiplexing unit is set to payload_len (S37). A pack unit process then runs (S38).

Figure 46:
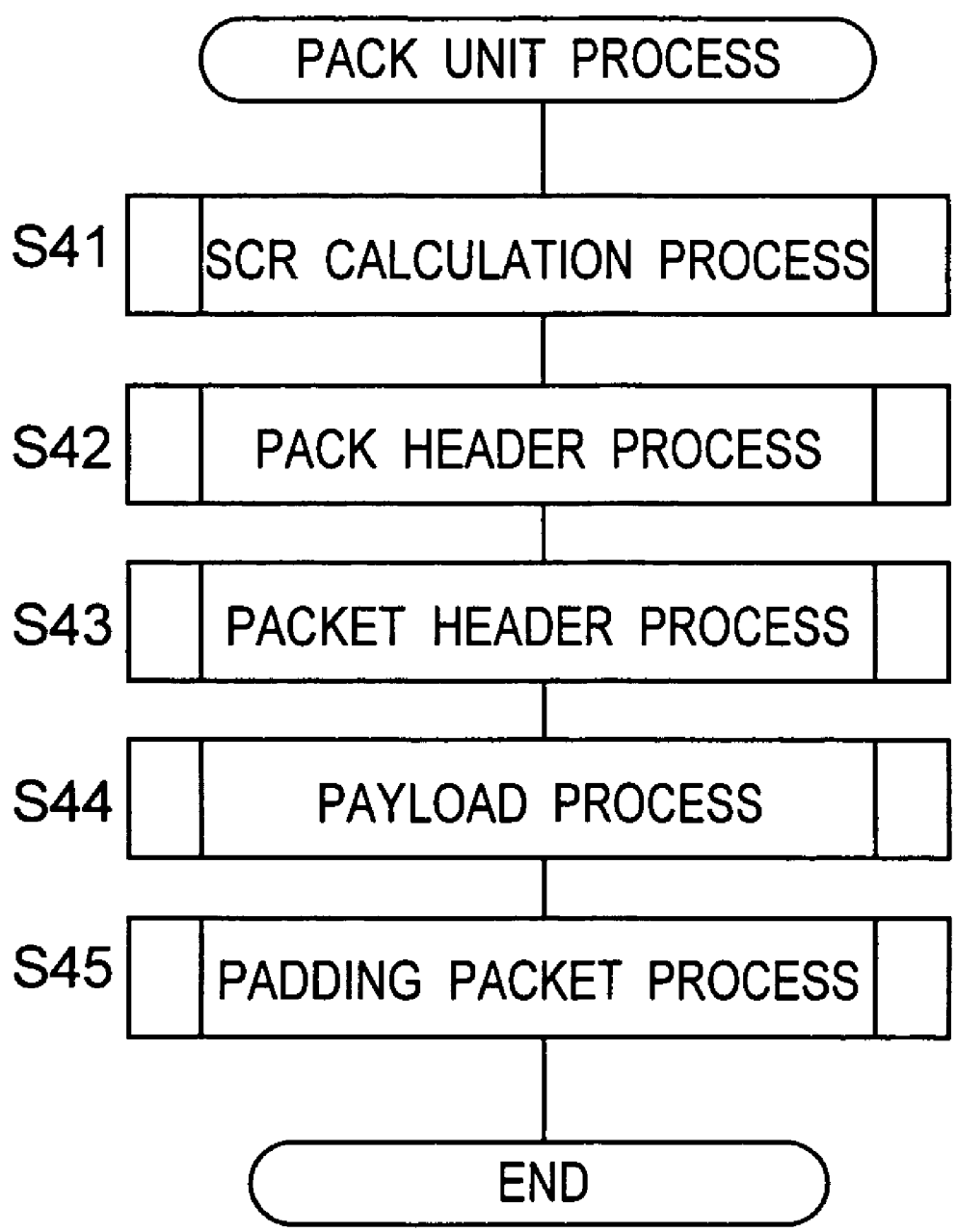
FIG. 46 is a flow chart of the pack unit process.

FIG. 46 is a flow chart of the pack unit process (S38). This pack unit process consists of four subroutines: SCR calculation (S41), pack header process (S42), packet header process (S43), payload process (S44), and padding packet process (S45). Each of these subroutines is described below.

Figure 47:
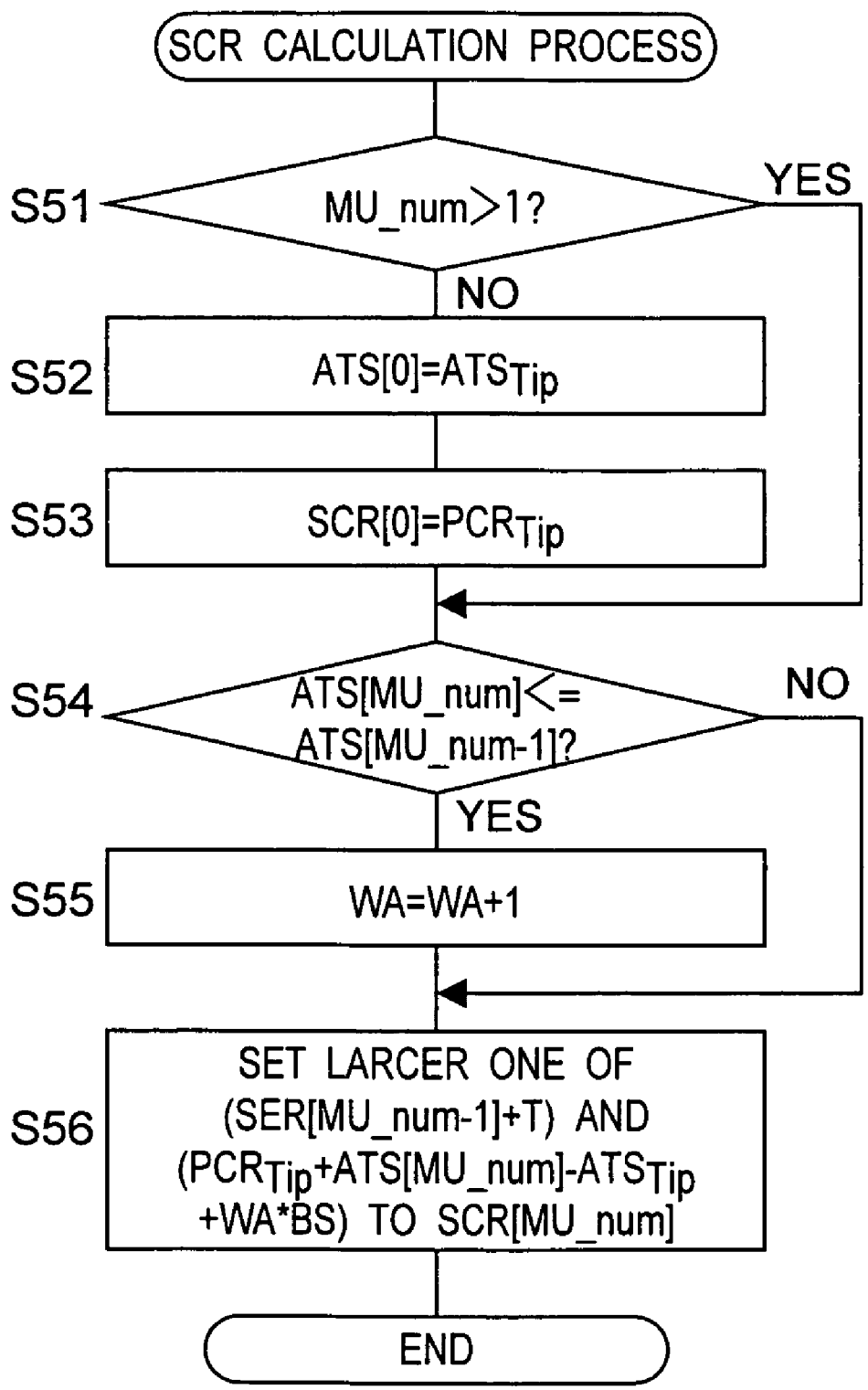
FIG. 47 is a flow chart of the SCR calculation process.

The SCR calculation process is shown in FIG. 47. This process determines the pack SCR value.

Variable MU_num is first referenced to detect the first multiplexing unit in the capsule. If it is the first multiplexing unit the value of ATS Tip is written to variable ATS[0], and PCR Tip is written to variable SCR[0] (steps S51 to S53).

ATS[MU_num] and ATS[MU_num−1] are then compared (S55). The ATS value from the first packet in the multiplexing unit is stored to ATS[i]. The ATS value denotes the relative transfer timing referenced to a given packet. The ATS value in a later packet is therefore normally higher than the ATS value of a preceding packet. However, because the ATS is a finite value definable in 30 bits, carry (column overflow) can occur. In this case the ATS value of a later packet could be smaller than the ATS of a preceding packet. Step S54 monitors this reversal of ATS values and thereby determines if a carry (column overflow) occurred. If ATS [MU_num] is less than or equal to ATS[MU num−1], that is, if the overflow is detected, variable WA is incremented (S55).

The greater of SCR[MU_num−1]+T and (PCRTip+ATS [MU_num]−ATS Tip+WA×BS) is then substituted for SCR [MU_num] (S56).

Figure 48:
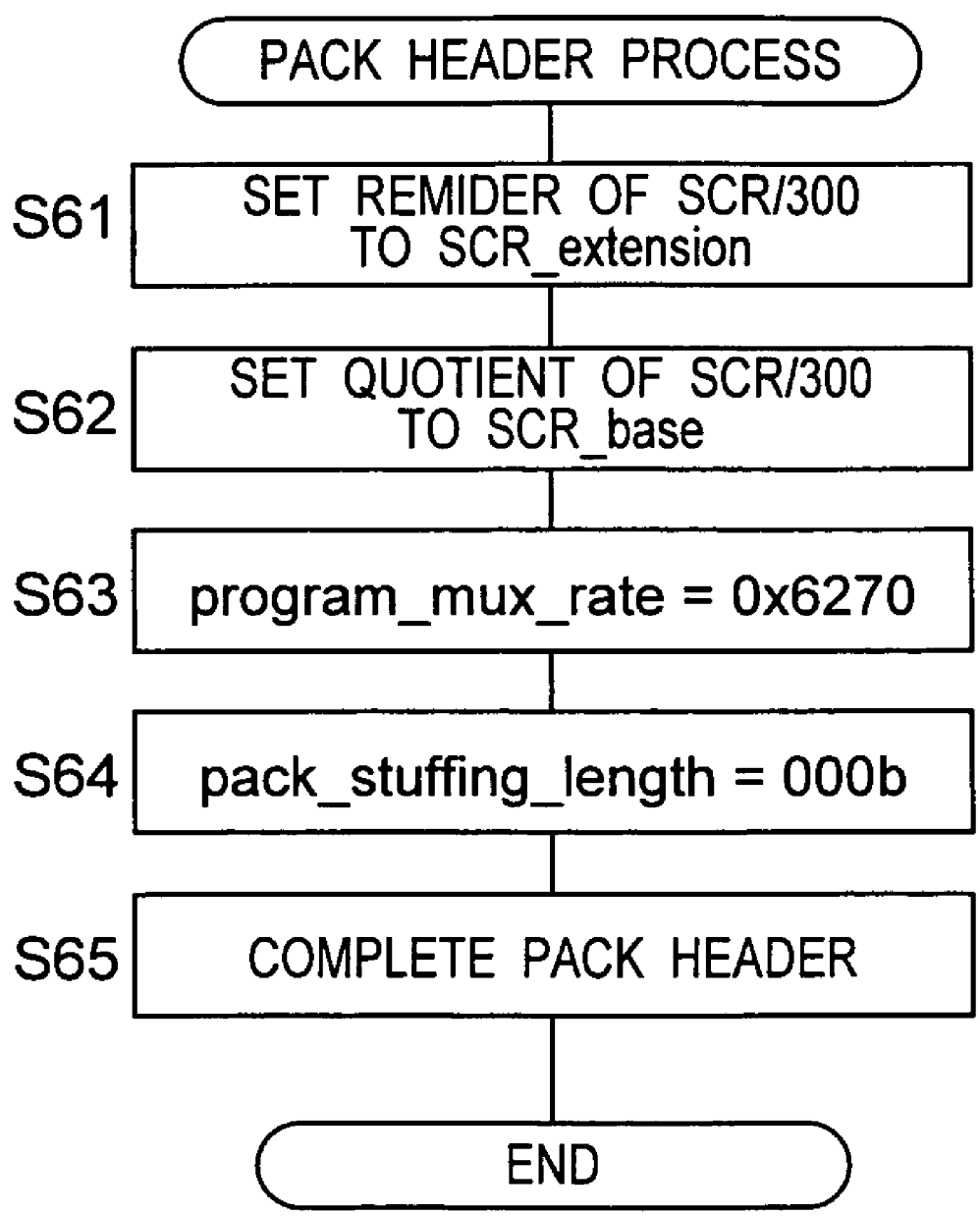
FIG. 48 is a flow chart of the pack header process.

The pack header process is described next with reference to FIG. 48.

This process edits the pack header data with the data structure shown in FIG. 38. The remainder of SCR divided by 300 is written to SCR_extension (S61) and the quotient is written to SCR_base (S62), "0x6270" is written to program_mux_rate (S63), and "000b" is written to pack_stuffing_length (S64). Other field values are then edited appropriately to complete the pack header data (S65).

Figure 49:
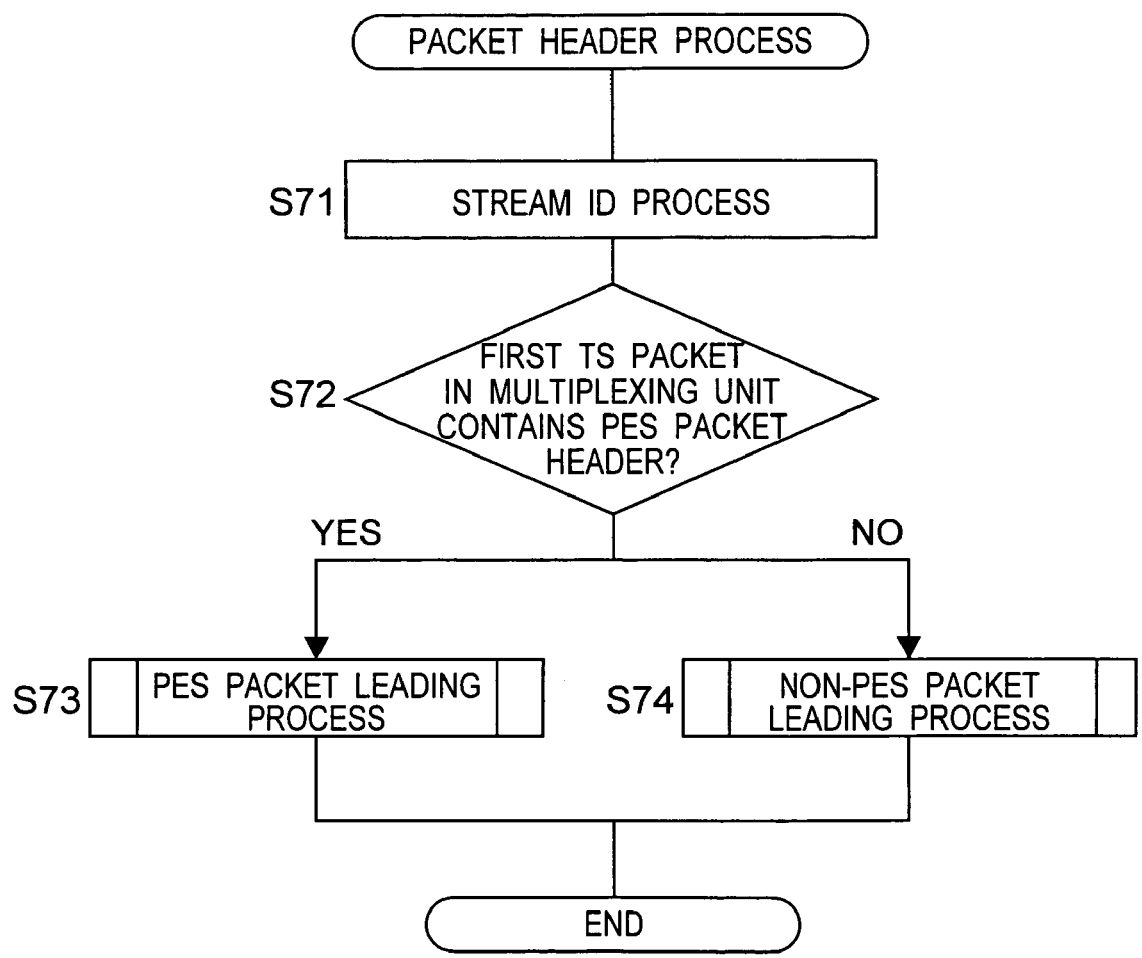
FIG. 49 is a flow chart of the packet header process.

The packet header process is described with reference to FIG. 49.

This process starts with a stream ID routine to set the stream ID (S71). Whether the first TS packet in the multiplexing unit contains a PES packet header is then detected (S72). If the first TS packet in the multiplexing unit contains a PES packet header, a start-of-PES packet process runs (S73), and otherwise a non-start-of-PES packet process runs (S74). Whether the first TS packet in a multiplexing unit contains a PES packet header can be determined by referencing the payload_unit_start_indicator in the TS packet header or by directly detecting if the PES packet header start code is stored.

Figure 50:
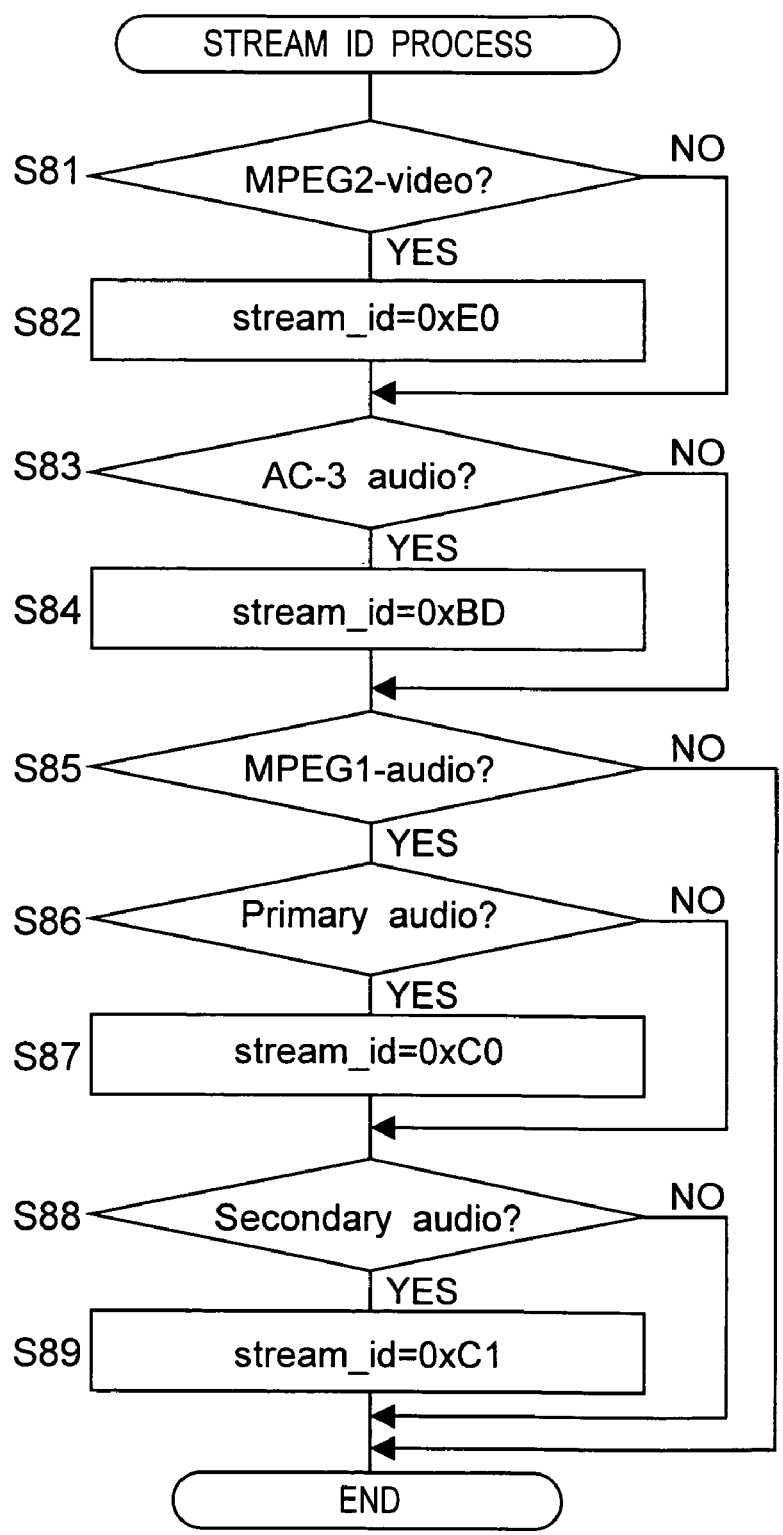
FIG. 50 is a flow chart of the stream ID process.

The stream ID process is described next with reference to FIG. 50.

This process sets the stream_ID field value. If the type of stream being processed is "MPEG-2 Video", the stream_id is set to "0xE0" (S81, S82). If the stream type is "AC3-Audio", stream_id is set to "0xBD" (S83, S84). If the stream type is "MPEG-1 Audio" and "Primary audio", stream_id is set to "0xC0" (S85, S86, S87). If the stream type is "MPEG-1 Audio" and "Secondary audio", stream_id is set to "0xC1" (S85, S88, S89).

Figure 51:
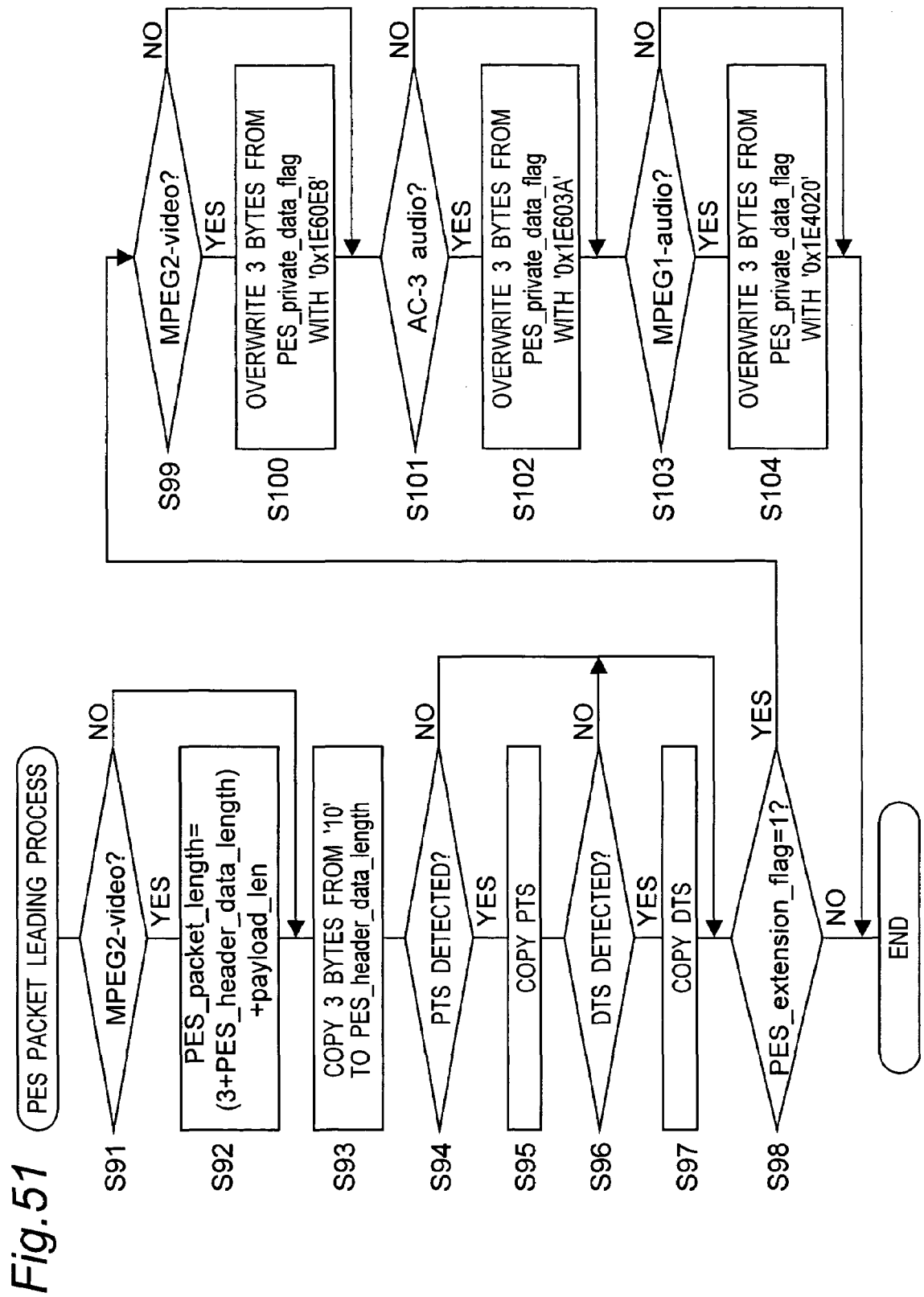
FIG. 51 is a flow chart of the start-of-PES packet process.

The start-of-PES packet process is described with reference to FIG. 51.

Figure 56:
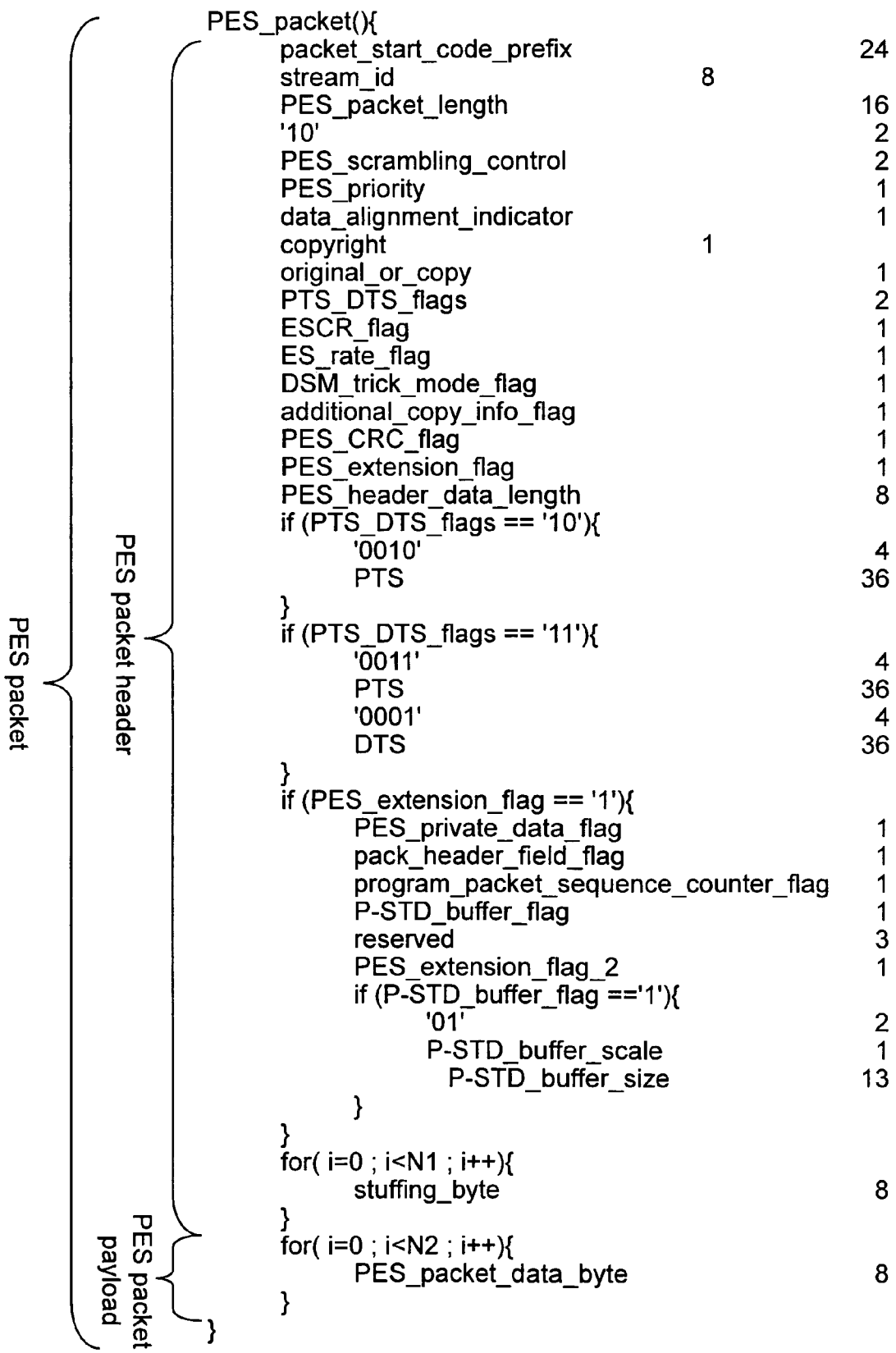
FIG. 56 shows the data structure of PES packet on an MPEG standard.

FIG. 56 shows the PES packet structure of the MPEG standard in detail. This start-of-PES packet process edits the field values according to the structure shown in FIG. 56.

If the stream type is "MPEG-2 Video" is detected first (S91). If it is, the value calculated from the following equation is written to PES_packet_length (S92).

PES_packet_length=(3+PES_header_data_length)+payload_len

The 3 bytes from "10" to PES_header_data_length (see FIG. 56) in each field of the TS packet before conversion are copied directly to the corresponding field of the packet header of the converted MPEG-PS pack (S93). PTS_DTS_flags in the TS packet before conversion is referenced to detect if a PTS is present (S94). If a PTS is present, it is copied directly to the corresponding field of the packet header in the converted MPEG-PS pack (S95). PTS_DTS_flags is likewise referenced to detect if a DTS is present (S96). If a DTS is present, it is copied directly to the corresponding field of the packet header in the converted MPEG-PS pack (S97). If the PES_extension_flag is set to "1" (S98), step S99 runs.

In step S99 the stream type is again detected, and the three bytes from PES_private_data_flag to P_STD_buffer_flag are overwritten according to the detected stream type. That is, if the stream type is "MPEG-2 Video" (S99), the three bytes from PES_private_data_flag to P_STD_buffer_flag are overwritten with "0x1E60E8" (S100). If the stream type is "AC3-Audio" (S101), "0x1E603A" is written (S102). If the stream type is "MPEG-1 Audio" (S103), "0x1E4020" is written (S104).

Figure 52:
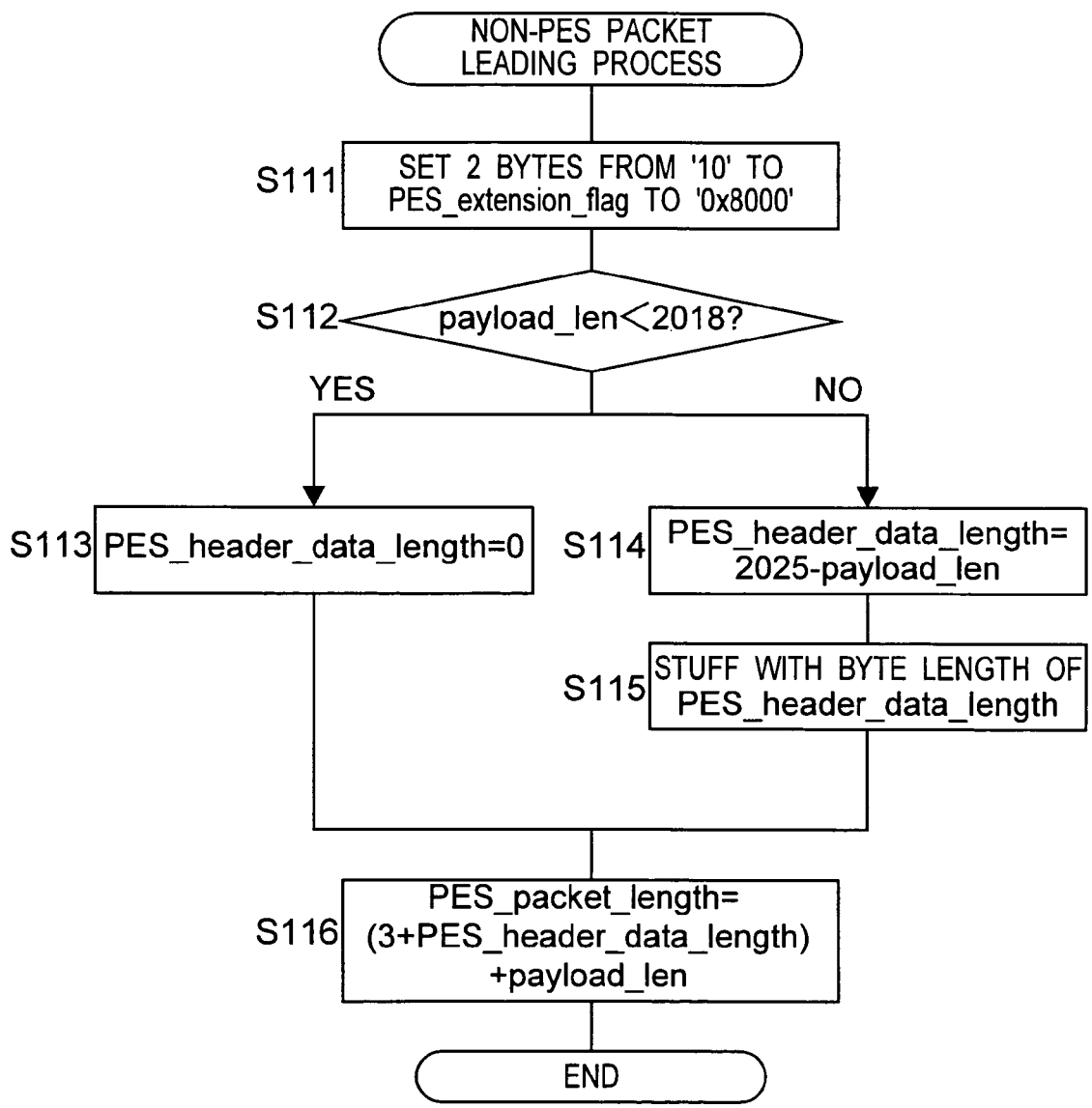
FIG. 52 is a flow chart of the non-start-of-PES packet process.

The non-start-of-PES packet process is described next with reference to FIG. 52.

The 2 bytes from "10" to PES_extension_flag in the PES packet are set to "0x8000" (S111), and whether the payload_len is less than 2018 is detected (S112). The payload_len is the data length of the PES packet in one multiplexing unit and is a maximum 184×11=2024 bytes. If payload_len is less than 2018, PES_header_data_length is set to 0 (S113). If payload_len is greater than or equal to 2018, PES_header_data_length is set to (2025−payload_len) (S114) and the PES packet is stuffed the byte length of PES_header_data_ length (S115). The value calculated from the following equation is set to PES_packet_length (S116).

PES_packet_length=(3+PES_header_data_length)+payload_len

Figure 53:
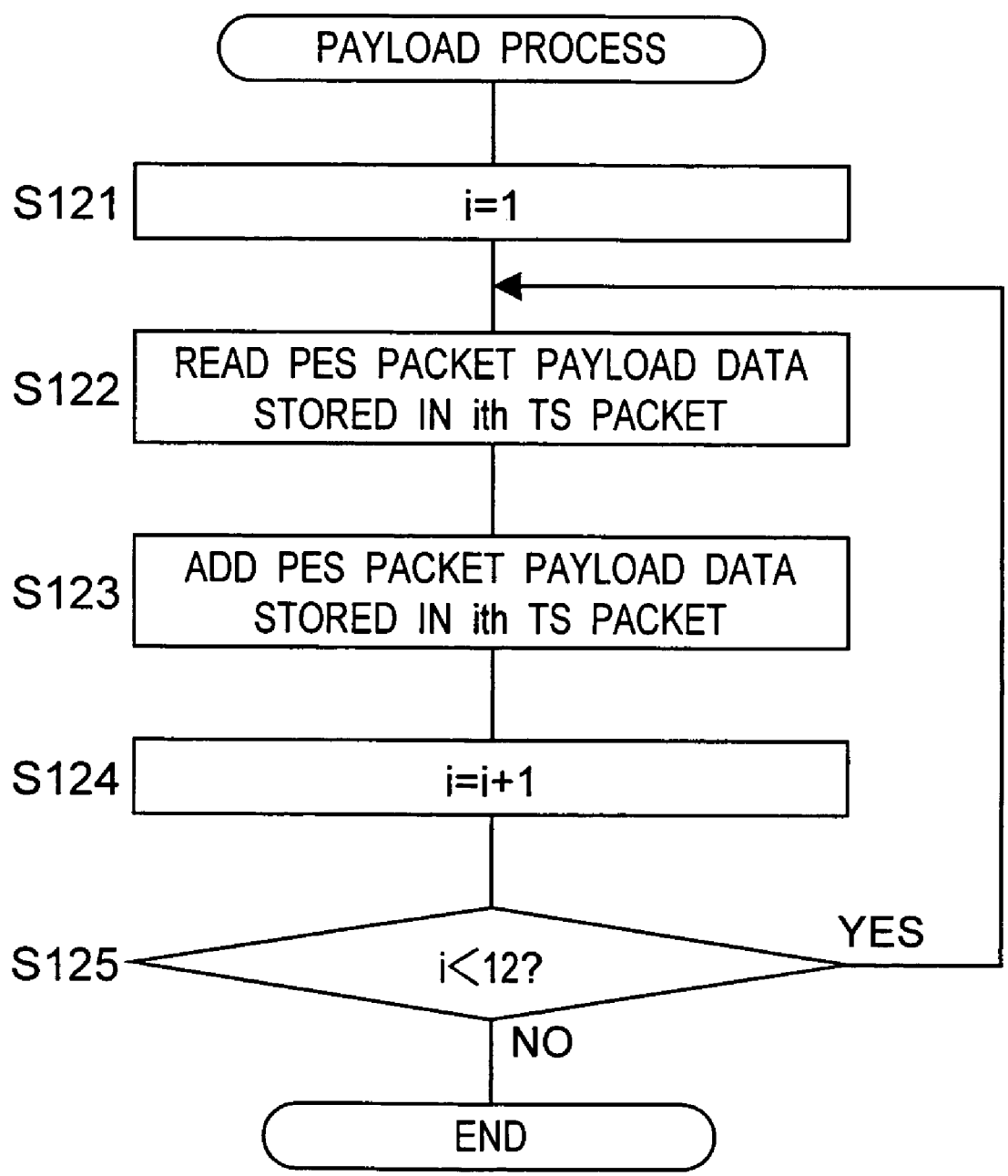
FIG. 53 is a flow chart of the payload process.

The payload process is described next with reference to FIG. 53.

Variable i is first initialized to 1 (S121). The payload data of the PES packet stored to the i-th TS packet is then read (122) and added to the payload data of the pack (S123). Variable i is then incremented (S124). Steps S122 to S125 repeat until i=12 (S125), that is, until all TS packets in one multiplexing unit are processed.

Figure 54:
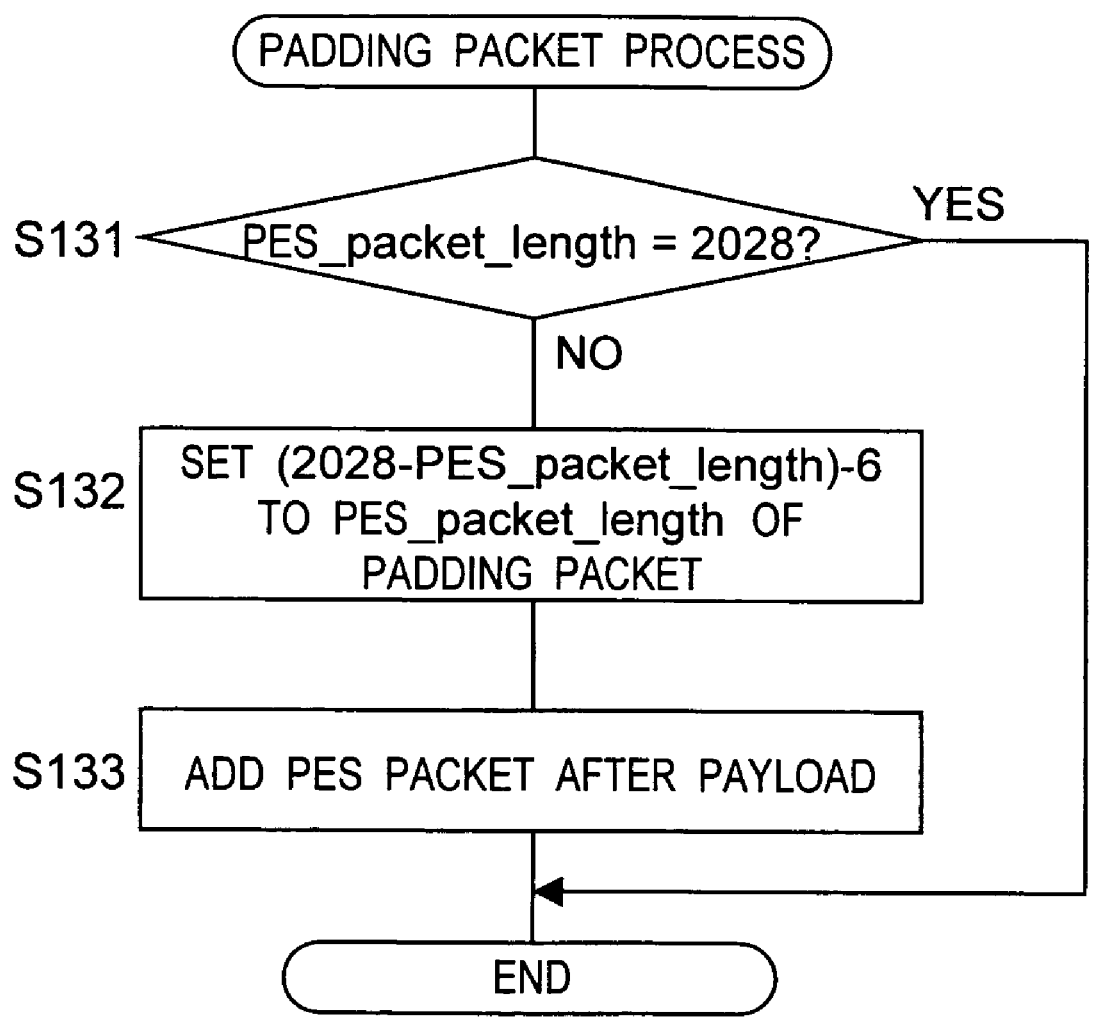
FIG. 54 is a flow chart of the padding packet process.

The padding packet process is described next with reference to FIG. 54.

Whether PES_packet_length equals 2028 is first detected (S131). If PES_packet_length does not equal 2028, PES_packet_length of the padding packet is set to {(2028−PES_packet_length)−6} (S132), and the padding packet is added to the payload (S133).

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

The invention claimed is:

1. A stream conversion apparatus for converting a first stream including video data and audio data multiplexed in a specific format to a second stream, the first stream having a structure for storing data segmented in first blocks, the second stream having a structure for storing data segmented in second blocks, the maximum data size of the first and second blocks being different, wherein
with the constrained format,
a specific number of consecutive first blocks in the first stream are managed as a unit (Multiplexing Unit), the specific number is set so that a total amount of data stored in the unit does not exceed an amount of data stored to one second block, and all data stored in the same unit are the same video stream or the same audio stream,
an input start time to a system decoder of a destination second block to which the stream is converted is the same as the later one of a first candidate time and a second candidate time, the first candidate time being the input start time to the system decoder of a source unit being converted, and the second candidate time being the time at which input to the system decoder of the second block immediately before the destination second block to which the source unit is converted ends,
the stream conversion system comprises:
a reading section operable to read the first stream from the recording medium;
a conversion section operable to convert the read first stream to a second stream; and
a recording section operable to record the converted second stream to the recording medium; and
the conversion section converts, by unit, the first blocks composing the unit to one second block without changing the multiplexing order of the first blocks, and selects the later one of the first and second candidate times as the time stamp information of the converted second block to set the decoder input start time of the second block.

2. The stream conversion apparatus according to claim 1, wherein:
a plurality of consecutive units in the first stream are managed as a capsule in which a control block is inserted;
the first block located at the head of the unit includes first time stamp information (ATS[i]) indicating an input start time to a system decoder based on a first reference value;
the control block contains the first time stamp information (ATS_tip) based on the first reference value, and second time stamp information (PCR_tip) based on a second reference value different from the first reference value; and
the second time stamp information (calculated_PCR[i]) of the first block located at the head of each unit and input start time (SCR[i]) to the system decoder of each second block included in the second stream converted from the first stream are obtained from the following formulas, SCR[1]=calculated_PCR[1]

$SCR[i]=\max(SCR[i-1]+T, calculated\_PCR[i])$ calculated_$PCR[i]=PCR$_tip+$(ATS[i]-ATS$_tip+$C)$ where i is an integer which is 2 or more, T is the minimum transfer time of a second block, and C is a correction factor for overflow of ATS[i].

3. A recording apparatus for multiplexing video information and audio information to record the information to a recording medium in a format enabling conversion from a first stream to a second stream, the first stream having a structure for storing data segmented in first blocks, the second stream having a structure for storing data segmented in second blocks, the maximum data size of the first and second blocks being different, wherein
with the format
a specific number of consecutive first blocks in the first stream are managed as a unit (Multiplexing Unit), the specific number is set so that a total amount of data stored in the unit does not exceed an amount of data stored to one second block, and all data stored in the same unit are the same video stream or the same audio stream,
an input start time to a system decoder of a destination second block to which the stream is converted is the same as the later one of a first candidate time and a second candidate time, the first candidate time being the input start time to the system decoder of a source unit being converted, and the second candidate time being the time at which input to the system decoder of the second block immediately before the destination second block to which the source unit is converted ends,
the first stream is converted to the second stream by converting, by unit, the first blocks composing the unit to one second block without changing the multiplexing order of the first blocks, and selecting the later one of the first and second candidate times as the time stamp information of the converted second block to set the decoder input start time of the second block;

the recording apparatus comprises:
- an encoding section operable to encode the video information and audio information to be recorded to the first stream according to the format;
- a recording section operable to record the encoded first stream to the recording medium; and
- a control section operable to control the encoding section and recording section,
- the control section anticipates the second stream converted from the encoded first stream when encoding the first stream, and then encodes the first stream so that at least one of a buffer underflow and buffer overflow occurs in neither the encoded first stream or the anticipated second stream.

4. The recording apparatus according to claim 3, wherein:
- a plurality of consecutive units in the first stream are managed as a capsule in which a control block is inserted;
- the first block located at the head of the unit includes first time stamp information (ATS[i]) indicating an input start time to a system decoder based on a first reference value;
- the control block contains the first time stamp information (ATS_tip) based on the first reference value, and second time stamp information (PCR_tip) based on a second reference value different from the first reference value; and
- the second time stamp information (calculated_PCR[i]) of the first block located at the head of each unit and input start time (SCR[i]) to the system decoder of each second block included in the second stream converted from the first stream are obtained from the following formulas, $$SCR[1]=\text{calculated\_PCR}[1]$$

$$SCR[i]=\max(SCR[i-1]+T, \text{calculated\_PCR}[i])$$

$$\text{calculated\_PCR}[i]=PCR\_\text{tip}+(ATS[i]-ATS\_\text{tip}+C)$$

where i is an integer which is 2 or more, T is the minimum transfer time of a second block, and C is a correction factor for overflow of ATS[i].

5. The recording apparatus as described in claim 3, wherein transfer rate conditions allowed for audio data and video data are different in the first stream and second stream, and
- the control section controls the encoding section such that the first stream meets these transfer rate conditions in both the encoded first stream and anticipated second stream.

6. The recording apparatus as described in claim 5, wherein according to these transfer rate conditions:
- the maximum transfer rate allowed for a first block storing video data in the first stream is greater than or equal to the maximum transfer rate allowed for a first block storing audio data; and
- the maximum transfer rate allowed for a second block storing video data in the second stream is equal to the maximum transfer rate allowed for a second block storing audio data.

7. A recording medium for recording video data and audio data multiplexed in a format enabling converting a first stream to a second stream, the first stream having a structure for storing data segmented in first blocks, the second stream having a structure for storing data segmented in second blocks, the maximum data size of the first and second blocks being different, wherein
with the format,
- a specific number of consecutive first blocks in the first stream are managed as a unit (Multiplexing Unit), the specific number is set so that a total amount of data stored in the unit does not exceed an amount of data stored to one second block, and all data stored in the same unit are the same video stream or the same audio stream,
- an input start time to a system decoder of a destination second block to which the stream is converted is the same as the later one of a first candidate time and a second candidate time, the first candidate time being the input start time to a system decoder of a source unit being converted, and the second candidate time being the time at which input to the system decoder of the second block immediately before the destination second block to which the source unit is converted ends,
- the first stream is converted to the second stream by converting, by unit, the first blocks composing the unit to one second block without changing the multiplexing order of the first blocks, and selecting the later one of the first and second candidate times as the time stamp information of the converted second block to set the decoder input start time of the second block.

8. The recording medium according to claim 7, wherein:
- a plurality of consecutive units in the first stream are managed as a capsule in which a control block is inserted;
- the first block located at the head of the unit includes first time stamp information (ATS[i]) indicating an input start time to a system decoder based on a first reference value;
- the control block contains the first time stamp information (ATS_tip) based on the first reference value, and second time stamp information (PCR_tip) based on a second reference value different from the first reference value; and
- the second time stamp information (calculated_PCR[i]) of the first block located at the head of each unit and input start time (SCR[i]) to the system decoder of each second block included in the second stream converted from the first stream are obtained from the following formulas, $$SCR[1]\text{calculated\_PCR}[1]$$

$$SCR[i]=\max(SCR[i-1]+T, \text{calculated\_PCR}[i])$$

$$\text{calculated\_PCR}[i]=PCR\_\text{tip}+(ATS[i]-ATS\_\text{tip}+C)$$

where i is an integer which is 2 or more, T is the minimum transfer time of a second block, and C is a correction factor for overflow of ATS[i].

9. A stream conversion method for converting a first stream including video data and audio data multiplexed in a specified format to a second stream, the first stream having a structure for storing data segmented in first blocks, the second stream having a structure for storing data segmented in second blocks, the maximum data size of the first and second blocks being different, wherein
with the constrained format,
- a specific number of consecutive first blocks in the first stream are managed as a unit (Multiplexing Unit), the specific number is set so that a total amount of data stored in the multiplexing unit does not exceed an amount of data stored to one second block, and all data stored in the same unit are the same video stream or the same audio stream, an input start time to a system decoder of a destination second block to which the stream is converted is the same as the later one of a first candidate time and a second candidate time, the first candidate time being the input start time to the system decoder of a source unit being converted, the second candidate time being the time at which input to the system decoder of the second block immediately before the destination second block to which the source unit is converted ends, the stream conversion method comprises, in order to convert the first stream read out from a recording medium to the second stream, converting, by unit, the first blocks composing, by unit, the unit composing the unit to one second block without changing the multiplexing order of the first blocks, and selecting the later one of the first and second candidate times as the time stamp information of the converted second block to set the decoder input start time of the second block.

10. A recording method for multiplexing video information and audio information to record the information to a recording medium in a format enabling conversion from a first stream to a second stream, the first stream having a structure for storing data segmented in first blocks, the second stream having a structure for storing data segmented in second blocks, the maximum data size of the first and second blocks being different, wherein with the format a specific number of consecutive first blocks in the first stream are managed as a unit (Multiplexing Unit), the specific number is set so that a total amount of data stored in the unit does not exceed an amount of data stored to one second block, and all data stored in the same unit are the same video stream or the same audio stream, an input start time to a system decoder of a destination second block to which the stream is converted is the same as the later one of a first candidate time and a second candidate time, the first candidate time being the input start time to the system decoder of the source unit being converted, and the second candidate time being the time at which input to the system decoder of the second block immediately before the destination second block to which the source unit is converted ends, the first stream is converted to the second stream by converting, by unit, the first blocks composing the unit to one second block without changing the multiplexing order of the first blocks, and selecting the later one of the first and second candidate times as the time stamp information of the converted second block to set the decoder input start time of the second block, the recording method comprises, when encoding the first stream, anticipating the second stream converted from the encoded first stream, and encoding the first stream so that at least one of buffer underfow or buffer overflow occurs in neither the encoded first stream or the anticipated second stream.

11. A computer-readable medium encoded with a computer program for executing the method as described in claim 9 on a computer.

12. A computer-readable medium encoded with a computer program for executing the method as described in claim 10 on a computer.

* * * * *